United States Patent
Blake et al.

(10) Patent No.: US 7,017,813 B2
(45) Date of Patent: *Mar. 28, 2006

(54) BAR CODE READER FOR AUTOMATICALLY DETECTING THE PRESENCE OF A BAR CODE USING LASER FLICKER

(75) Inventors: Robert Blake, Woodbury Heights, NJ (US); Carl H. Knowles, Moorestown, NJ (US); George B. Rockstein, Audubon, NJ (US); David M. Wilz, Sewell, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 528 days.

This patent is subject to a terminal disclaimer.

(21) Appl. No.: 10/071,950

(22) Filed: Feb. 6, 2002

(65) Prior Publication Data

US 2004/0206823 A1    Oct. 21, 2004

Related U.S. Application Data

(63) Continuation of application No. 09/273,825, filed on Mar. 22, 1999, now Pat. No. 6,412,700, which is a continuation of application No. 08/827,118, filed on Mar. 27, 1997, now Pat. No. 5,925,870, which is a continuation of application No. 08/584,135, filed on Jan. 11, 1996, now Pat. No. 5,616,908, which is a continuation of application No. 08/278,109, filed on Nov. 24, 1993, now Pat. No. 5,484,992, which is a continuation of application No. 07/960,733, filed on Oct. 14, 1992, now abandoned, which is a continuation-in-part of application No. 07/898,919, filed on Jun. 12, 1992, now Pat. No. 5,340,973, which is a continuation-in-part of application No. 07/761,123, filed on Sep. 17, 1991, now Pat. No. 5,340,971, which is a continuation-in-part of application No. 07/583,421, filed on Sep. 17, 1990, now Pat. No. 5,260,533, said application No. 09/273,825 is a continuation of application No. 08/660,643, filed on Jun. 7, 1996, now Pat. No. 5,886,337, which is a continuation of application No. 08/293,493, filed on Aug. 19, 1994, now Pat. No. 5,525,789, which is a continuation of application No. 07/761,123, filed on Sep. 17, 1991, now Pat. No. 5,340,971, which is a continuation-in-part of application No. 07/583,421, filed on Sep. 17, 1990, now Pat. No. 5,260,553.

(51) Int. Cl.
*G06K 7/10* (2006.01)

(52) U.S. Cl. .......................... 235/462.01; 235/462.25; 235/472.01

(58) Field of Classification Search .............................. 235/462.01–462.47, 472.01, 472.02, 472.03, 235/454, 455, 494, 470
See application file for complete search history.

(56) References Cited

U.S. PATENT DOCUMENTS

| | | |
|---|---|---|
| 3,911,270 A | 10/1975 | Traub |
| 3,978,317 A | 8/1976 | Yamaguchi et al. |
| 3,978,318 A | 8/1976 | Romeo et al. |
| 4,072,859 A | 2/1978 | McWaters |
| 4,086,476 A | 4/1978 | King |
| 4,136,821 A | 1/1979 | Sugiura et al. |
| 4,240,064 A | 12/1980 | DevChoudhury |
| 4,387,297 A | 6/1983 | Swartz et al. |
| 4,409,470 A | 10/1983 | Shepard et al. |
| 4,431,912 A | 2/1984 | Dickson et al. |
| 4,460,120 A | 7/1984 | Shepard et al. |
| 4,496,831 A | 1/1985 | Swartz et al. |
| 4,570,057 A | 2/1986 | Chadima, Jr. et al. |
| 4,575,625 A | 3/1986 | Knowles |
| 4,603,262 A | 7/1986 | Eastman et al. |
| 4,639,606 A | 1/1987 | Boles et al. |
| 4,673,805 A | 6/1987 | Shepard et al. |
| 4,736,095 A | 4/1988 | Shepard et al. |
| 4,766,297 A | 8/1988 | McMillan |
| 4,766,299 A | 8/1988 | Tierney et al. |
| 4,816,660 A | 3/1989 | Swartz et al. |
| 4,825,057 A | 4/1989 | Swartz et al. |
| 4,845,349 A | 7/1989 | Cherry |

| | | |
|---|---|---|
| 4,877,949 A | 10/1989 | Danielson et al. |
| 4,897,532 A | 1/1990 | Swartz et al. |
| D305,885 S | 2/1990 | Barkan et al. |
| 4,920,255 A | 4/1990 | Gabeler |
| D307,894 S | 5/1990 | Siemiatkowski |
| 4,930,848 A | 6/1990 | Knowles |
| 4,933,538 A | 6/1990 | Heiman et al. |
| 4,962,980 A | 10/1990 | Knowles |
| 4,970,379 A | 11/1990 | Danstrom |
| 5,015,833 A | 5/1991 | Shepard et al. |
| 5,017,765 A | 5/1991 | Shepard et al. |
| 5,059,777 A | 10/1991 | Wittensoldner et al. |
| 5,065,003 A | 11/1991 | Wakatsuki et al. |
| 5,086,215 A | 2/1992 | Carsner et al. |
| 5,107,100 A | 4/1992 | Shepard et al. |
| 5,132,523 A | 7/1992 | Bassett |
| 5,142,131 A | 8/1992 | Collins, Jr. et al. |
| 5,155,346 A | 10/1992 | Doing et al. |
| 5,157,687 A | 10/1992 | Tymes |
| 5,180,904 A | 1/1993 | Shepard et al. |
| 5,198,650 A | 3/1993 | Wike, Jr. |
| 5,212,370 A | 5/1993 | Wittensoldner et al. |
| 5,216,231 A | 6/1993 | Ouchi |
| 5,250,790 A | 10/1993 | Melitsky et al. |
| 5,262,627 A | 11/1993 | Shepard |
| 5,280,162 A | 1/1994 | Marwin |
| 5,324,924 A | 6/1994 | Cai et al. |
| 5,340,971 A | 8/1994 | Rockstein et al. |
| 5,340,973 A * | 8/1994 | Knowles et al. ....... 235/462.45 |
| 5,420,411 A | 5/1995 | Salatto, Jr. et al. |
| 5,525,789 A * | 6/1996 | Rockstein et al. ..... 235/462.22 |
| 5,661,292 A * | 8/1997 | Knowles et al. ....... 235/462.32 |
| 5,925,871 A * | 7/1999 | Knowles et al. ....... 235/462.45 |
| 6,189,793 B1 * | 2/2001 | Knowles et al. ....... 235/462.22 |
| 6,328,211 B1 * | 12/2001 | Wilz et al. ............. 235/462.01 |

FOREIGN PATENT DOCUMENTS

| | | |
|---|---|---|
| EP | 0 424 976 B1 | 5/1991 |
| EP | 0 460 669 B1 | 12/1991 |
| EP | 0 517 958 B1 | 12/1992 |

OTHER PUBLICATIONS

Microcomputer-Product Brochure of MS131 Microcomputer Controller by Metrologic Instruments, Inc., 1984 (1 page).

Enhanced Version of MS131 Controller-Product Brochure of MS132 Microcomputer Controller by Metrologic Insturments, Inc., 1984. (2 pages).

Introduction to the Company, Metrologic Instruments, Inc. and some of its products-Product Brochure entitled "Metrologic Bar Code Scanning Systems" by Metrologic Instruments, Inc., 1985.

Hand-Held Bar Code Symbol Scanner—"Hand-Held Hologrpahic Scanner Having Highly Visible Locator Beam", by R.T. Cato, IBM Technical Disclosure Bulletin, vol. 27, No. 4A, Sep. 1994.

Laser Bar Code Symbol Scanner with hardware-Implemented Digital Count Data Filter-Product Brochure and Schematic Diagram entitled "Metrologic SS-200 Magazine Scanner", Circa 1979.

Hand-Held Laser Bar Code Symbol Scanner with Software Implemented Digital Count-Data Filter-Product Brochure and Schematic Diagram for MH290 Hand Held Laser Scanner by Metrologic Instruments, Inc., Nov. 1987.

Stands and Holders for Hand-Held Bar Code Scanners-Sales Brochure Entitled "Stands, Holders and Accessories" by Symbol Technologies of Bohemia, New York; Dec. 1989.

* cited by examiner

*Primary Examiner*—Thien M. Le

(57) ABSTRACT

Method and apparatus for automatically reading bar code symbols using a reading device containing a laser beam configured to provide a scan field. The method involves automatically detecting the presence of a bar code within the scan field by flickering the laser beam. In automatic response to the detection of a bar code, the automatic bar code symbol reading device generates a laser beam scanning pattern and reads the detected bar code by producing scan data signals from the detected bar code and thereafter collecting and analyzing these data signals. Further aspects of the present invention relate to hand-holdable data collection devices adapted for use with the automatic bar code symbol reading device to form a portable symbol reading system characterized by versatility and simplicity of use.

37 Claims, 29 Drawing Sheets

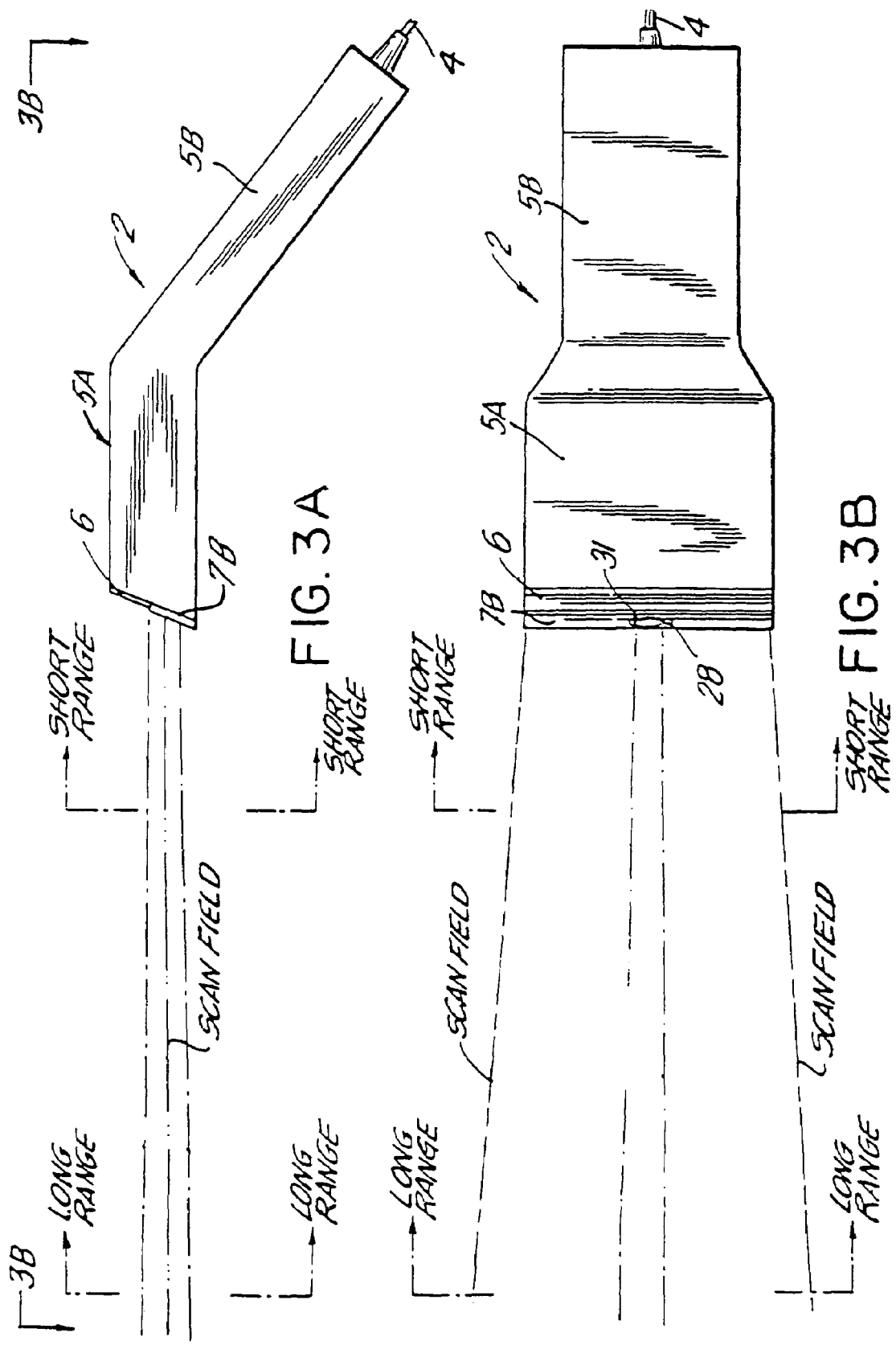

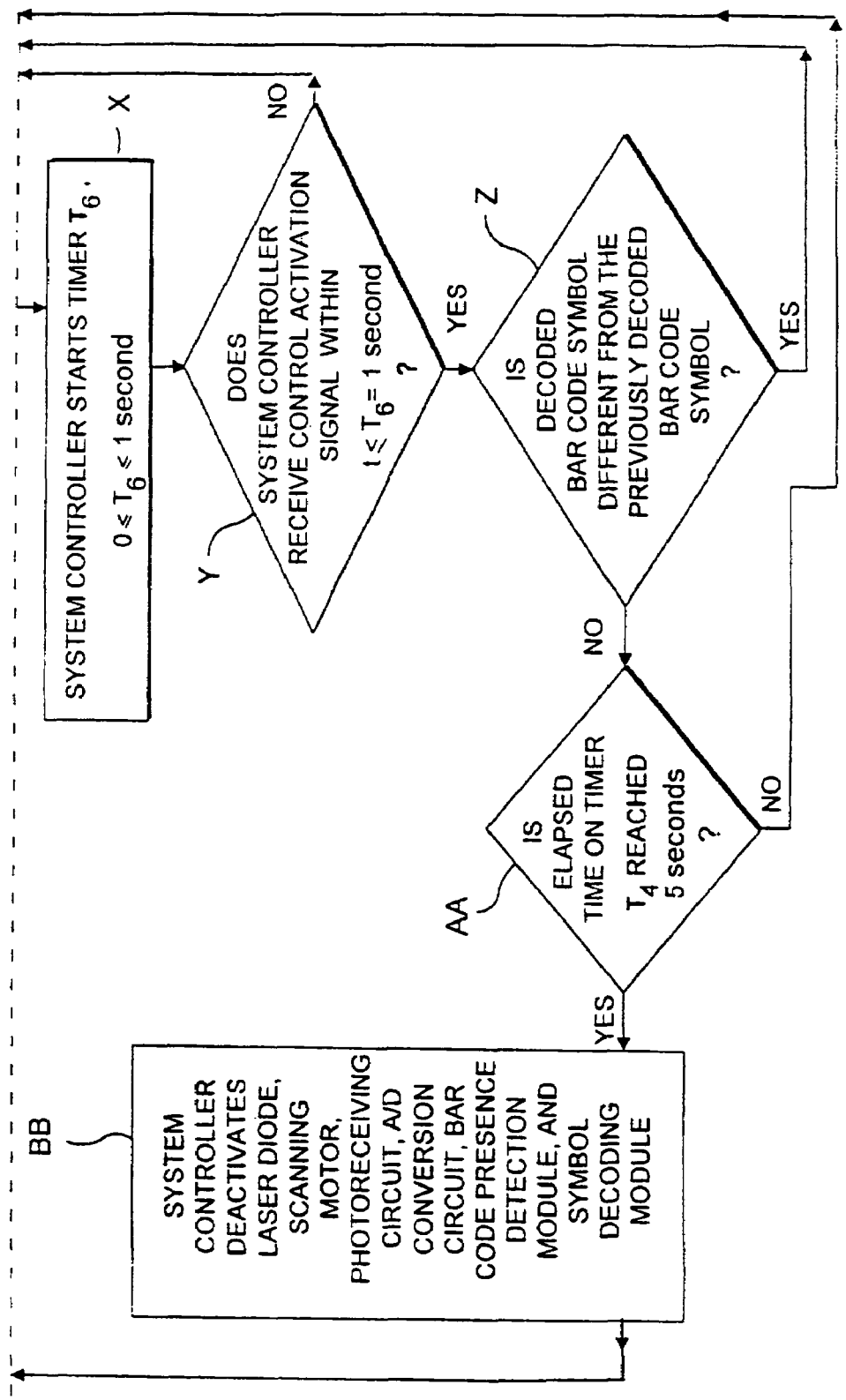

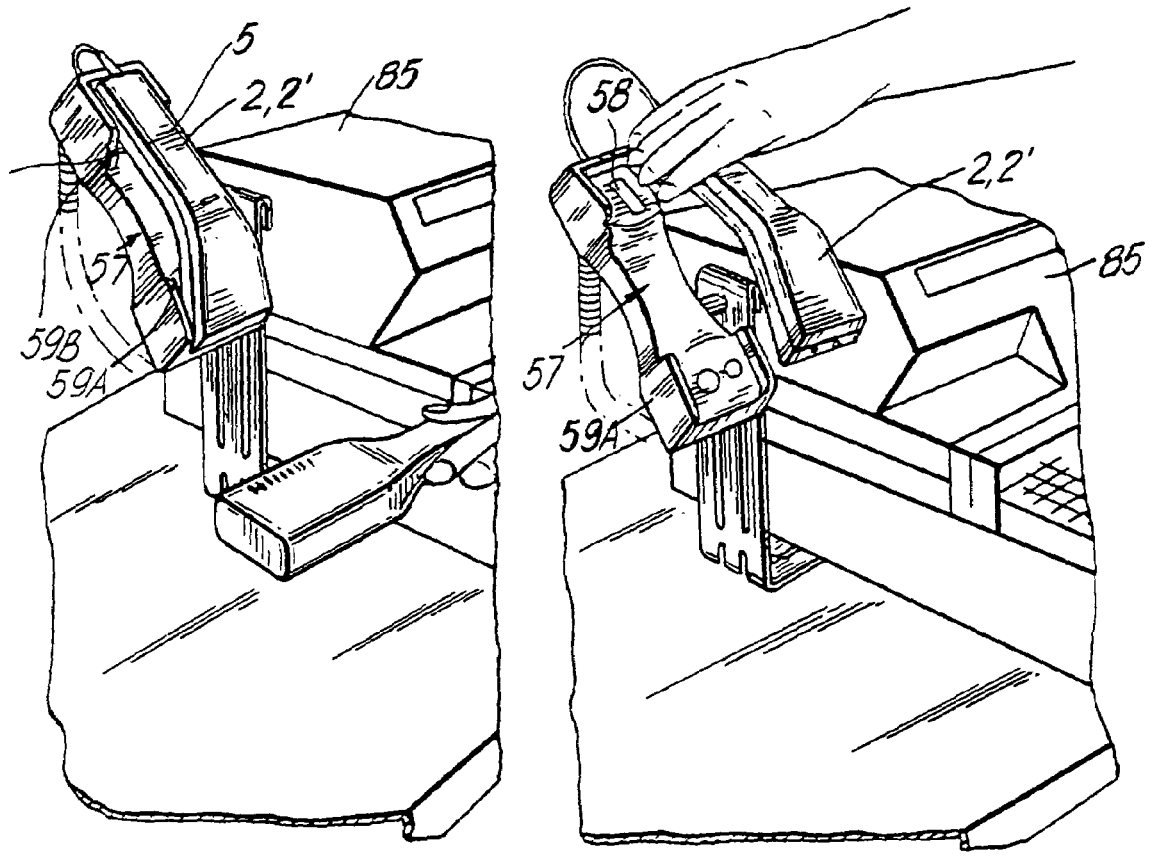
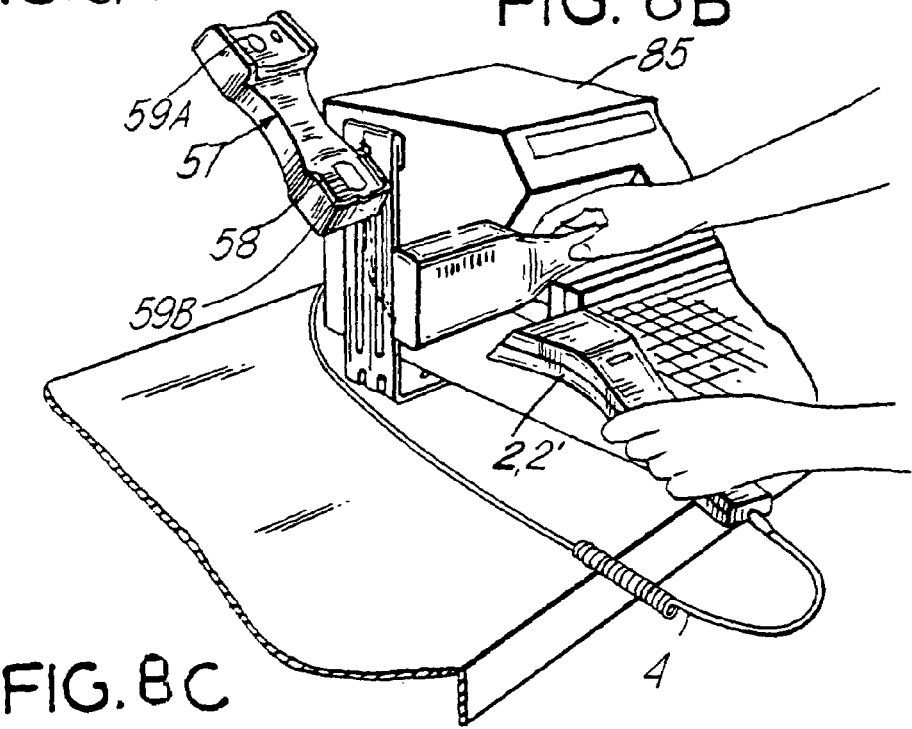
FIG. 8A  FIG. 8B  FIG. 8C

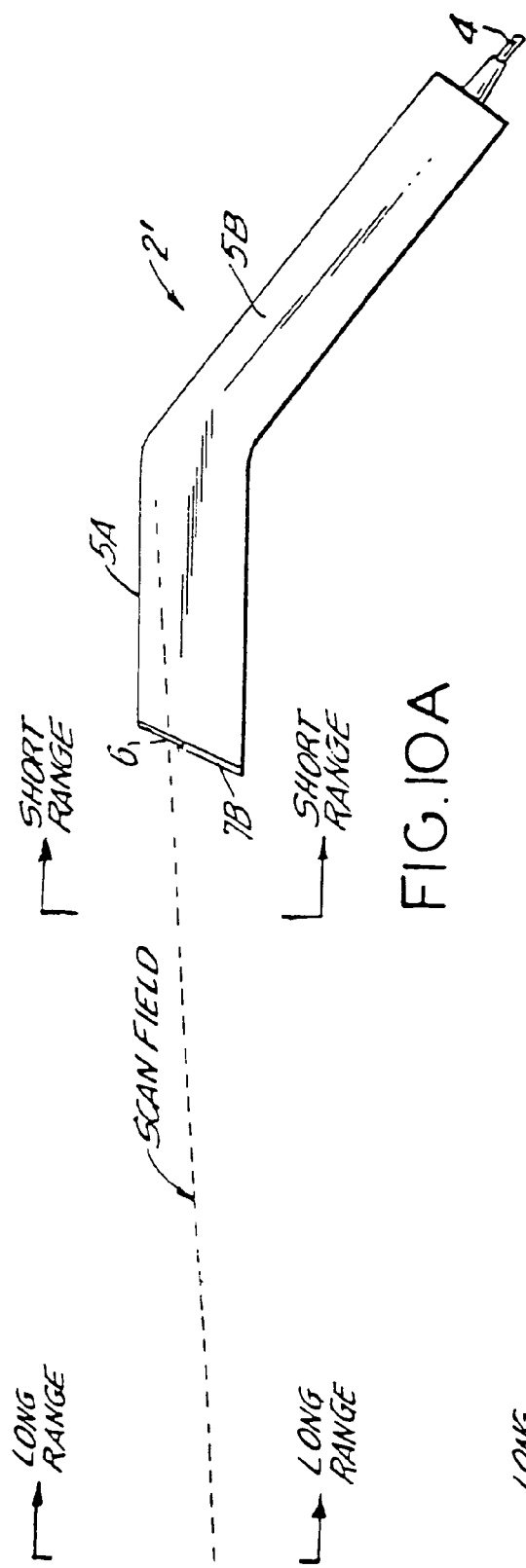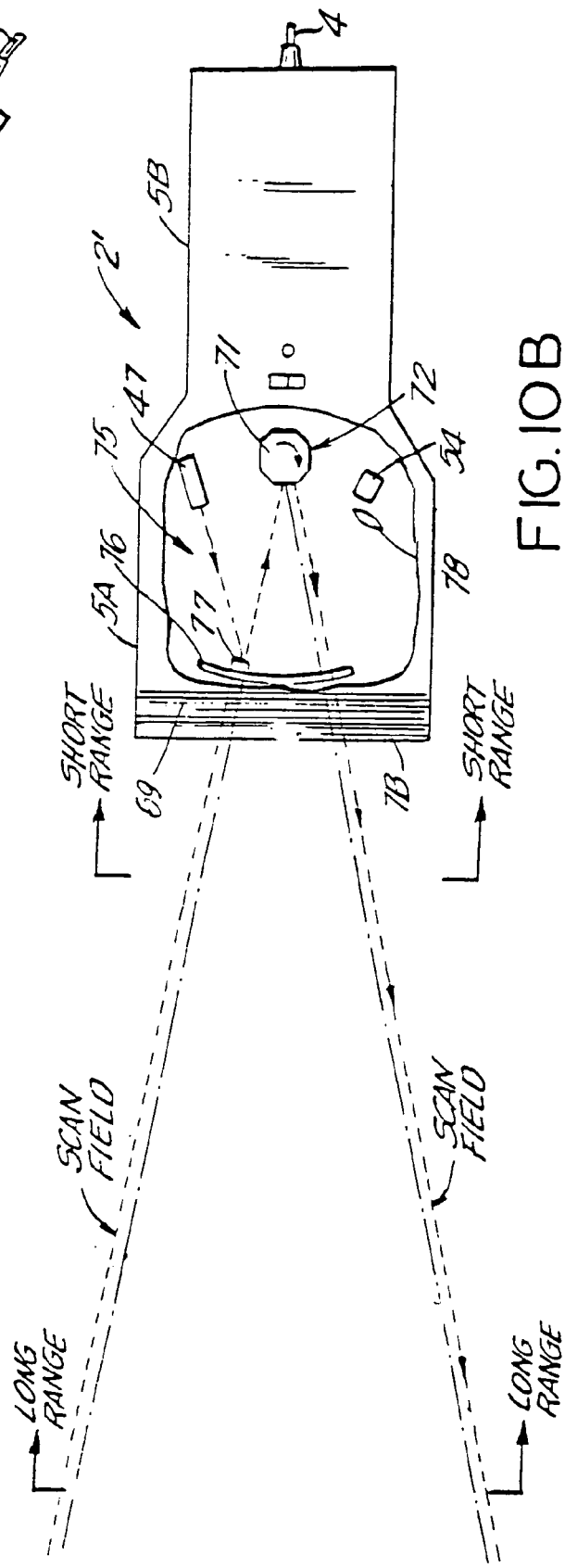

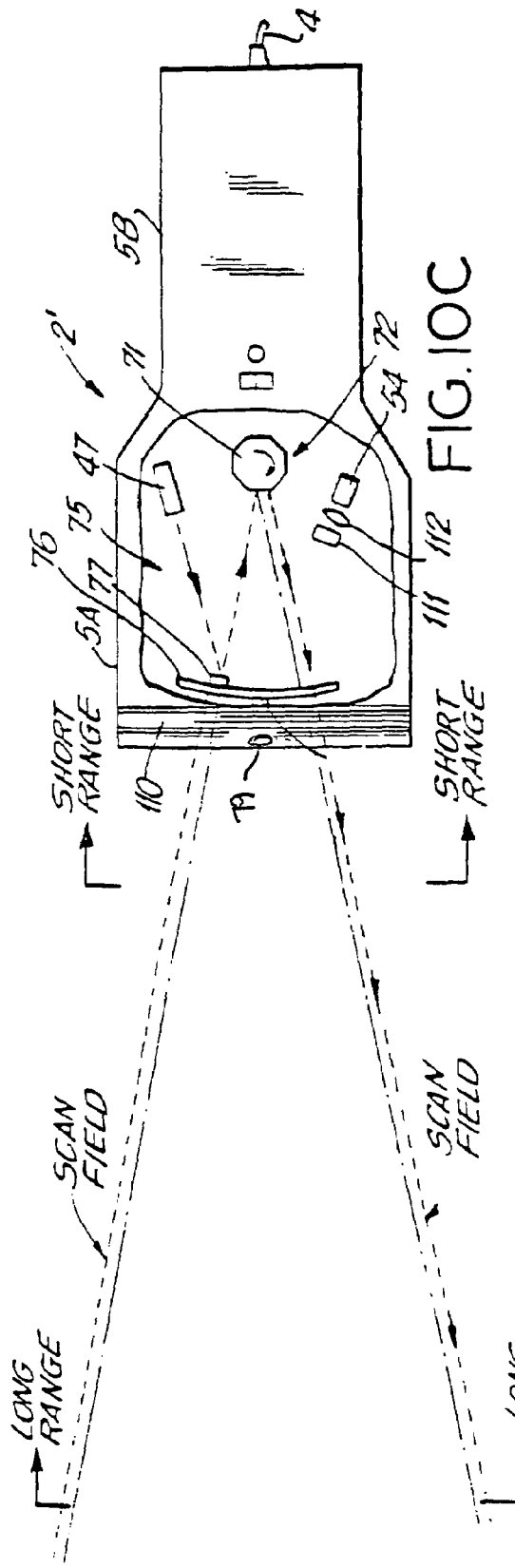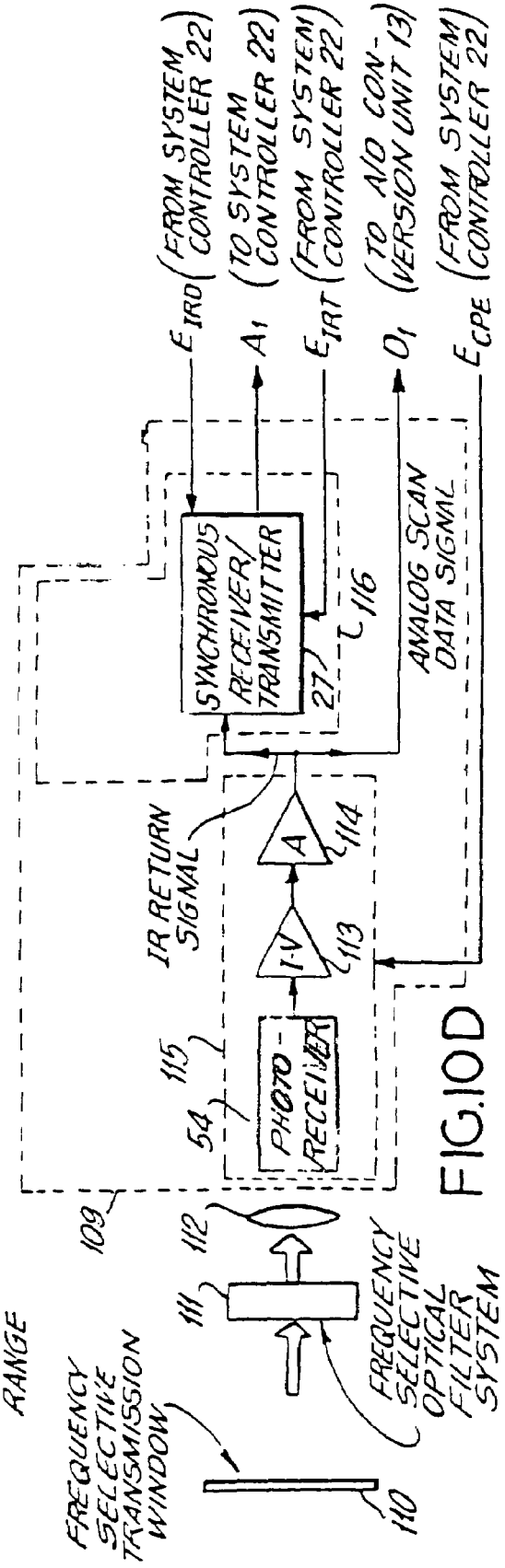

BAR CODE READER FOR AUTOMATICALLY DETECTING THE PRESENCE OF A BAR CODE USING LASER FLICKER

RELATED CASES

This is a Continuation of patent application Ser. No. 09/273,825, filed on Mar. 22, 1999 now U.S. Pat. No. 6,412,700, which is a Continuation of patent application Ser. No. 08/827,118, filed on Mar. 27, 1997, now issued as U.S. Pat. No. 5,925,870, which is a Continuation of patent application Ser. No. 08/584,135, filed on Jan. 11, 1996, now issued as U.S. Pat. No. 5,616,908, which is a Continuation of patent application Ser. No. 08/278,109, filed on Nov. 24, 1993, now issued as U.S. Pat. No. 5,484,992, which is a Continuation of Ser. No. 07/960,733, filed on Oct. 14, 1992, now abandoned, which is a Continuation-In-Part of Ser. No. 07/898,919, filed on Jun. 12, 1992, now issued as U.S. Pat. No. 5,340,973, which is a Continuation-In-Part of patent application Ser. No. 07/761,123, filed on Sep. 17, 1991, now issued as U.S. Pat. No. 5,340,971, which is a Continuation-In-Part of patent application Ser. No. 07/583,421, filed on Sep. 17, 1990, now issued as U.S. Pat. No. 5,260,553.

Patent application Ser. No. 09/273,825, filed on Mar. 22, 1999, is also a continaution of patent application Ser. No. 08/660,643, filed on Jun. 7, 1996, now issued as U.S. Pat. No. 5,886,337, which is a Continuation of patent application Ser. No. 08/293,493, filed on Aug. 19, 1994, now issued as U.S. Pat. No. 5,525,789, which is a Continuation of patent application Ser. No. 07/761,123, filed on Sep. 17, 1991, now issued as U.S. Pat. No. 5,340,971, which is a Continuation-In-Part of patent application Ser. No. 07/583,421, filed on Sep. 17, 1990, now issued as U.S. Pat. No. 5,260,553.

BACKGROUND OF THE INVENTION

1. Field of the Invention

The present invention relates generally to automatic code symbol reading systems, and more particularly, to laser bar code reading systems which permit fully automated operation while providing a high degree of simplicity and flexibility.

2. Brief Description of Background Art

Hitherto, a number of techniques have been proposed for reading bar code symbols using hand-held devices. Despite variety amongst prior art bar code symbol reading devices, the various techniques incorporated into prior art devices can be classified into two principally distinct classes, namely, manually operated or triggered bar code symbol reading, and automatic bar code symbol reading.

Representative of prior art manually operated bar code symbol reading devices are U.S. Pat. No. 4,387,297 to Swartz, et al., U.S. Pat. No. 4,575,625 to Knowles, and U.S. Pat. No. 4,845,349 to Cherry. While such prior art devices are capable of bar code symbol reading, they nevertheless suffer from several significant shortcomings and drawbacks. In particular, the user is required to manually pull a trigger or push a button each time symbol reading (i.e., scanning and decoding) is to be cyclically initiated and terminated. This requirement is most fatiguing on the user when large numbers of bar code symbols are to be read. Also, in certain symbol reading applications, such as warehouse inventory, pulling the trigger to initiate scanning of bar code symbols may be extremely difficult for the user due to the physical location of the objects bearing the bar code symbols.

An alternative to manually operated bar code symbol reading devices is automatic bar code symbol readers, which incorporate techniques for automatically initiating and terminating scanning and decoding operations. Representative of prior art automatic bar code symbol devices are U.S. Pat. No. 4,639,606 to Boles, et al. and U.S. Pat. No. 4,933,538 to Heiman, et al. While capable of automatically initiating scanning of bar code symbols, such prior art devices and incorporated techniques nevertheless also suffer from significant shortcomings and drawbacks.

In particular, U.S. Pat. No. 4,639,606 to Boles, et al. discloses laser emission control circuitry for use in implementing a hand-held triggerless bar code scanner. The laser is operated in a pulsed "find paper" mode until a reflected signal is obtained, indicating the presence of an object (e.g., paper) in the search field. Thereupon, the circuitry is changed to a "search mode" in which the power of the laser is increased to above the safety limits for a period of time, and the return signal is monitored for signal transitions corresponding to the black bars of the code. On detection of the first black bar, the circuitry is changed to an "in-code" (i.e., decode) mode as long as successive symbols are received within a given period of time. If the decode mode terminates within a predetermined time interval (e.g., one second after the beginning of the search mode), then the search mode is re-entered, otherwise the decode mode will change to find paper mode.

While the triggerless bar code symbol reader proposed in U.S. Pat. No. 4,639,606 possesses three modes of operation, this prior art bar code symbol reader nevertheless suffers from several significant shortcomings and drawbacks. In particular, this prior art bar code symbol reader requires continuous use of a pulsed laser beam to determine the presence of an object within the scan field, which, in hand-held portable battery power devices, undesirably drains limited power reserves, especially in extended time duration bar code reading applications. Also, this prior art device, not knowing whether a bar code symbol is actually present in the scan field, requires commencement of decode processing upon detection of the first black bar. Undesirably, this typically necessitates initializing a programmable device, such as a microprocessor, for decoding scan data that may likely contain no bar code symbol at all. Consequently, this characteristic of such prior art bar code symbol reading devices results in decreased responsiveness and versatility.

U.S. Pat. No. 4,933,538 discloses a bar code symbol reading system which, in the "object sensor mode", is triggerless and constantly emits a laser beam at a narrow angle and low power. When an indicia pattern indicative of a bar code symbol has been detected, the laser beam is widened and its power increased, for reading the entire symbol. While this prior art bar code reading system permits detection of bar code symbols within the scan field in order that the power of the laser beam may be automatically increased to a higher level for collecting scan data for use in decoding operations, this system also suffers from several significant shortcomings and drawbacks. In particular, it requires continuous use of laser emission to determine the presence of both objects and bar code symbols within the scan field, which necessarily results in drain of limited power reserves in portable battery power applications. In addition, the extensive use of a laser beam to perform object and bar code symbol detection functions implicates necessity for laser emission control measures.

Prior art automatic bar code symbol reading devices, such as the devices described above, suffer from other shortcomings and drawbacks. At the outset, consider manually operated scanners. These utilize a triggering mechanism that must be activated every time the user desires to read a bar code. But, if this process is somehow automated to eliminate the need for trigger activation, other potential problems are created. For example, prior art automatic bar code symbol reading devices lack the necessary intelligence capabilities to prevent undesired multiple reading of a bar code symbol, particularly when the scanning beam is permitted to dwell on a bar code symbol for an extended period of time.

Further, prior art automatic bar code symbol reading devices lack system control capabilities which permit diverse modes of operation and automatic reading of a plurality of consecutively different bar code symbols, while preventing misreads and inadvertent multiple reads of the same bar code symbol.

While prior art manually-triggered and prior art CCD (charge-coupled display)-type scanners have played an important role in the development of the bar code symbol industry, these devices, suffer from a number of shortcomings and drawbacks. For example, hand-held manually-actuated laser scanners, although portable and lightweight, are not always convenient to use particularly in applications where the user must read bar coded objects over an extended period of time. In many applications, where bar coded objects to be identified reside at arms length from the user's reach, hand-held CCD scanners are difficult to operate owing to their limited depth of field.

Unlike manually automated hand-held bar code scanners, fully automatic hand-held laser scanners do not cause fatigue due to their automatic operation. Also, owing to their extended depth of field, automatic hand-held laser scanners provide increased flexibility by allowing the user to read bar coded objects residing at distances of six or more inches away from the scanner. However, even though automatic hand-held laser bar code scanners offer superior performance in most scanning applications, it has been found that in intensely illuminated scanning environments, the user's ability to perceive the visible laser scanning beam is significantly diminished in the scan field of the device. Consequently, in such scanning environments, it is difficult to visually align (i.e. register) the laser scanning beam with the bar code symbol to be scanned, thus hindering the automatic bar code symbol reading process. While the use of a higher power visible laser beam might render the beam more easily perceptible, this approach is undesirable for laser safety and power consumption reasons.

Thus, there is a great need in the code symbol reading art for a fully automatic hand-holdable code symbol reading device which overcomes the above shortcomings and drawbacks of prior art devices and techniques.

OBJECTS AND SUMMARY OF THE INVENTION

Accordingly, it is one primary object of the invention to provide an automatic bar code symbol reading device which detects the presence of a bar code on an object situated within the scan field and, in response to such detection, proceeds to read the detected bar code symbol.

It is another object of the present invention to provide an automatic laser scanning device which utilizes the psychological and physiological response characteristics of the human visual system in order to produce a visible laser scanning beam that has improved user perceptibility over the scan field of the device.

A further object of the present invention is to provide an automatic laser scanning device in which a visible laser beam is pulsed at a sufficiently low frequency over the scan field during a bar code presence detection mode of operation, so as to increase the visual conspicuousness of the laser scanning beam.

It is another object of the present invention to provide a fully automatic, hand-holdable bar code symbol reading device capable of automatically reading one or more bar code symbols in a consecutive manner without the above-described shortcomings and drawbacks of prior art devices.

It is another object of the present invention to provide such an automatic bar code symbol reading system in which one or more bar code symbols on an object can be consecutively read without requiring unnatural hand-movements of the automatic hand-supportable laser scanning device.

A further object of the present invention is to provide an automatic hand-holdable bar code symbol reading device which is capable of collecting and detecting laser return light using collection optics and signal processing circuitry.

Another object of the present invention is to provide a hand-holdable bar code symbol reading device which is capable of distinguishing between a bar code symbol and a regular pattern of light and dark areas such as that formed by printed characters, and to only enable bar code symbol reading operations upon the detection of a bar code symbol in the scan field of the device.

An even further object of the present invention is to provide an automatic bar code symbol reading device which prevents multiple reading of the same bar code symbol due to dwelling of scanning beam upon a bar code symbol for an extended period of time.

A further object of the present invention is to provide a method of automatically reading a plurality of bar code symbols in a consecutive manner.

A further object of the present invention is to provide an automatic hand-holdable bar code reading device wherein bar code presence detection can be either manually selected by the user, or automatically selected when the hand-holdable bar code reading device is placed within a support stand.

A further object of the present invention is to provide an automatic bar code reading device wherein bar code presence detection can be manually selected, or automatically selected upon decoding a predesignated bar code symbol.

It is a further object of the present invention to provide an automatic hand-holdable bar code reading device which has both long and short range modes of bar code presence detection, separately or simultaneously selectable for various bar code symbol reading applications, such as for example, bar code "menu" reading, counter-top projection scanning, charge coupled device (CCD) scanner emulation, and the like.

It is a further object of the present invention to provide an automatic hand-holdable bar code symbol reading device having a control system which has a finite number of states through which the device may pass during its automatic operation in response to diverse conditions detected within the scan field of the device.

It is a further object of the present invention to provide a portable hand-holdable data collection device, to,which the automatic bar code symbol reading device can be connected for supply of power and transmission and storage of symbol character data, collected during portable bar code symbol reading applications in, for example, retail, industrial and manufacturing environments where freedom of bar code scanner movement and flexibility are important considerations.

It is yet a further object of the present invention to provide a portable, fully automatic hand-holdable bar code reading system which is compact, simple to use and versatile.

Yet a further object of the present invention is to provide an improved method of automatically reading bar code symbols.

These and further objects of the present invention will become apparent hereinafter and in the claims.

BRIEF DESCRIPTION OF THE DRAWINGS

For a more complete understanding of the objects of the present invention, the Detailed Description of Illustrated Embodiments may be taken in connection with the drawings, wherein:

FIG. 3A is an elevated side view of the bar code reading device of the first embodiment of the present invention, illustrating the spatial relationship of the scan field of the device, and the long and short range of programmed bar code presence detection of the first illustrative embodiment.

FIG. 3B is a plan view of the automatic bar code reading device of the first embodiment of the invention, taken along line 3B of FIG. 3A, which also illustrates the spatial relationship between the scan field of the device and the long and short ranges of bar code presence detection of the illustrative embodiment.

FIGS. 8A, 8B, and 8C set forth perspective views of an illustrative bar code scanner configured to provide adjustable long and short range modes of bar code symbol presence detection.

FIG. 10A is an elevated side view of an automatic bar code reading device constructed pursuant to a second preferred embodiment of the invention, illustrating the spatial extent of the scan field for bar code presence detection, and also the extent of the long and short range detection regions.

FIG. 10B is a partially cut away plan view of the device of FIG. 10A, showing various operative components thereof.

FIG. 10C is a partially cut away plan view of an alternative embodiment of the invention showing the layout of an illustrative optical signal processing system.

FIG. 10D is a schematic diagram representative of the optical signal processing system employed by the bar code symbol reading device of FIG. 10C.

DETAILED DESCRIPTION OF ILLUSTRATED EMBODIMENTS

Figure 1:
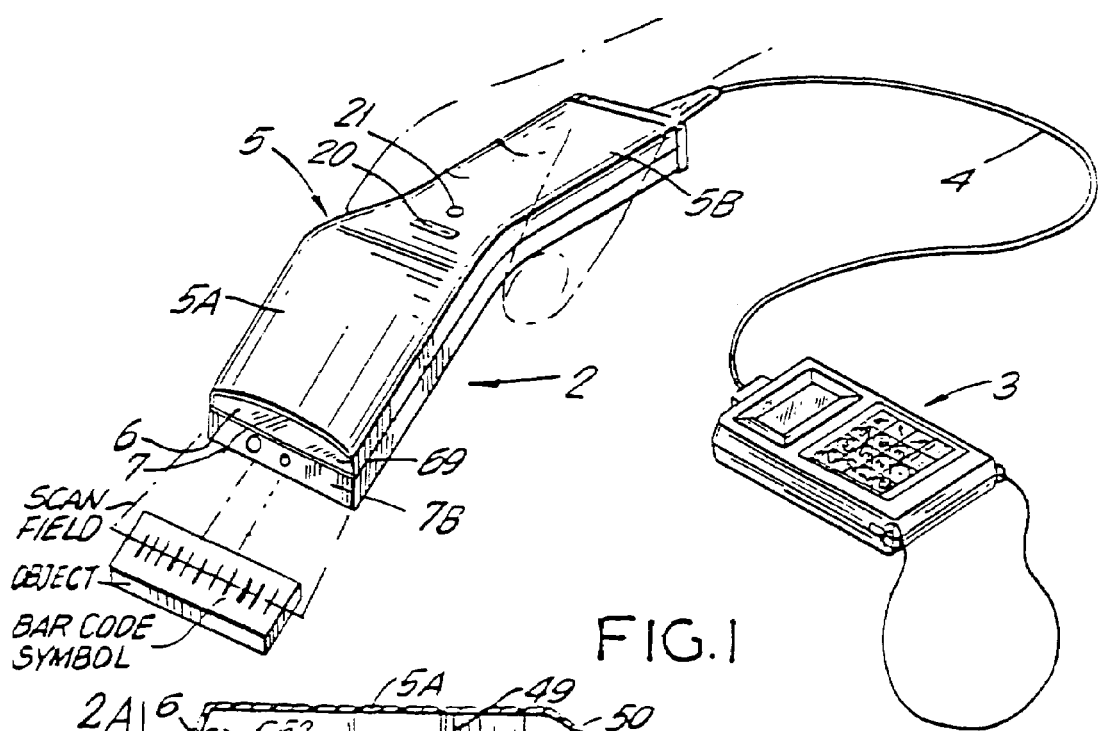
FIG. 1 is a perspective view of an automatic hand-holdable laser bar code symbol reading device constructed in accordance with the principles of the present invention.

Refer now to FIG. 1, which illustrates a first embodiment of the portable automatic bar code symbol reading system of the present invention. As shown, automatic bar code symbol reading system 1 comprises an automatic bar code symbol reading device 2 operably associated with a hand-holdable data collection device 3. Operable interconnection of bar code symbol reading device 2 and data collection device 3 may be achieved, for example, by mechanism of a flexible multi-wire connector cord 4 extending from bar code symbol device 2 and plugged directly into the data-input communications port of the data collection device 3. Alternatively, fiber optic cable could be employed, and/or a wireless communication link may be provided via use of one-way or two-way RF (radio frequency) or IR (infrared) transceivers, receiver, and/or transmitters.

Referring now to FIGS. 1, 2, 2A, 3A and 3B, an automatic bar code symbol reading device 2 constructed in accordance with a first illustrative embodiment of the invention comprises a lightweight hand-holdable housing 5 which has a head portion 5A that continuously extends into a contoured handle portion 5B at an obtuse deflection angle α which can be in the range of 150 to about 170 degrees. In one preferred embodiment, deflection angle α is about 160 degrees. This ergonomic housing design may be sculpted (i.e., form-fitted) using a typical or average human hand as a model. In this manner, scanning is rendered as easy and effortless as a wave of the hand, while the risk of musculoskeletal disorders, such as carpal tunnel syndrome, is substantially reduced. Such disorders could potentially result from repeated biomechanical stress associated with pointing prior art gun-shaped scanners at a bar code, squeezing the trigger to activate the scanning beam, and then releasing the trigger.

As illustrated in FIGS. 1 through 3B, the head portion of housing 5 has a transmission aperture 6 formed in upper portion of front panel 7, to permit desired optical radiation to exit and enter the housing, as will be described in detail hereinafter. The lower portion of front panel 7B is optically opaque, as are all other surfaces of the hand-holdable housing.

As illustrated in FIGS. 1, 3A and 3B in particular, automatic bar code reading device 2 generates a scan field external to the hand-holdable housing, in order to carry out automatic bar code symbol reading according to the principles of the present invention. Specifically, a scan field, indicated by broken and dotted lines, is provided externally to the housing for detecting the presence of a bar code symbol, and, once detected, for scanning the detected symbol. The scan field has at least one scanning plane of essentially planar extent. Such scanning is achieved by controlling a beam of light, such as a laser beam.

In order to scan a bar code symbol on an object within the scan field, a light beam is generated within the head portion of the housing and scanned through the transmission aperture across the scan field. With reference to FIG. 1, at least a portion of the scanned light beam will be reflected off a bar code symbol situated in the scan field. This portion of the light beam is directed back towards and through the transmission aperture 6 for collection, detection and subsequent processing in a manner which will be described in detail hereinafter.

Figure 4:
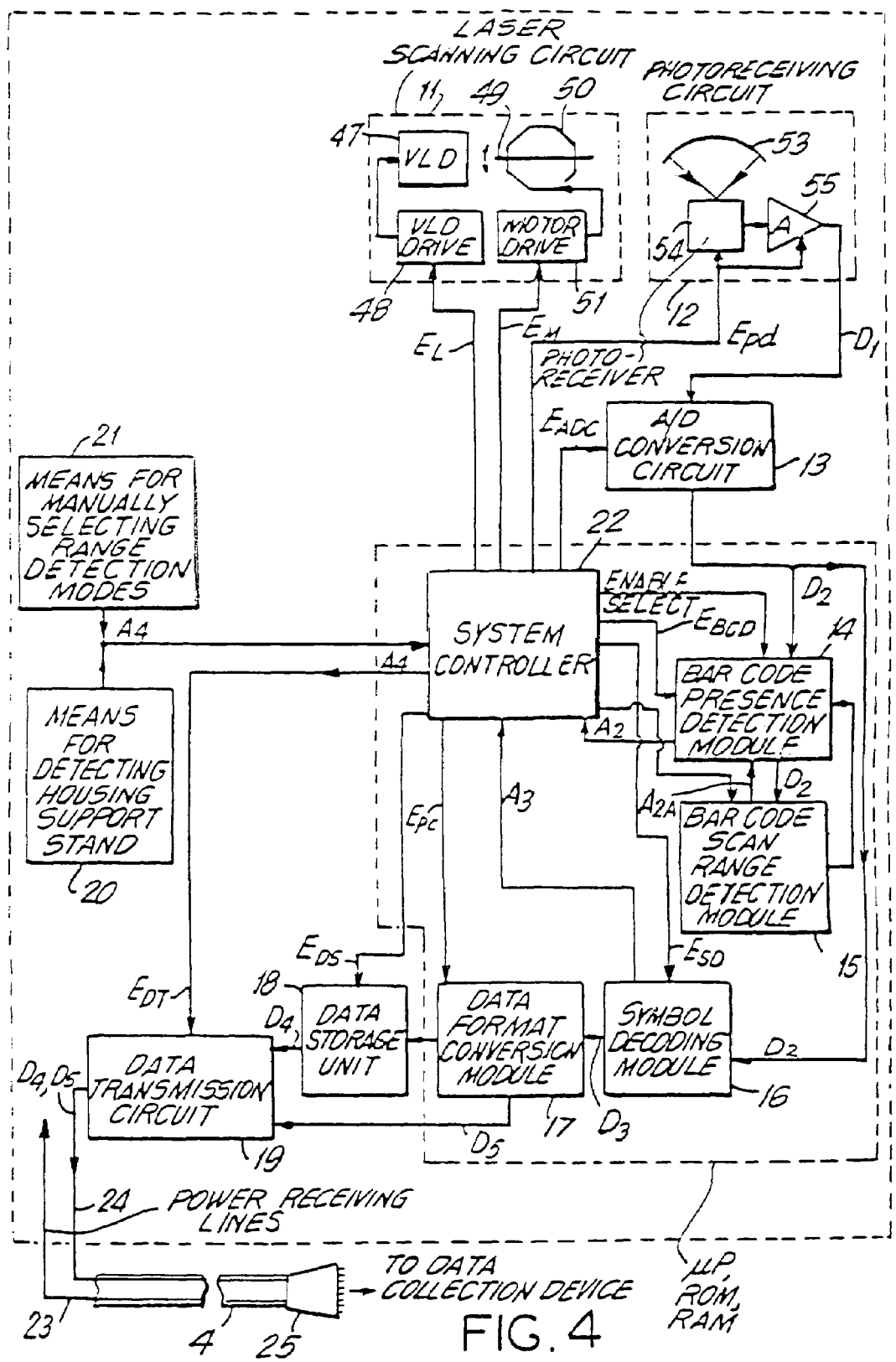
FIG. 4 is block functional system diagram of the automatic bar code symbol reading device of the first embodiment of the present invention, illustrating the principal components of the device integrated with the control system thereof.

FIG. 4 is a hardware block diagram setting forth various operative elements which may be utilized by a bar code scanning device to provide the scan field depicted in FIGS. 3A and 3B. These elements may be positioned within any of the hand-holdable housings shown in FIGS. 1–3B. As illustrated in FIG. 4, scanning mechanism 11 comprises a light source 47 which, in general, may be any source of intense light suitably selected for maximizing the reflectivity from the object's surface bearing the bar code symbol. In the illustrative embodiment, light source 47 comprises a solid-state visible laser diode (VLD) which is driven by a conventional driver circuit 48. In the illustrative embodiment, the wavelength of laser light produced from laser diode 47 is about 670 nanometers. In order to scan the laser beam output from laser diode 47 over a scan field having a predetermined spatial extent in front of the head portion of the housing, a planar scanning mirror 49 can be oscillated back and forth by a stepper motor 50 driven by a conventional driver circuit 51, as shown. However, one of a variety of conventional scanning mechanisms may be alternatively used with excellent results.

To selectively activate laser light source 47 and scanning motor 50, the system controller provides laser diode enable signal $E_L$ and scanning motor enable signal $E_M$ as input to driver circuits 48 and 51, respectively. When enable signal $E_L$ is a logical "high" level (i.e., $E_L=1$), a laser beam is generated, and when $E_M$ is a logical high level the laser beam is scanned through the transmission aperture and across the scan field. When an object such as product bearing a bar code symbol is within the scan field at the time of scanning, the laser beam incident thereon will be reflected. This will produce a laser light return signal of variable intensity which represents a spatial variation of light reflectivity characteristic of the spaced apart pattern of bars comprising the bar code symbol. Photoreceiving circuit 12 is provided for the purpose of detecting at least a portion of laser light of variable intensity, which is reflected off the object and bar code symbol within the scan field. Upon detection of this scan data signal, photoreceiving circuit 12 produces an analog scan data signal $D_1$ indicative of the detected light intensity.

In the illustrated embodiments, photoreceiving circuit 12 generally comprises scan data collection optics 53, which focus optical scan data signals for subsequent detection by a photoreceiver 54 having, mounted in front of its sensor, a wavelength selective filter 150 which only transmits optical radiation of wavelengths up to a small band above 670 nanometers. Photoreceiver 54, in turn, produces an analog signal which is subsequently amplified by preamplifier 55 to produce analog scan data signal $D_1$. In combination, scanning mechanism 11 and photoreceiving circuit 12 cooperate to generate scan data signals from the scan field, over time intervals specified by the system controller. As will be illustrated hereinafter, these scan data signals are used by bar code presence detection module 14, bar code scan range detection module 15 and symbol decoding module 16.

As illustrated in FIG. 4, analog scan data signal $D_1$ is provided as input to A/D conversion circuit 13. As is well known in the art, A/D conversion circuit 13 processes analog scan data signal $D_1$ to provide a digital scan data signal $D_2$ which resembles, in form, a pulse width modulated signal, where logical "1" signal levels represent spaces of the scanned bar code symbol and logical "0" signal levels represent bars of the scanned bar code symbol. A/D conversion circuit 13 can be realized by any conventional A/D chip. Digitized scan data signal $D_2$ is provided as input to bar code presence detection module 14, bar code scan range detection module 15 and symbol decoding module 16.

The purpose and function of bar code presence detection module 14 is to determine whether a bar code is present in or absent from the scan field over time intervals specified by the system controller. When a bar code symbol is detected in the scan field, the bar code presence detection module 14 automatically generates second control activation signal $A_2$ (i.e., $A_2=1$) which is provided as input to the system controller, as shown in FIG. 4. Preferably, bar code presence detection module 14 is realized as a microcode program carried out by the microprocessor and associated program and buffer memory, described hereinbefore. The function of the bar code presence detection module is not to carry out a decoding process but rather to simply and rapidly determine whether the received scan data signals produced during bar code presence detection, represent a bar code symbol residing within the scan field. There are many ways in which to achieve this through a programming implementation. In the preferred embodiment, the aim of bar code presence detection module 14 is to simply detect a bar code symbol "envelope". This is achieved by first processing a digital scan data signal $D_2$ so as to produce digitized "count" data and digital "sign" data. The digital count data is representative of the measured time interval (i.e., duration) of each signal level between detected signal level transitions which occur in digitized scan data signal $D_2$. The digital sign data, on the other hand, indicates whether the signal level between detected signal level transitions is either a logical "1", representative of a space, or a logical "0", representative of a bar within a bar code symbol. Using the digital count and sign data, the bar code presence detection module then determines in a straightforward manner whether or not the envelope of a bar code symbol is represented by the collected scan data. When a bar code symbol envelope is detected, the bar code symbol presence detection module provides second control activation signal $A_2=1$ to the system controller. As will be described in greater detail hereinafter, second control activation signal $A_2=1$ causes the device to undergo a transition from the bar code presence detection state to the bar code symbol reading state.

The bar code presence detection module is provided with two different modes of operation, namely, a long range mode of bar code presence detection and a short range mode of bar code presence detection. As shown in FIG. 4, these modes are set by the system controller using mode select enable signals $E_{IRT}=0$ and $E_{IRT}=1$, respectively. When induced into the long range mode of operation, the bar code presence detection module will generate second control activation signal $A_2=1$ whenever the envelope of a bar code symbol has been detected, despite the particular distance the bar code is from the transmission aperture. When induced into the short range mode of operation, the bar code presence detection module will generate second control activation signal $A_2=1$ when the envelope of a bar code symbol has been detected and only if the associated count (i.e., timing) data indicates that the detected bar code resides within the short range predetermined for bar code presence detection. Notably, the long range specification for bar code presence detection is preselected to be the entire operative scanning range available to the device. In an illustrated embodiment, this range can be from about 0 to about 10 inches from the transmission aperture, depending on the optics employed in the scanning mechanism. This range is schematically indicated in FIGS. 3A and 3B.

Pursuant to one preferred embodiment, the short range specification for bar code presence detection is preselected to be the same range selected for short range object detection (e.g., approximately 0 to about 3 inches from the transmission aperture), as indicated in FIGS. 3 and 3A. As will become apparent hereinafter, the inherently limited depth of field and width of field associated with the short range mode of bar code symbol detection prevents scanning mechanism 11 and bar code symbol detection module 14 from actuating the reading of undesired bar code symbols in the scan field.

Unlike the bar code symbol presence detection module, the purpose and function of the bar code scan range detection module is not to detect the presence of a bar code symbol in the scan field, but rather to determine the range that a detected bar code symbol resides from the transmission aperture of the bar code symbol reading device. This data processing module operates upon digitized scan data signal $D_2$ collected from a bar code symbol which has been previously detected by the bar code symbol presence detection module. In the preferred embodiment, bar code scan range detection module 15 analyzes digital count data produced by the bar code presence detection module, and determines at what range (i.e., distance) a detected bar code symbol resides from the transmission aperture. This determination then permits the scan range detection module to determine whether the detected bar code symbol is located within the prespecified long or short range of the scan field, as measured from the transmission aperture. As will be explained hereinafter in greater detail, this information is used by the bar code presence detection module (i.e., when induced into its short range mode of operation), to determine whether second control activation signal $A_2=1$ should be provided to the system controller. Upon the occurrence of this event, the bar code symbol reading device is caused to undergo a transition from the bar code symbol presence detection state to bar code symbol reading.

The function of symbol decoding module 16 is to process, scan line by scan line, the stream of digitized scan data $D_2$, in an attempt to decode a valid bar code symbol within a predetermined time period allowed by the system controller. When the symbol decoding module successfully decodes a bar code symbol within the predetermined time period, symbol character data $D_3$ (typically in ASCII code format) is produced corresponding to the decoded bar code symbol. Thereupon a third control activation signal $A_3=1$ is produced by the symbol decoding module and is provided to the system controller in order to perform its system control functions.

Figure 7:
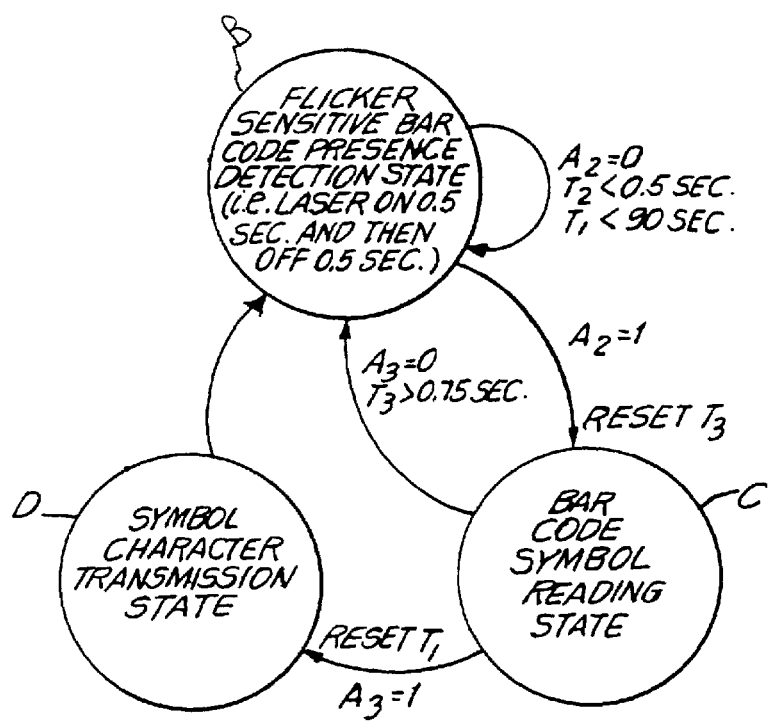
FIG. 7 is a logic state diagram setting forth interrelationships among a plurality of operational states for the automatic bar code symbol reading device of the illustrative embodiment.

Having described the detailed structure and internal functions of the automatic bar code reading device of the illustrative embodiment, the operation of its system controller will now be described with reference to the laser beam intensity versus time characteristic shown in FIG. 5, the software flowchart of FIGS. 6A–6F, and the logic state diagram of FIG. 7. Refer first to FIGS. 6A–6F. Beginning at the START block of the Main System Control Routine No. 1 shown in FIGS. 6A–6F and proceeding to Block A, bar code symbol reading device 2 is initialized. This involves continuously activating (i.e., enabling) the system controller. The system controller, on the other hand, deactivates (i.e., disables) the remainder of activatable system components, e.g., laser diode 47, scanning motor 50, photoreceiving circuit 12, A/D conversion circuit 13, bar code presence detection module 14, bar code scan data range detection module 15, symbol decoding module 16, data format conversion module 17, data storage unit 18, and data transmission circuit 19. All timers $T_1$, $T_2$, $T_3$, $T_4$ and $T_5$ maintained by the system controller are reset to $t=0$.

Proceeding to Block C, timer $T_1$ is started and is permitted to run for a preset time period, e.g., O (less than or equal to) $T_1$ (less than or equal to) 3 seconds, and timer $T_2$ is started and permitted to run for a preset time period 0.1 (less than or equal to) $T_2$ (less than or equal to) 5 seconds. Proceeding to Block D, the system controller activates laser diode 47, scanning motor 50, photoreceiving circuit 12, A/D conversion circuit 13 and bar code presence detection module 14 in order to collect and analyze scan data signals for the purpose of determining whether or not a bar code is within the scan field.

Next, at Block E, the system controller checks to determine whether control activation signal $A_2=1$ is received from bar code presence detection module 14 within time period $t<T_1=3$ seconds. If activation control signal $A_2=1$, is not received within this period, indicative that a bar code is not within the scan field, then the system controller proceeds to Block F. At Block F, the system controller deactivates laser diode 47, scanning motor 50, photoreceiving circuit 12, A/D conversion circuit 13 and bar code presence detection module 14. Then the system controller returns to the START block.

If, however, the system controller receives control activation signal $A_2=1$ within a time period given by O (less than or equal to) $T_1$ (less than or equal to) 3 seconds, indicative that a bar code has been detected, then the system controller proceeds to Block H. As will be described hereinafter, this represents a state transition from bar code presence detection to bar code reading. Proceeding to Block H, the system controller continues activation of laser diode 47, scanning motor 50, photoreceiving circuit 12, and A/D conversion circuit 13, and commences activation of symbol decoding module 14. At this stage, fresh bar code scan data is collected and is subject to decode processing. At essentially the same time, at Block I, the system controller starts timer $T_3$ to run for a time period O (less than or equal to) $T_3$ (less than or equal to) 1 second.

As indicated at Block J, the system controller checks to determine whether control activation signal $A_3=1$ is received from the symbol decoding module 16 within $T_3=1$ second, indicative that a bar code symbol has been successfully read (i.e., scanned and decoded) within the allotted time period. If control activation signal $A_3$ is not received within the time period $T_3=1$ second, then at Block K the system controller checks to determine whether control activating signal $A_2=1$ is received within a time period given by O (less than or equal to) $T_3$ (less than or equal to) 3 seconds. If a bar code symbol is not detected within this time period $T_3$, then the system controller proceeds to Block L to deactivate laser diode 47, scanning motor 50, photoreceiving circuit 12, A/D conversion circuit 13, bar code presence detection module 14 and symbol decoding module 16. Notably, this event causes a state transition from bar code reading to bar code presence detection. Thereafter, the system controller returns to the START block, as shown.

If however, at Block K, the system controller receives control activation signal $A_2=1$, indicative that a bar code once again is within the scan field, then the system controller checks to determine whether time period $T_2$ has elapsed. If it has, then the system controller proceeds to Block L and then to the START block. If, however, a time period given by O (less than or equal to) $T_2$ (less than or equal to) 5 seconds has not elapsed, then the system controller resets timer $T_3$ to run once again for a time period 0 (less than or equal to) $T_3$ (less than or equal to) 1 second. In essence, this provides the device at least another opportunity to read a bar code present within the scan field when the system controller is at control Block J.

Upon receiving control activation signal $A_3=1$ from symbol decoding module 16, indicative that a bar code symbol has been successfully read, the system controller proceeds to Block O. At this stage of the system control process, the system controller continues to activate laser diode 47, scanning motor 50, photoreceiving circuit 12 and A/D conversion circuit 13, while deactivating symbol decoding module 16 and commencing activation of data format conversion module 17, data storage unit 18 and data transmission circuit 19. These operations maintain the scanning of the laser beam across the scan field, while symbol character data is appropriately formatted and transmitted to data collection device 3, or a host device, by a conventional data communication process well known in the art.

After transmission of symbol character data to the host device is completed, the system controller enters Block P and continues activation of laser diode 47, scanning motor 50, photoreceiving circuit 12 and A/D conversion circuit 13, while deactivating symbol decoding module 16, data format-conversion module 18, data storage unit 18 and data transmission circuit 19. Next, at Block R the system controller activates bar code presence detection module 14. These events represent once again a state transition from the symbol character transmission state to the bar code symbol presence detection state.

At Block S, the system controller starts timer $T_4$ to run for a time period given by O (less than or equal to) $T_4$ (less than or equal to) 5 seconds, and timer $T_5$ to run for a time period O (less than or equal to) $T_5$ (less than or equal to) 3 seconds. Then, so as to determine whether a bar code symbol has been detected within the scan field, the system controller proceeds to Block T to check whether control activation signal $A_2=1$ is received. If this signal is not received with the time period O (less than or equal to) $T_5$ (less than or equal to) 5 seconds, indicative that no bar code symbol is present in the scan field, the system controller proceeds to Block U, at which it deactivates laser diode 47, scanning motor 50, photoreceiving circuit 12, A/D conversion circuit 13 and bar code presence detection module 14. Thereafter, the system controller returns to the START block, as shown.

If, however, at Block T control activation signal $A_2=1$ is received, indicative that a bar code symbol has been detected in the scan field, the system controller proceeds through Blocks W and X to reactivate the symbol decoding module and start timer $T_6$ to run for a time period O (less than or equal to) $T_6$ (less than or equal to) 1 second. These events represent a state transition from bar code symbol presence detection to bar code symbol reading. At Block Y, the system controller checks to determine whether control activation signal $A_3=1$ is received from signal decoding module 16 within time period O (less than or equal to) $T_6$ (less than or equal to) 1 second. If a bar code symbol is not successfully read within this 1 second time period, the system controller returns to Block T to form a first loop, within which the device is permitted to detect or redetect a bar code symbol within the time period O (less than or equal to) $T_4$ (less than or equal to) 5 seconds. If a bar code symbol is decoded within this time interval, the system controller determines at Block Z whether the decoded bar code symbol is different from the previously decoded bar code symbol. If it is different, then the system controller returns to Block O as illustrated, to format and transmit symbol character data as described hereinabove.

If, however, the decoded bar code symbol is not different than the previously decoded bar code symbol, then at Block AA the system controller checks to determine whether timer $T_4$ has lapsed. If it has not lapsed, the system controller returns to Block T to form a second loop, within which the device is permitted to detect or redetect a bar code symbol in the scan field and then successfully read a valid bar code symbol within the set time interval O (less than or equal to) $T_4$ (less than or equal to) 5 seconds. If, however, timer $T_4$ lapses, then the system controller proceeds to Block BB at which the system controller deactivates laser diode 47, scanning motor 50, photoreceiving circuit 12, A/D conversion circuit 13, bar code presence detection module 14, and symbol decoding module 16. Thereafter, the system controller returns to the START block.

Pursuant to the operational sequence of FIGS. 6A–6F, whenever the flicker sensitive bar code presence detection state is entered (corresponding to an activation of the bar code presence detection module by the system controller), the visible laser beam emitted from visible laser diode 50 comprises a plane of pulsed laser light which "flickers" or "blinks" at a flicker sensitivity rate $R_{FLICKER}$ equal to $1/T_{FLICKER}$, where $T_{FLICKER}$ equals $T_2+T_{Laseroff}$, $T_2$ equals the time length of timer $T_2$, and $T_{Laseroff}$ equals the time period that laser diode 50 is intermittently deenergized during the elapsed time period of timer $T_1$. During this bar code presence detection state, the flickering nature of the laser scanning beam significantly improves the user's visual perceptibility thereof as it is scanned across the detected object while the user attempts to visually register (i.e. align) the laser beam with the bars and spaces of a bar code symbol on the detected object. The improvement in the visual perceptibility of the flickering laser scanning beam is manifested by the fact that the flickering laser scanning beam is more visually conspicuous than a like laser beam of constant luminosity or intensity. This psychological and physiological phenomenon is due to the low frequency pulsed nature of the laser scanning beam.

While it is understood in the ophthamological art that the human visual system is more sensitive to light flickering below about 16 Hz than light of constant luminosity (i.e. intensity), no one in the bar code symbol scanning art has ever recognized or appreciated that this principle could be utilized to solve the visual perceptibility problem occurring in automatic hand-held laser bar code symbol scanners. The present invention solves the laser scanning beam perceptibility problem in a highly effective manner by applying the principle of "psychological and physiological flicker sensitivity" to the construction of the automatic laser bar code symbol scanner of the present invention. Specifically, by causing the intensity of the visible laser scanning beam to flicker at a rate $R_{FLICKER}$ greater than about 0.10 Hz and less than about 16 Hz, the visual conspicuousness of the laser scanning beam can be significantly improved, while advantageously decreasing the output power of laser diode 50.

Figure 5:
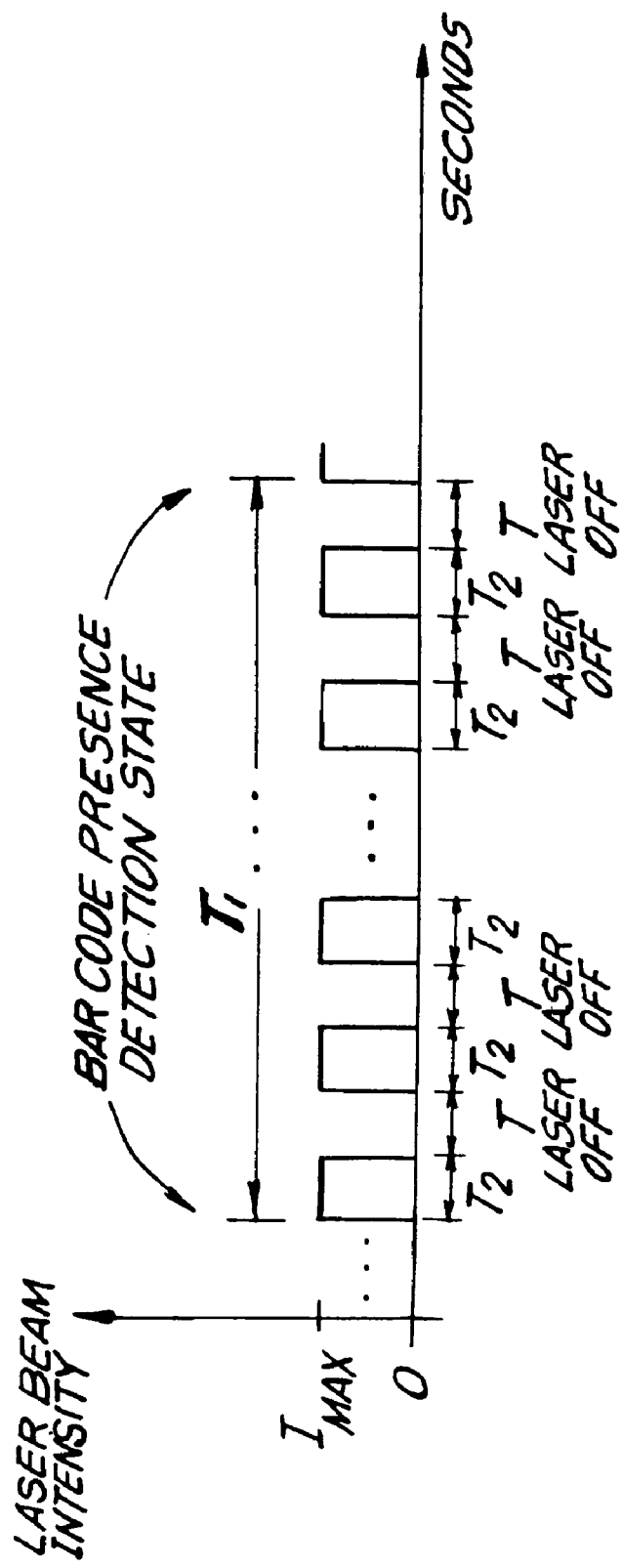
FIG. 5 is a graph showing laser beam intensity as a function of time as determined by the bar code presence detection module of the present invention.
Figure 6A:
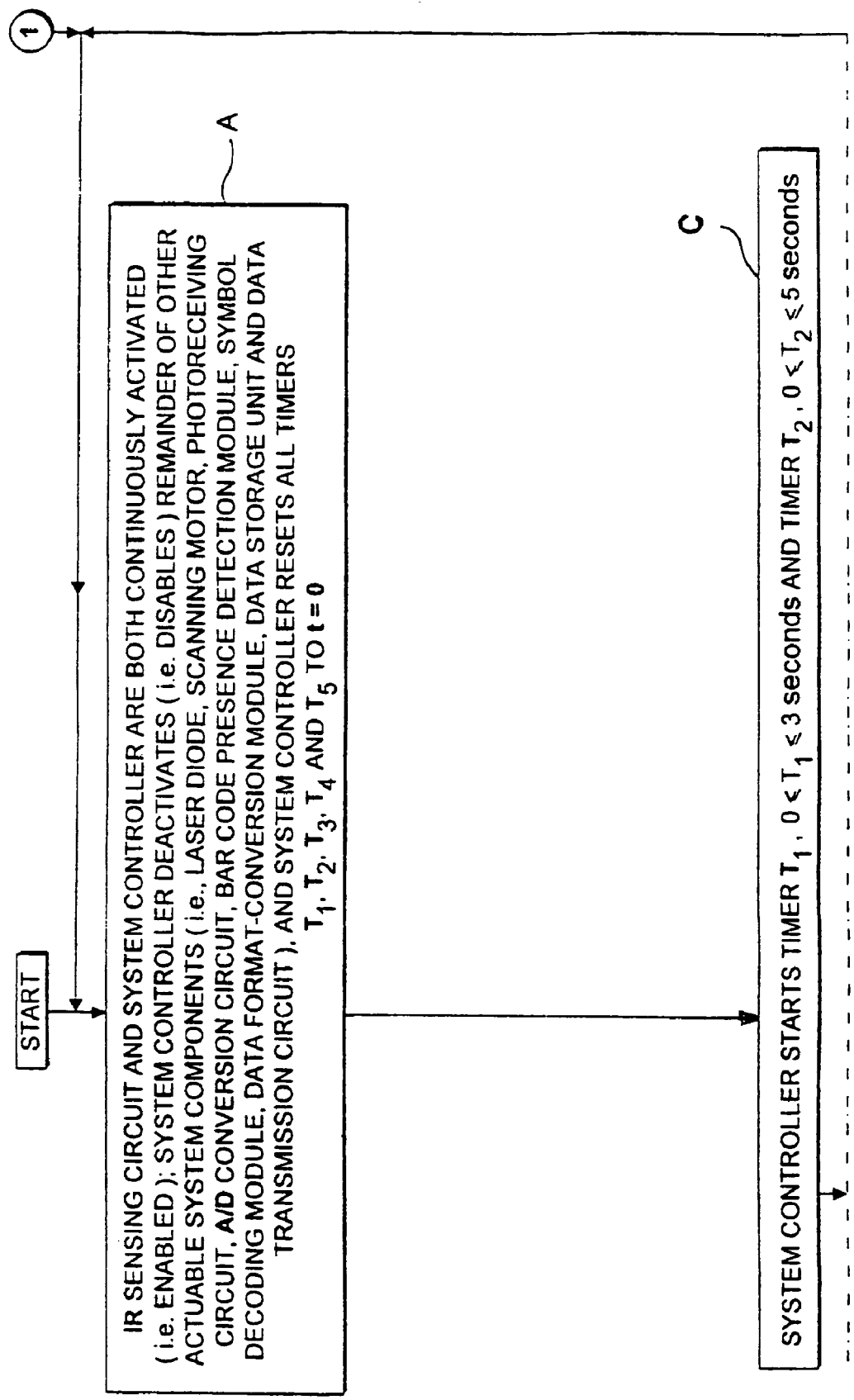
FIGS. 6A to 6E together comprise a high level flowchart of a system control program illustrating various courses of programmed system operation that the automatic bar code symbol reading device of the illustrative embodiment may undergo.
Figure 6B:
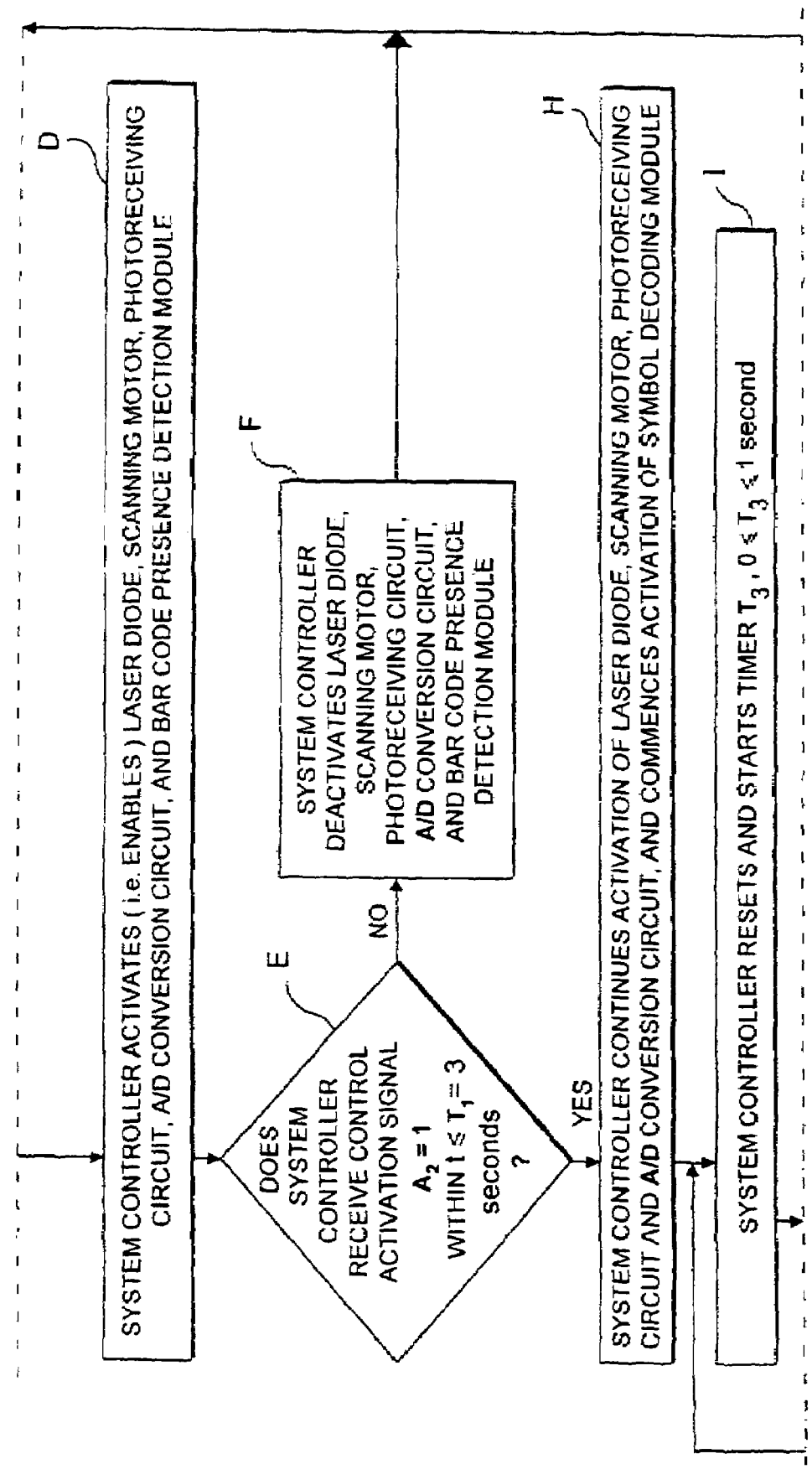
Figure 6C:
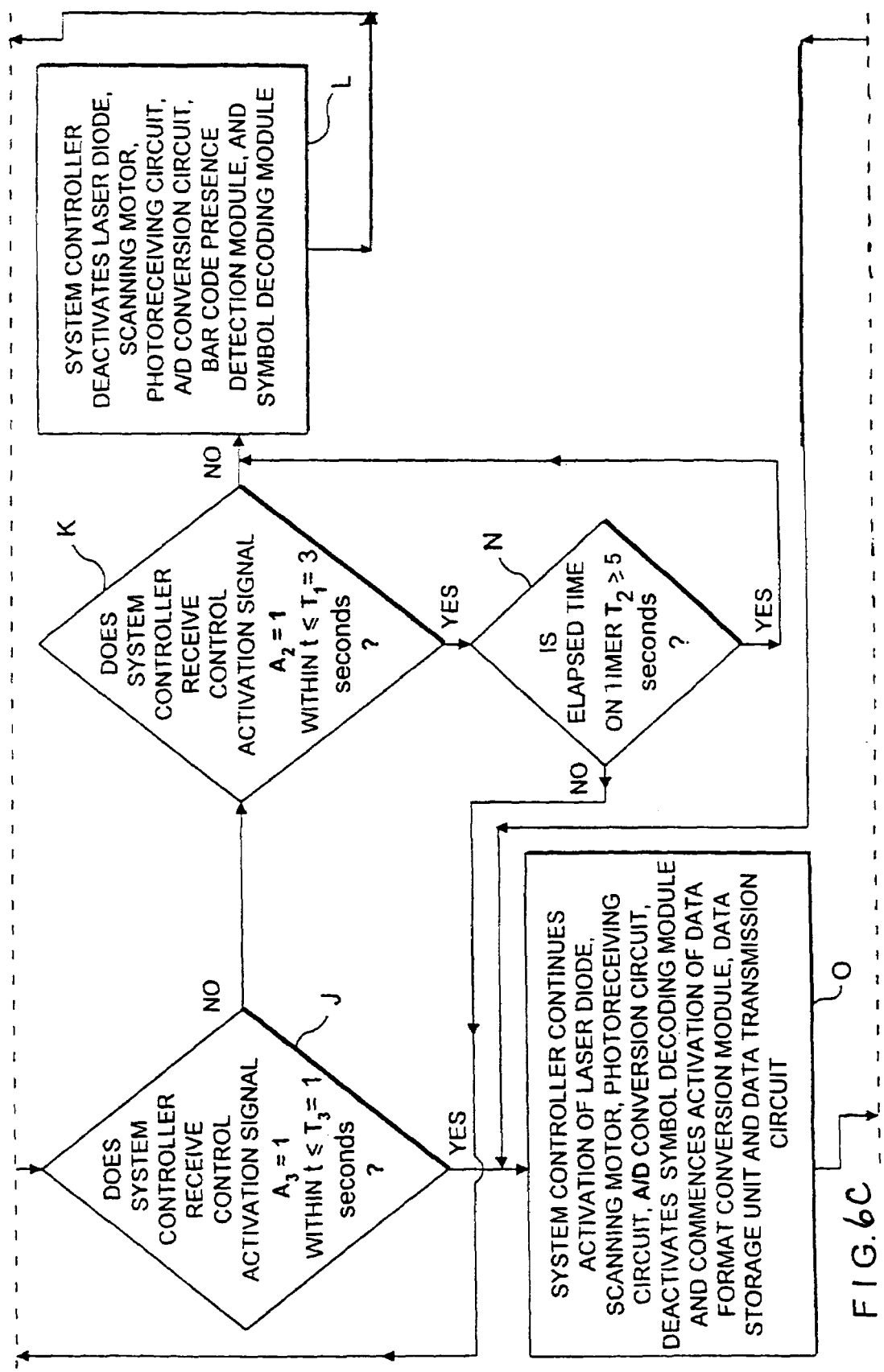
Figure 6D:
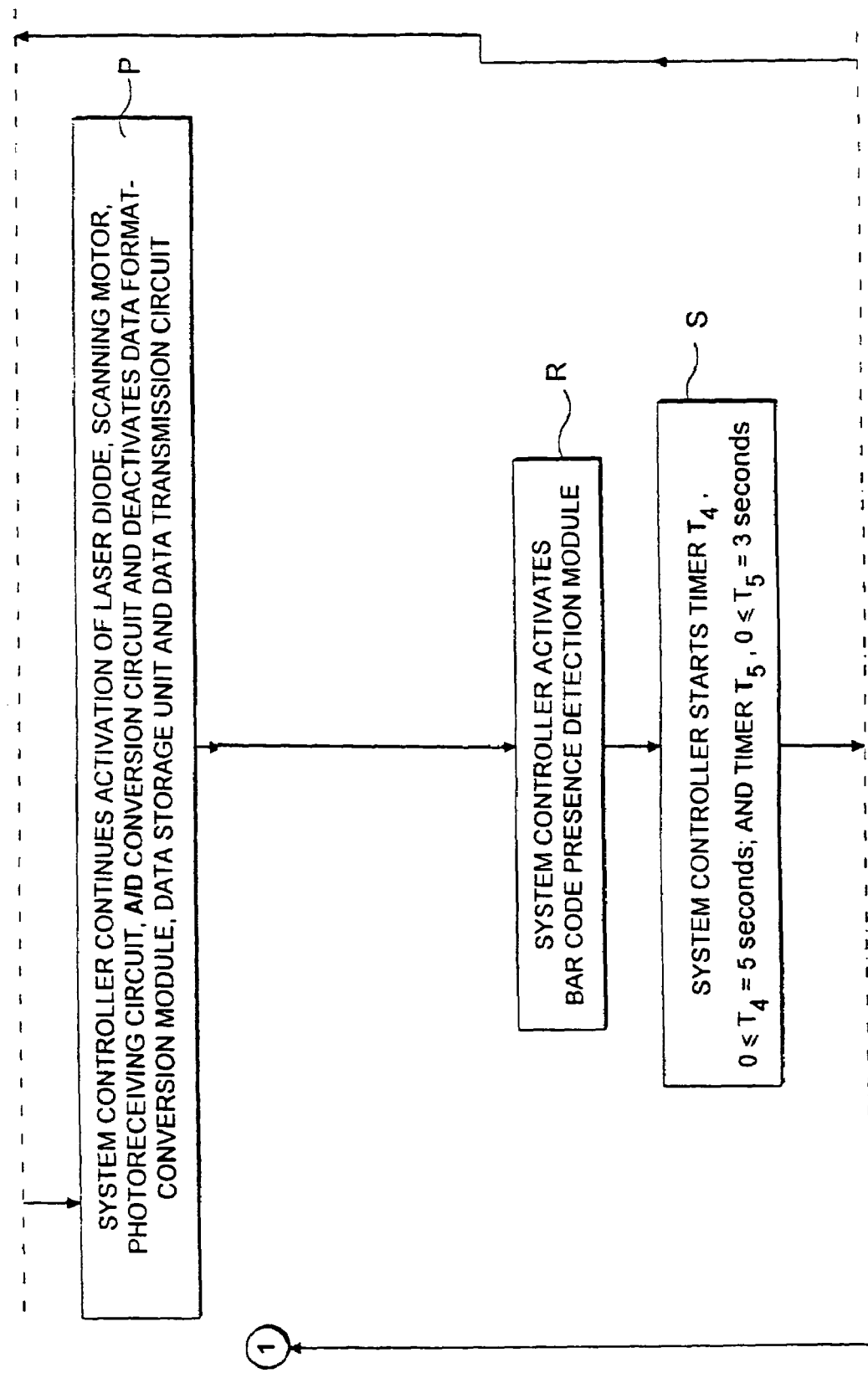
Figure 6E:
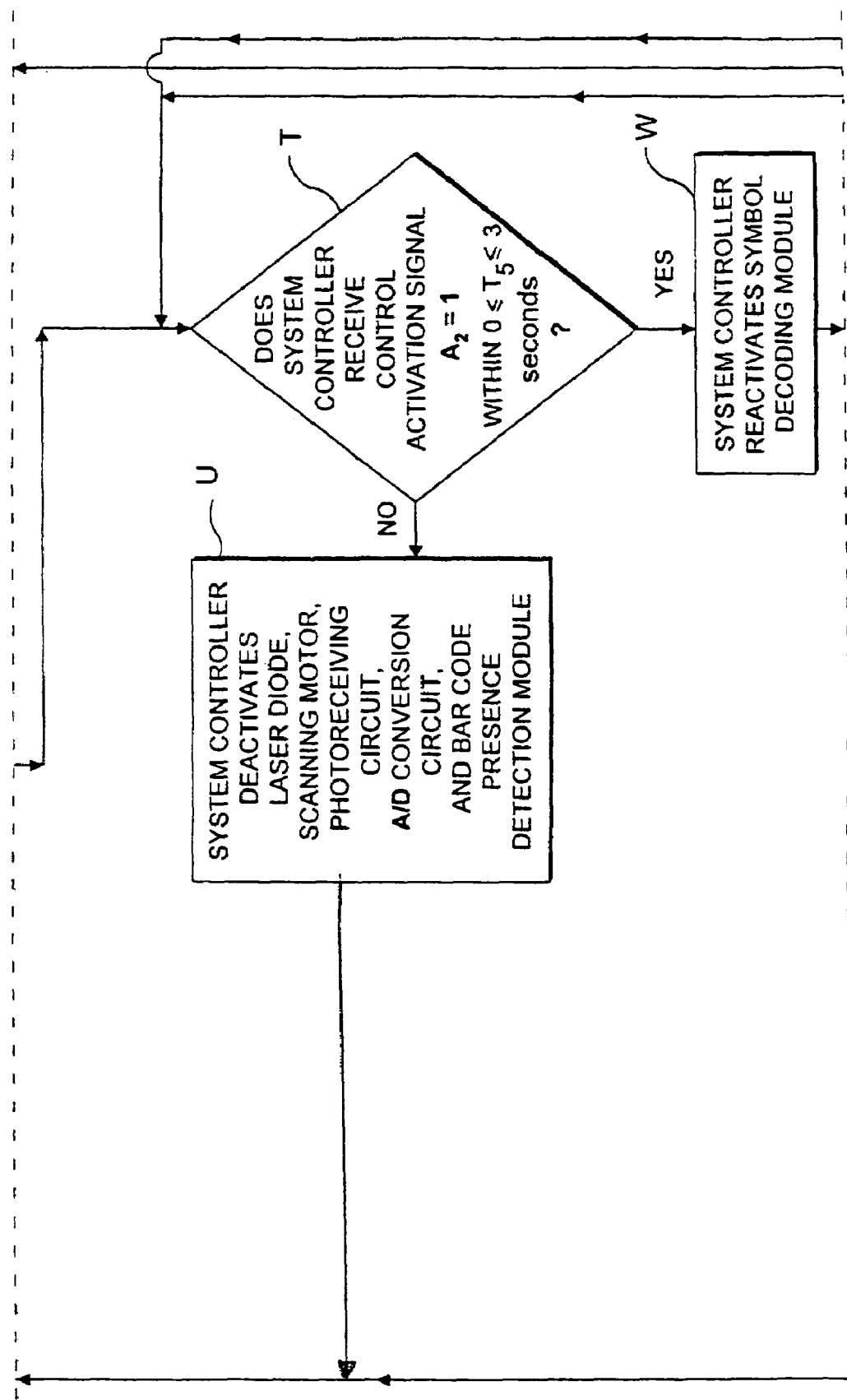

Refer now to FIG. 5, which is a graph showing laser beam intensity as a function of time as determined by the bar code presence detection module. In any particular embodiment of the present invention, the flicker frequency of the visible laser scanning beam can be selected using the following procedure. First, a value will be selected for time period $T_2$ which provides sufficient time for the bar code symbol reader to capture multiple lines of scan data from the bar code symbol. This selection will depend on the scanning velocity of the laser beam, the collection optics and data processing considerations. Then, for any selected value of $T_2$, the laser-off time period $T_{Laseroff}$ can be selected so that a desired value of $R_{FLICKER}$ within the range of about 0.1 to about 16 Hz, is obtained. Then by setting parameters $T_2$ and $T_{Laseroff}$ in the system controller, the desired flicker frequency will automatically be set within the automatic bar code symbol scanner.

Although specific values have been provided for timers $T_1$, $T_2$, $T_3$, $T_4$, and $T_5$ in FIGS. 6A–6F, it is to be clearly understood that these values have been recited for illustrative purposes only, as various other suitable values could be selected for these timers, based upon the requirements of specific or general system applications.

Having described the operation of the illustrative embodiment of the automatic hand-supportable bar code reading device of the present invention, it will be helpful to describe at this juncture the various conditions that cause state transitions to occur during operation. Refer now to FIG. 7, which is a state transition diagram prepared in accordance with the operational sequence of FIGS. 6A–6F. During operation, the bar code reading device is in one of three states: a flicker sensitive bar code presence detection state (B), a symbol character transmission state (C), and a bar code symbol reading state (D). These states are entered based upon the status of various timers and control activation signals, as was described above in connection with FIGS. 6A–6F. More specifically, transitions between the various states are indicated by directional arrows. Besides each set of directional arrows are transition conditions expressed in terms of control activation signals (e.g. $A_1$, $A_2$, and $A_3$), and where appropriate, state time intervals ($T_1$, $T_2$, $T_3$, $T_4$, and $T_5$). Conveniently, the state diagram of FIG. 7 expresses most simply the three basic operations occurring during the control flow within the system control program of FIGS. 6A–6F. Significantly, the control activation signals. $A_1$, $A_2$, and $A_3$ in FIG. 7 indicate which events within the scan field can operate to effect a state transition within the allotted time frame(s), where prescribed.

At the outset, the flicker-sensitive bar code presence detection state (state B) is engaged to determine the presence of a bar code in the scan field. Optionally, the system controller can be programmed to determine the presence of a bar code in a short-range mode of operation and/or a long-range mode of operation, as selected by the user, and/or based upon the presence or absence of the scanning device in an associated stand, and/or by scanning a special programming bar code symbol. During state B, the system controller activates bar code presence detection module 20 and bar code scan range detection module 21. Illustratively, a transition from the bar code presence detection state to the bar code symbol reading state may be allowed only if the detected bar code symbol resides within the short range portion of the scan field. This condition is satisfied by the scan range detection module determining whether or not the digital count data of the detected bar code symbol falls within a prespecified short-range count interval.

The operation of automatic hand-supportable bar code reading device 2 has been described in connection with a process that uses control activation signals $A_2$ and $A_3$. This system control routine operates on a basic assumptions concerning bar code symbol presence detection module 20. Specifically, the Main System Control Routine assumes that the bar code symbol presence detection module produces control activation signal $A_2=1$ whenever a bar code symbol is detected anywhere within the operative scanning range of the scan field. This assumption causes state transitions during the operation of the automatic bar code symbol reading device, when otherwise they may not be desired in particular applications. For example, in some applications it may not be desirable to automatically advance to the bar code symbol reading state until a detected bar code symbol is located within the short-range portion of the scan field. Also, it may not be desirable to automatically advance to the symbol character data storage/transmission state until a decoded bar code symbol is located within the short-range portion of the scan field. Thus, in some instances, it may be desirable to condition transition from (i) object detection to the bar code symbol detection state, (ii) the bar code symbol detection state to the bar code symbol reading state, and (iii) the bar code symbol reading state to the symbol character data storage/transmission state. Yet, in other instances, it may only be desirable to condition only one or two of these state transitions.

Refer now to FIGS. 1, 8A, 8B, and 8C which set forth perspective views of an illustrative bar code scanner configured to provide adjustable long and short range modes of bar code symbol presence detection. In order to select either the long or short range mode, bar code symbol reading device 2 is provided with both manual and automated mechanisms for effectuating such selections. In the manual mechanism, a manual switch (e.g., step button) 21 (FIG. 1) is mounted onto the top surface of the handle portion of the housing, so that long and short range modes of object detection can be simply selected by depressing this switch with ones thumb while handling the bar code reading device. The switch generates and provides mode activation signal $A_4$ to the system controller, which in turn generates the appropriate mode enable signal $E_{IRT}$.

In the automated mechanism, housing support stand detection mechanism 20, realized as a magnetic field sensing circuit, is operably associated with the system controller to automatically generate mode activation signal $A_4$, when the hand-holdable housing is not, for example, being supported within a housing support stand 57 (FIG. 8A) which bears a permanent magnetic 58 disposed in proximity with the housing support surfaces 59A and 59B, illustrated in FIGS. 8A to 8C. Preferably, a visual indicator light is provided to the housing to visually indicate the particular mode which has been selected manually or automatically.

In general, magnetic sensing circuit 20 comprises a magnetic flux detector 60, a preamplifier and a threshold detection circuit. Magnetic flux detector 60 produces as output an electrical signal representative of the intensity of detected magnetic flux density within the proximity of the detector. When housing 5 is placed in housing support stand 57, as shown in FIG. 8A, magnetic flux detector 60 will be in position to detect flux from permanent magnet 58. The produced electrical signal is amplified by the preamplifier whose output is compared to a predetermined threshold maintained in the threshold detector circuit. If the intensity of the detected magnetic flux exceeds the threshold, long-range mode activation signal $A_4=1$ is provided to the system controller.

Figure 2:
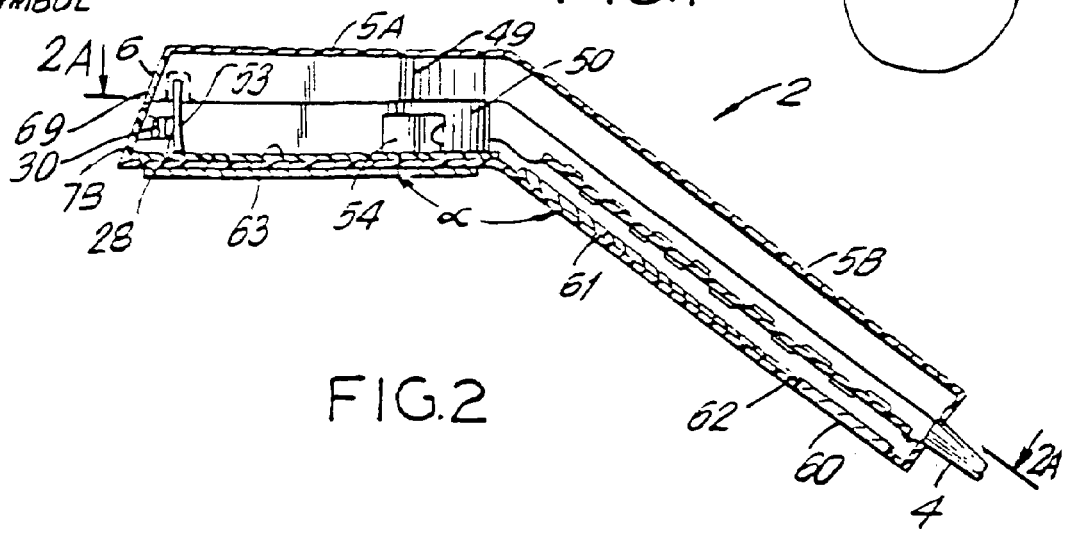
FIG. 2 is a cross-sectional elevated side view along the longitudinal extent of the automatic bar code symbol reading device of FIG. 1, showing various hardware and software components used in realizing the first illustrative embodiment.

As illustrated in FIG. 2, magnetic flux detector 60 is mounted to the rearward underside surface of the handle portion of the housing. In this illustrated embodiment, a ferrous bar 61 is mounted interiorly to the underside surface of the housing handle portion as shown. This arrangement facilitates releasable magnetic attachment of the hand-holdable housing to magnetic bar 58 fixedly installed in housing support stand 57. Preferably, a hole 62 is drilled through ferrous bar 61 to permit installation of magnetic flux detector 60 so that magnetic flux emanating from magnetic bar 58 is detectable when the housing is positioned within housing support stand 57, as shown in FIG. 8A. In this configuration, magnetic flux detector 60 is in proximity with magnetic bar 58 and long range mode activation signal $A_4=1$ is produced and provided to the system controller. In response, the system controller enables long range object detection (i.e., $E_{IRT}=0$) when the hand-holdable housing is removed from the housing support stand 57 as shown in FIG. 8B, the magnetic flux from magnetic bar 58 is no longer sufficient in strength to produce long range mode activation signal $A_4=1$; instead, the short range mode activation signal $A_4=0$ is produced and provided to the system controller. In response, the system controller enables the short range mode of object detection (i.e., $E_{IRT}=1$), as illustrated in FIG. 8C.

Figure 2A:
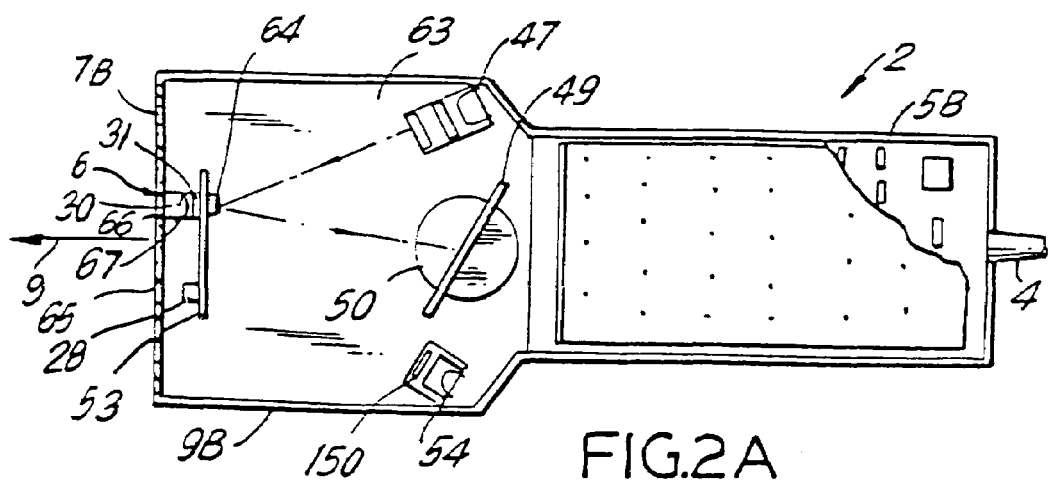
FIG. 2A is a cross-sectional plan view along the longitudinal extent of the automatic bar code symbol reading device taken along line 2A—2A of FIG. 2, also showing the various components used in realizing the first illustrative embodiment.

It is understood that there are a variety of ways in which to configure the above described system components within the housing of the automatic bar code symbol reading device, while successfully carrying out of functions of the present invention. In FIGS. 2 and 2A, one preferred arrangement is illustrated. In FIG. 2A, the optical arrangement of the system components is shown. Specifically, visible laser diode 47 is mounted in the rear corner of circuit board 64 installed within the head portion of the housing. A stationary concave mirror 53 is mounted centrally at the front end of circuit board 63, primarily for collecting laser light. Notably, the height of concave mirror 53 is such not to block transmission aperture 6. Mounted off center onto the surface of concave mirror 53, is very small second mirror 64 for directing the laser beam to planar mirror 49 which is connected to the motor shaft of a scanning motor 50, for joint oscillatory movement therewith. As shown, scanning motor 50 is mounted centrally at the rear end of circuit board 63. In the opposite rear corner of circuit board 63, photodetector 54 is mounted.

In operation, laser diode 47 adjacent the rear of the head portion, produces and directs a laser beam in a forward direction to the small stationary mirror 64 and is reflected back to oscillating mirror 49. Oscillating mirror 49 scans the laser beam over the scan field. The returning light beam, reflected from the bar code symbol, is directed back to oscillating mirror 49, which also acts as a collecting mirror. This oscillating mirror then directs the beam to stationary concave mirror 53 at the forward end of the housing head portion. The beam reflected from the concave mirror 53 is directed to photodetector 54 to produce an electrical signal representative of the intensity of the reflected light.

In front of stationary concave mirror 53, IR LED 28 and photodiode 31 are mounted to circuit board 63, in a slightly offset manner from longitudinal axis 9 of the head portion of the housing. Apertures 65 and 66 are formed in opaque portion 7B of the housing below the transmission aperture, to permit transmission and reception of IR type object sensing energy, as described above.

In order to shield IR radiation from impinging on photodiode 31 via the housing, a metallic optical tube 67 having an aperture 68 encases photodiode 31. By selecting the size of aperture, the placement of photodiode 31 within optical tube 67 and/or the radiation response characteristics of the photodiode, desired geometric characteristics for the object detection field can be achieved, as described hereinbefore. To prevent optical radiation slightly below 670 nanometers from entering the transmission aperture 6, a plastic filter lens 69 is installed over the transmission aperture for transmitting only optical radiation having wavelengths from slightly below 670 nanometers, and thus blocking the transmission of light having wavelengths below this range, from passing through the light transmission aperture. Notably, in this way the combination of filter lens 69 at the transmission aperture and wavelength selective filter 150 before photoreceiver 54 cooperate to form a narrow band-pass optical filter having a center wavelength $\lambda_c=670$ nanometers, which is located in the visible band of the electromagnetic spectrum. This arrangement provides improved signal-to-noise ratio for detected scan data signals $D_1$, while the plastic filter lens 69 appears red to the human eye by virtue of the fact that plastic filter lens 69 only permits transmission of optical radiation from slightly below 670 nanometers. The use of a wavelength of 670 nanometers is illustrative, as other wavelengths could also be used.

Figure 9A:
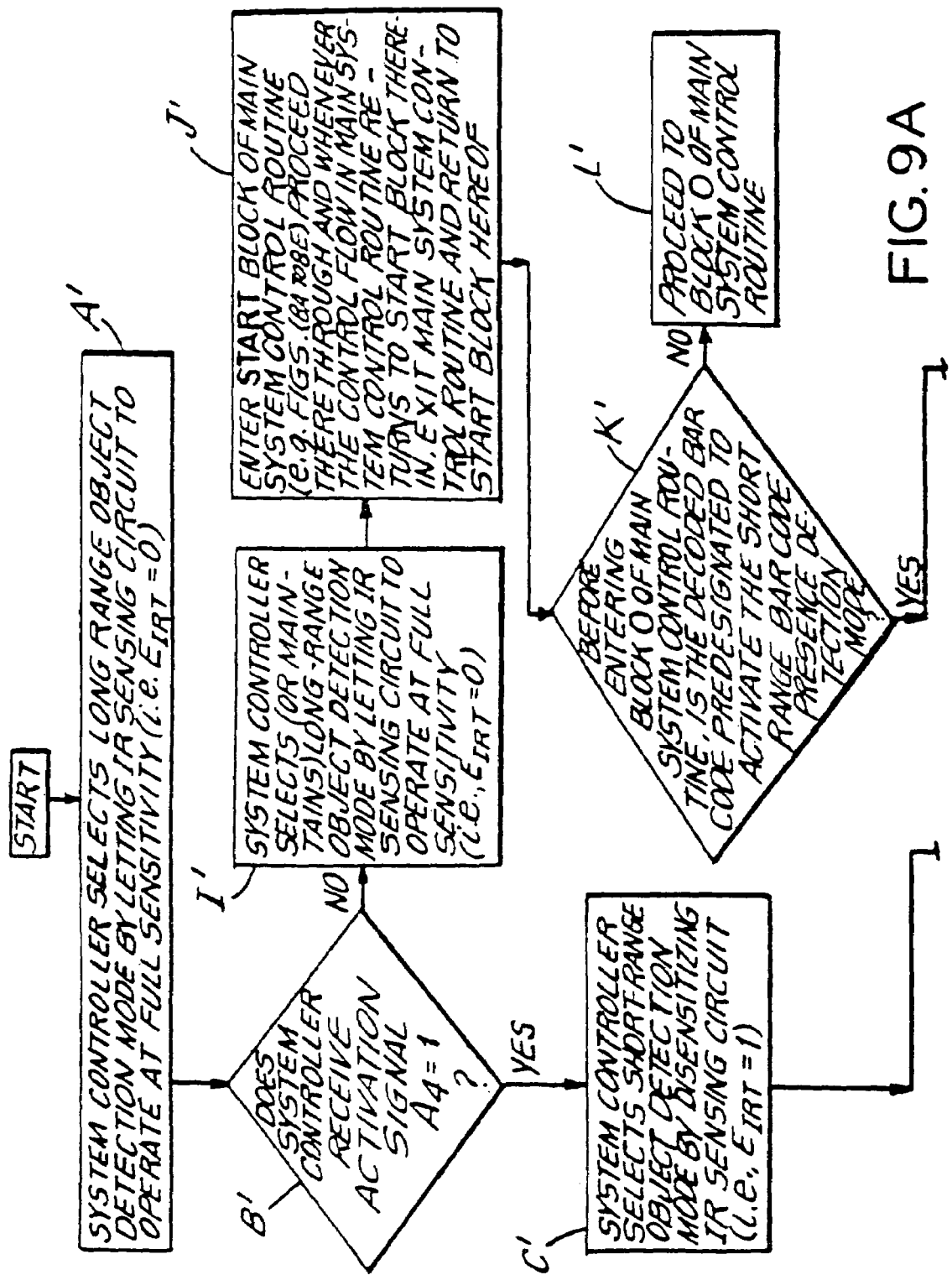
FIGS. 9A to 9C together comprise a high-level flowchart of a system control program that provides scan range selection and optional object detection range selection.
Figure 9B:
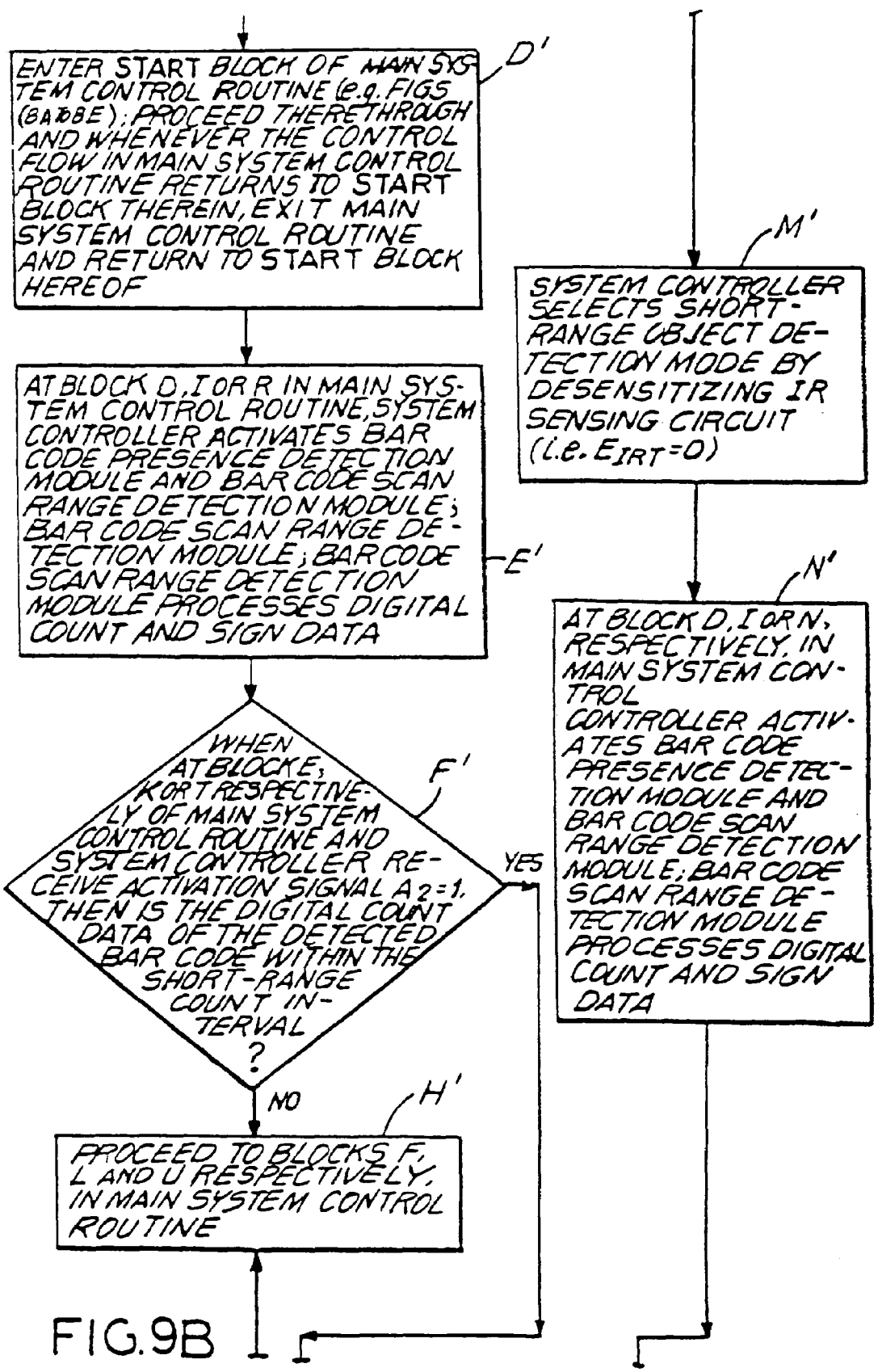
Figure 9C:
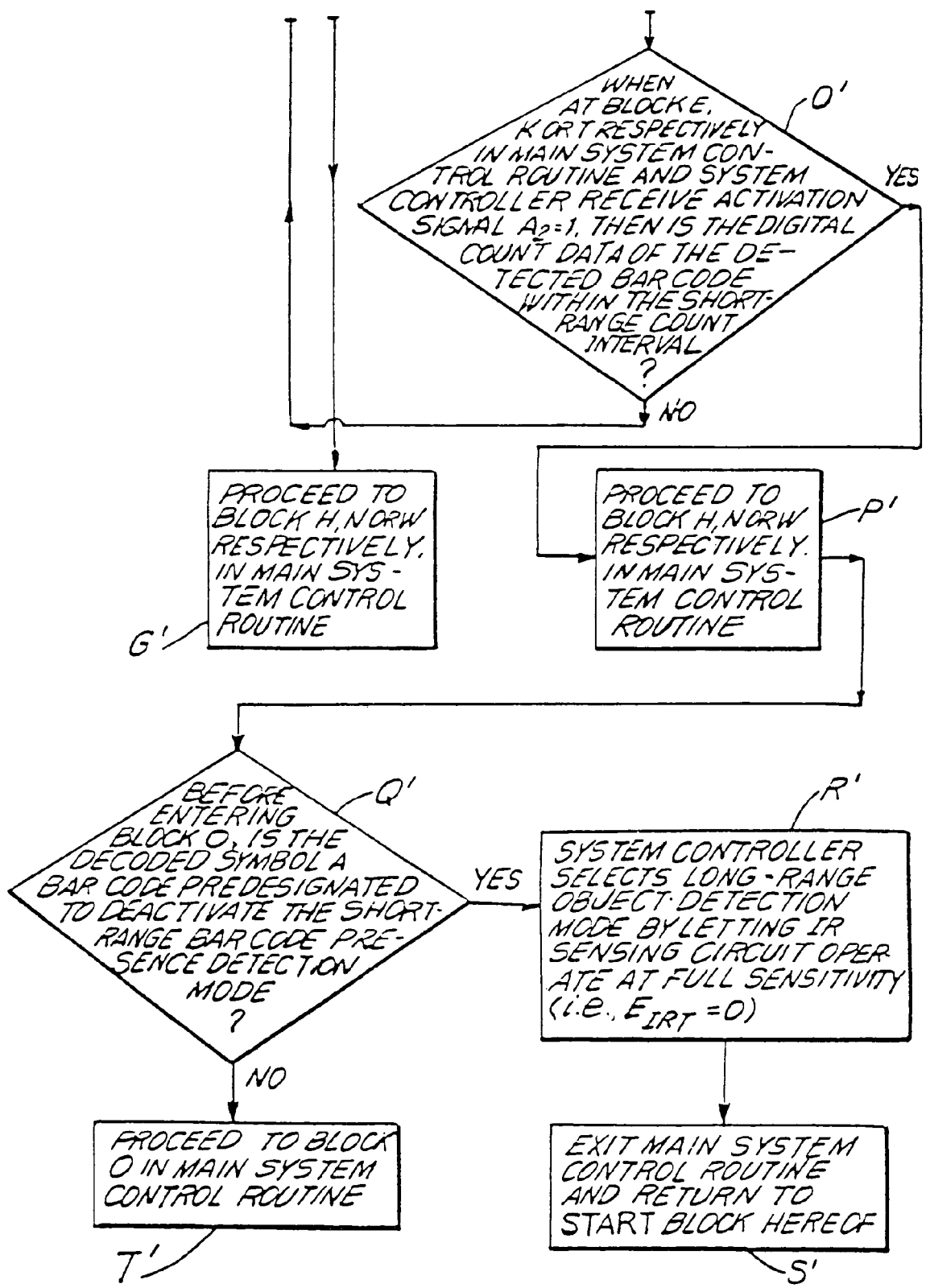

FIGS. 9A to 9C illustrate a System Control Routine which provides the automatic bar code symbol reading devices of the present invention with range selection capabilities for both object and bar code presence detection. Two of the diverse functions provided, when the system controller runs this System Control Routine, are illustrated in FIGS. 8A through 8C. Notably, the System Control Routine of FIGS. 9A to 9C utilizes Main System Control Routine No. 1 of FIGS. 6A–6F which has been described above. It is understood, however, that it may be adapted for use with other system control programs, such as Main System Control Routine No. 2 of FIGS. 12A to 12C, to be described hereinafter in connection with a second illustrative embodiment.

Although the operational sequence of FIGS. 9A–9C uses range-selectable object detection and bar code presence detection, the use of range-selectable object detection is optional. Moreover, the use of any object detection mechanism whatsoever is also optional and not required. Pursuant to the techniques of the present invention, only bar code presence detection need be employed, either with or without object detection. Beginning at the START block and proceeding to Block A' of FIG. 9A, the system controller initially selects the long range object detection mode by letting the IR sensing circuit to operate at full sensitivity (i.e., E.sub.IRT=O). To determine if the short range mode of object and bar code symbol presence detection has been selected, the system controller proceeds to Block B' and determines whether it has received control activation signal $A_4=1$. As described above in connection with FIG. 4, activation signal $A_4=1$ can be generated in at least two possible ways. For example, the short range mode of object and bar code presence detection may be manually selected by depressing switch 21 on the housing using the ones thumb. Alternatively, the short range mode may be selected by lifting the device out from housing support stand 57, as illustrated in FIG. 7B. In either case, prior to operating the symbol reading device, either the manual or automatic mechanism for the mode selection is set with the system controller.

If control activation signal $A_4=1$ is received at Block B', then the system controller selects short range object detection by desensitizing the IR sensing circuit. This is achieved by providing mode selection enable signal $E_{IRT}=1$ as hereinbefore described. Then proceeding to Block D', the system controller enters the START block of Main System Control Routine of, for example, FIGS. 8A and 8B. Thereafter, the control flow proceeds as prescribed by the Main System Control Routine No. 1. Notably, whenever the control flow in the Main System Control Routine returns to the START block, the system controller will exit Main System Control Routine No. 1 and return to the START block of the System Control Routine of FIGS. 9A and 9B.

As illustrated at Block E' of FIG. 9B, whenever the control flow is at Blocks D, I or R in the Main System Control Routine, the system controller activates bar code presence detection 14 module and bar code scan range detection module 15. Thereafter, while at any one of these control blocks, the bar code scan range detection module processes scan data signal $D_2$ so as to produce digital count and sign data as hereinbefore described. As indicated at Block F', an additional condition is placed on control Blocks E, K and T in the Main System Control Routine, so that a transition from the bar code presence detection state to the bar code reading state occurs only if (i) the object is detected in the short range portion of the object detection field and (ii) the bar code is detected in the short range portion of the scan field. Specifically, when at any one of such blocks in the Main System Control Routine and the system controller receives control activation signal $A_2=1$, then the system controller will also determine whether the digital count data of the detected bar code is within the short range count interval. If the digital count data produced indicates that the detected bar code symbol is not located within the prespecified short range of the scan field, then as indicated at Block H' of FIG. 9B, the system controller proceeds to Blocks F, L or U, respectively, in the Main System Control Routine. If, however, the digital count data produced indicates that the detected bar code symbol is located within the short range of the scan field, then as indicated at Block G' of FIG. 9C, the system controller proceeds to Blocks H, N or W, respectively, in the Main System Control Routine. In such instances, detection of a bar code symbol in the scan field is insufficient to effect a state transition to the bar code reading.

Turning attention to Block B' of FIG. 9A, the system controller may not receive control activation signal $A_4=1$ from IR sensing circuit, as indicated at this block. In some embodiments neither switch 21 or magnetic field sensing circuit 20 may be activated, or provided in the automatic bar code reading device. In such embodiments having short/long range selection capabilities, symbol decoding module 16 can be adapted to recognize predesignated bar code symbols which automatically activate and deactivate long and/or short range modes of object and/or bar code presence detection. As will become apparent hereinafter, this type of automatic mode selection is highly advantageous when reading, for example, bar coded menus and the like.

As indicated at Block I' of FIG. 9A, absent receipt of control activation signal $A_4=1$ at Block B', the system controller selects (i.e., maintains) the long range object detection mode by letting IR sensing circuit 10A operate at full sensitivity (i.e., $E_{IRT}=O$). Then at Block J', the system controller enters the START block of Main System Control Routine of FIGS. 8A and 8B, as hereinbefore described in connection with Block D' of FIG. 9B. As indicated at Block K', before entering Block O of the Main System Control Routine, the system controller determines whether the successfully read bar code symbol is a bar code which has been predesignated to activate the short range bar code presence detection mode. This is achieved by checking to see whether the system controller receives mode activation signal $A_4=1$ from symbol decoding module 16 as shown in FIG. 4. If mode activation signal $A_4=0$ is received by the system controller, then as indicated at Block L' the system controller proceeds to Block O of the Main System Control Routine. If, however, mode activation signal $A_4=1$ is received, then, as indicated at Block M', the system controller selects the short range mode of object detection by desensitizing IR sensing circuit 10A (i.e., $E_{IRT}=O$). This operation ensures that control activation signal $A_1$ is produced only when an object is detected within the short range of the object detection field, as illustrated in FIGS. 3 and 3A.

As indicated at Block N' of FIG. 9B, the short range mode of bar code presence detection is indicated by the system controller by activating both bar code presence detection module 14 and bar code scan range detection module 15 whenever the system controller is at Block D, I or R, respectively, in the Main System Control Routine. In this way, the bar code scan range detection module analyzes digital sign and count data from each detected bar code system to determine the range of the detected bar code in the scan field.

As indicated at Block O', an additional condition is placed on control Blocks E, K and T in the Main System Control Routine. This condition ensures that a transition from the bar code presence detection state to the bar code reading state occurs only if the object is detected in the short range portion of the object detection field and the bar code symbol is detected in the short range portion of the scan field. This is achieved by requiring the system controller to determine whether or not the digital count data of the detected bar code is within the prespecified short range count interval. If the digital count data of the detected bar code symbol is not within the short range count interval, then as indicated at Block O', the system controller proceeds to control Blocks F, L or U, respectfully, in the Main System Control Routine as previously indicated in Block H'. If, however, the digital count data is within the prespecified short range count interval, then mode activation control signal $A_{4B}=1$ is provided to the system controller as illustrated in FIG. 4. In this instance, $A_{4A}=1$ and $A_{4B}=1$, and thus bar code presence detection module 14 provides control activation signal $A_2=1$ to the system controller in order to effectuate a transition to the bar code symbol reading state. These events are represented at Block P' of FIG. 9C by the system controller proceedings to Blocks H, N or Y, respectively, in the Main System Control Routine.

Next, as indicated at Block Q' of FIG. 9C, the system controller checks to determine whether the successfully read bar code symbol is a bar code predesignated to deactivate the short range detection mode. If the read bar code symbol is a short-range mode deactivation bar code, then as indicated at Block R', the system controller selects the long range object detection mode by letting IR sensing circuit 10A operate at full sensitivity (i.e., $E_{IRT}$=0). Then, as indicated at Block S', system controller exits Main System Control Routine No. 1 and returns to the START block of System Control Routine of FIGS. 9A to 9C. If, however, the read bar code symbol is not a short range mode deactivation bar code, then as indicated at Block T', the system controller proceeds to Block O in the Main System Control Routine. The bar code symbol reading device of the present invention will then remain in the short-range detection mode until it reads a short-range mode deactivation symbol.

Referring now to FIGS. 1 and 10A through 13, a second embodiment of the automatic bar code reading device of the present invention will be described. Automatic bar code symbol reading device 2' includes a hand-holdable housing illustrated in FIGS. 1, 3 and 3A as described above. Note that similar structures or elements are indicated with like reference numerals throughout the various accompanying figures. The scan fields produced by devices constructed in accordance with the second embodiment are essentially identical to those of the first embodiment in a functional sense, although these fields may or may not differ from a geometrical perspective.

As illustrated in FIG. 10B, the geometrical characteristics of the scan field provided in bar code reading device 2' in three-dimensional space is essentially the same as that which was previously described in connection with FIGS. 3 and 3A. However, a scan field configured as shown in FIGS. 3, 3A and 10B is set forth for illustrative purposes only, as the use of other scan fields having different geometrical characteristics is a matter within the knowledge of a skilled artisan.

Figure 11:
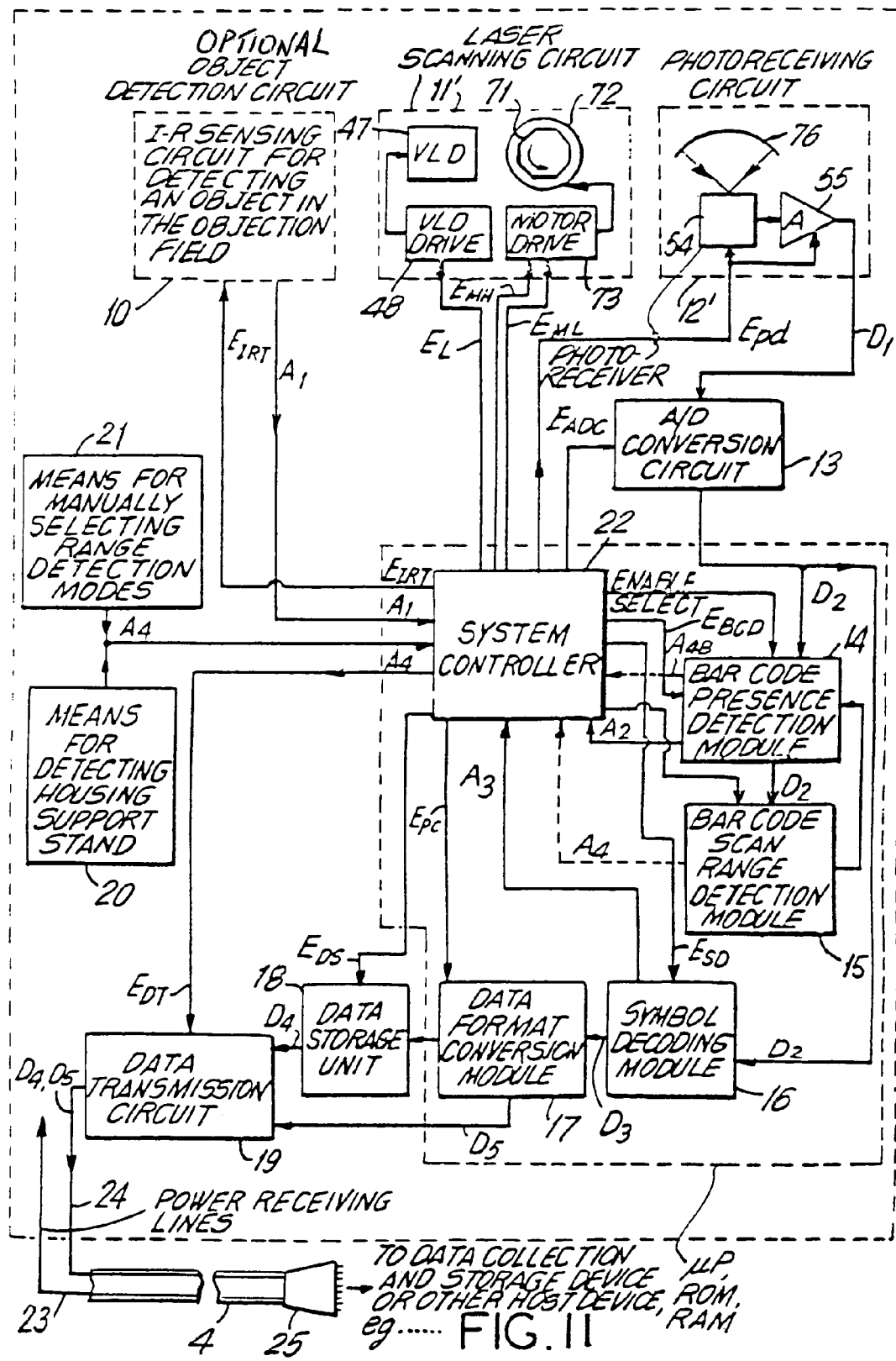
FIG. 11 is a hardware block diagram of an automatic bar code reading device constructed in accordance with the second illustrative embodiment of the invention.

To more fully appreciate the mechanisms employed in providing the scan field of bar code symbol reading device 2', reference is best made to the various operative elements within the hand-holdable housing. As shown in FIG. 11, a bar code symbol reading device constructed in accordance with a second illustrative embodiment comprises similar system components as were utilized in the first illustrative embodiment schematically represented in FIG. 4. Thus, similar elements are indicated with like reference numerals throughout these drawings. Notably, however, there are several significant structural differences with respect to laser scanning circuit 11' and photoreceiving circuit 12' which will be pointed out below.

As illustrated in FIG. 11, scanning circuit 11' comprises a solid-state visible laser diode 47 which is driven by a conventional VLD driver circuit 48. In order to scan the laser beam output from laser diode 47 over a scan field having a predetermined spatial extent in front of the housing head portion, a polygonal scanning mirror 71 is rotated at either a low or high angular velocity (i.e., speed) by scanning motor 72 driven by a dual speed driver circuit 73, as shown.

To selectively activate laser diode 47, the system controller provides laser enable signal $E_L$ to laser driver circuit 48, whereas to activate scanning motor 72 at high or low speed, the system controller provides scanning motor driver circuit 73 motor enable signals $E_{MH}$ or $E_{ML}$, respectively. With this scanning arrangement, the system controller can selectively operate scanning circuit 11' and photoreceiving circuit 12' in at least two ways. For example, when is $E_L$=1 and motor enable signals are $E_{MH}$=1 and $E_{ML}$=O, a laser beam is generated from laser diode 47 and polygonal scanning mirror 71 is rotated at high speed. In response, the laser beam is scanned through the transmission aperture and across the scan field at a scan-line rate proportional to the speed of the scanning motor and the radial distance of the beam from the scanning mirror surface. Alternatively, using this scanning mechanism, polygonal scanning mirror 71 can be rotated at a slow speed while laser diode 47 is deactivated. This can be achieved by the system controller providing laser enable signal $E_L$=O to laser driver circuit 48' and motor enable signals $E_{MH}$=O and $E_{ML}$=1 to driver circuit 73. The utility of this latter scanning function will become apparent hereinafter.

In FIG. 10A, the optical arrangement of the system components for the second illustrative embodiment is shown. Specifically, visible laser diode 47 is mounted in the rear corner of circuit board 75, installed within the head portion of the housing. A stationary concave mirror 76 is mounted controlling at the first end of the circuit board, for primarily collecting laser light. Notably, the height of concave mirror 76 is such as not to block transmission aperture 6. Mounted off center onto the surface of concave mirror 76, is a very small second mirror 77 for directing incident laser beam from laser diode 47 to polygonal mirror 71 which is connected to the shaft of scanning motor 72, for joint rotational movement therewith. As shown, scanning motor 72 is mounted centrally at the rear end portion of the circuit board. In the opposite rear corner of the circuit board, photoreceiver 54 is mounted as shown. In front of photoreceiver diode 54 and essentially along the optical axis of concave mirror 76, an optical element 78, such as a concave lens, can be provided to assist concave mirror 76 in focusing collected laser return light onto the photoreceiver. If necessary, lens 78 can be treated so as to filter out IR energy collected through the collection optics of the system.

To appreciate the functionality of the optical arrangement featured in FIG. 10B, its operation will be described below in connection with bar code symbol presence detection and bar code reading. During bar code presence detection and reading operations, laser diode 47 and photoreceiving circuit 12' are activated, while scanning motor 72 is driven at high speed. In this way, laser diode 47 produces a laser beam that is directed in a forward direction onto small stationary mirror 77 and is reflected back to rotating polygonal mirror 71. Rotating polygonal mirror 71 scans the laser beam across the scan field. The returning laser light beam reflected from the bar code, is directed back onto rotating polygonal mirror 71 which also acts as a collecting mirror. This rotating mirror directs the beam to stationary concave mirror 76 at the forward end of the housing head portion. The beam reflected from concave mirror 76 is directed to photoreceiver 47 to produce an electrical signal representative of the intensity of the reflected light. An optional optically diffractive or optically focusing projection, detent, or small lens 79 may be mounted to, within, or formed as part of transmission aperture 6.

Figure 12A:
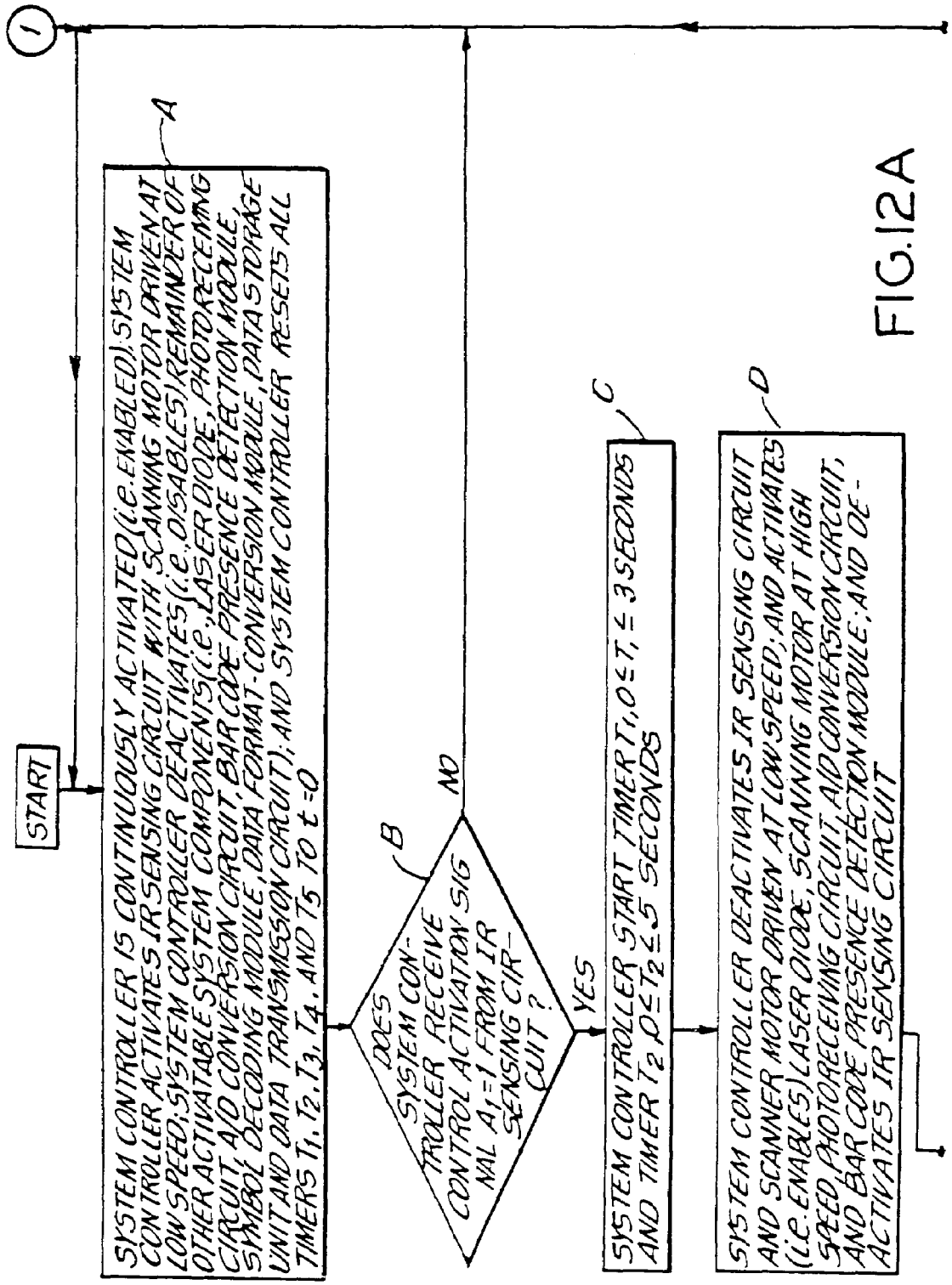
FIGS. 12A to 12E together comprise a high-level flowchart of a system control program setting forth various courses of programmed operation that the automatic bar code symbol reading device of the second illustrative embodiment may execute.
Figure 12B:
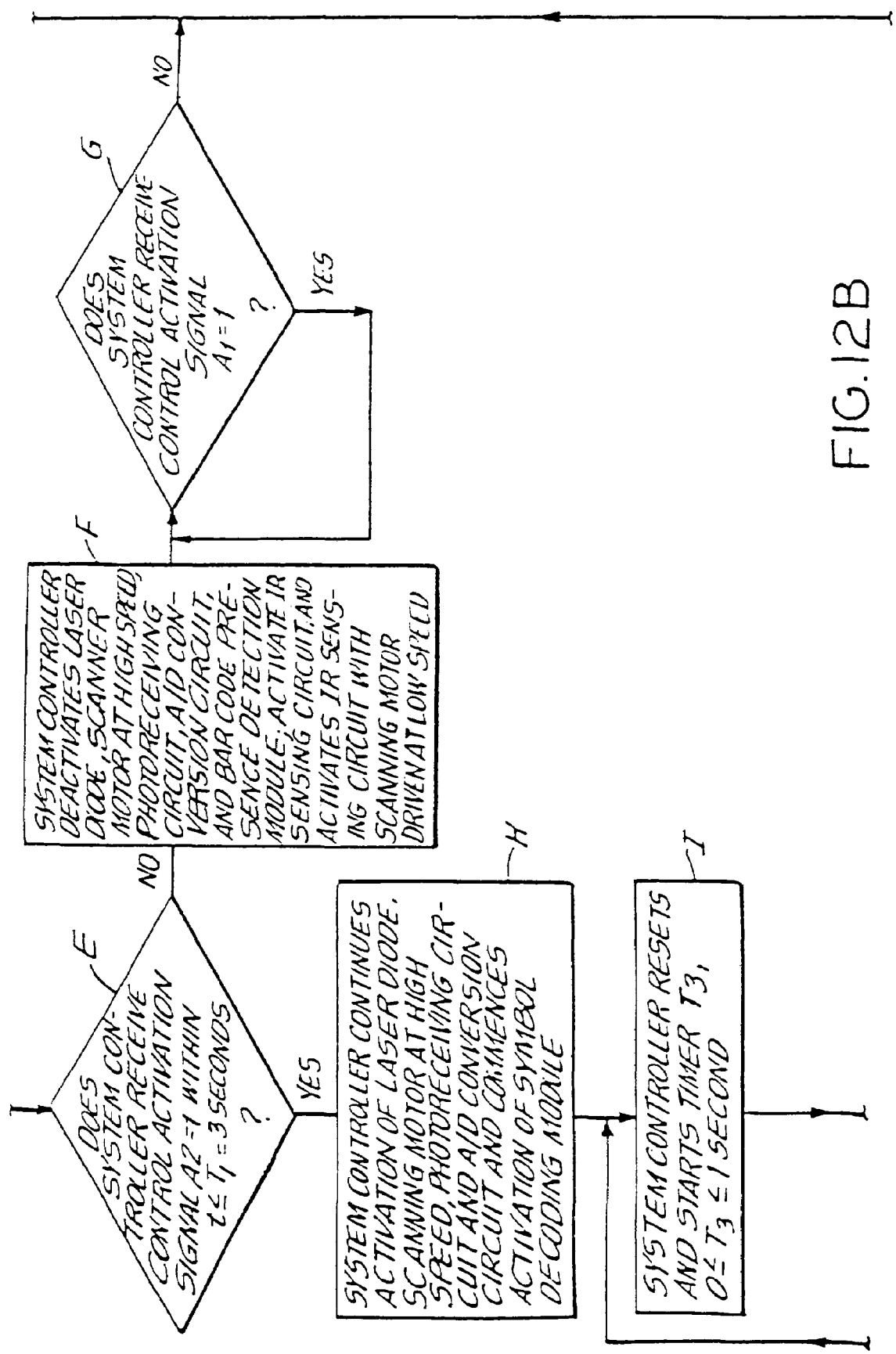
Figure 12C:
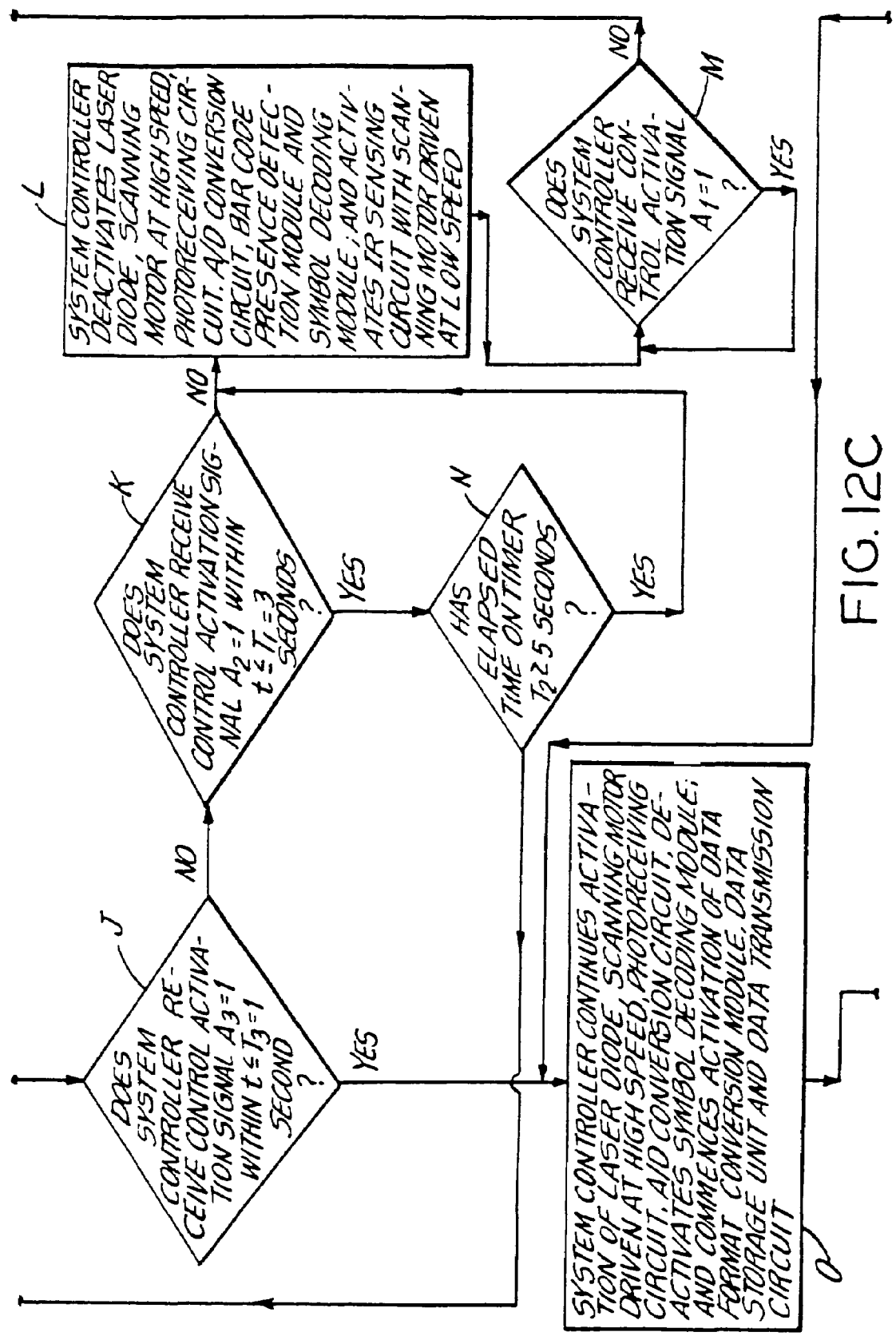
Figure 12D:
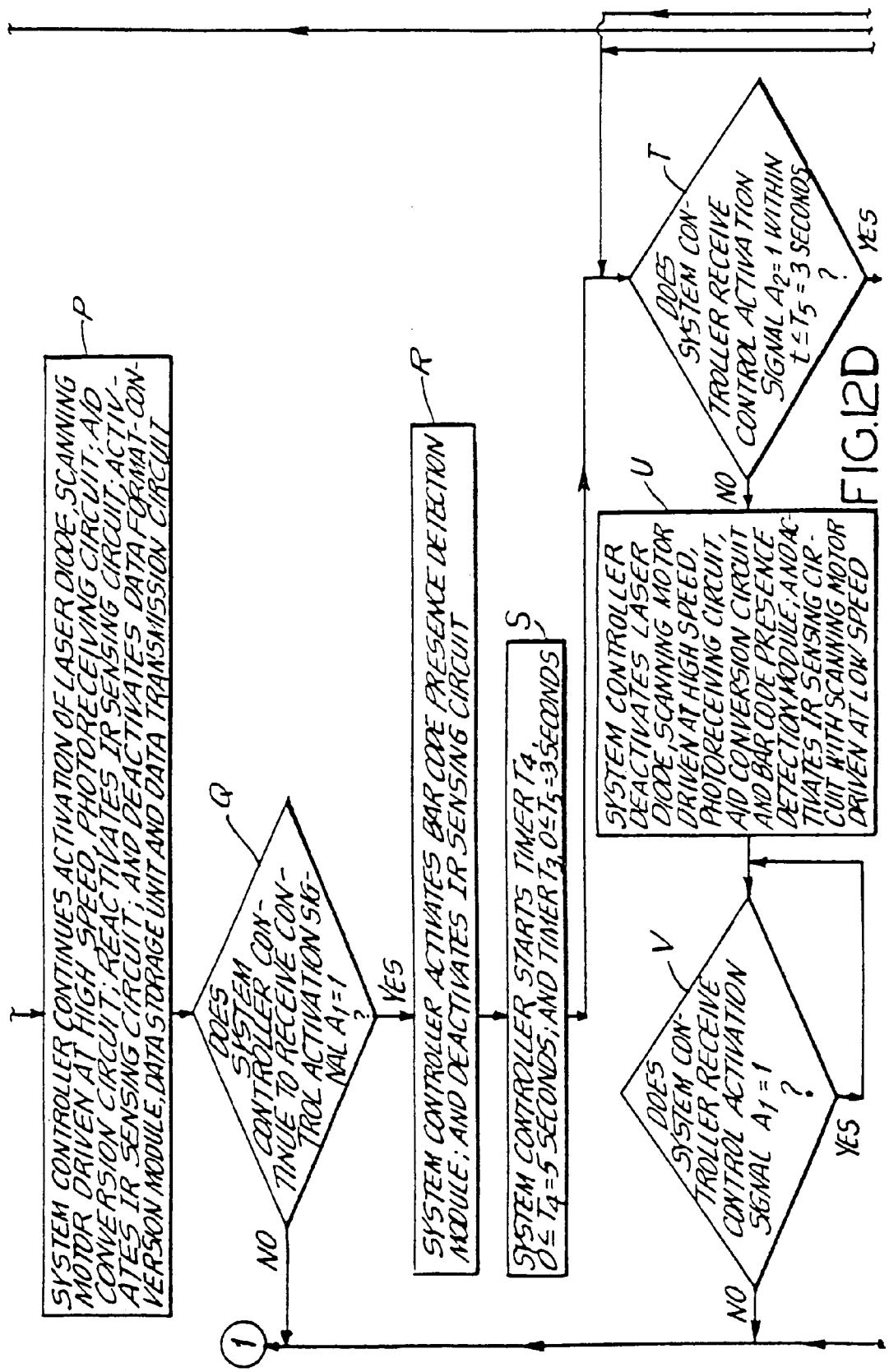

In FIGS. 10C and 10D, an alternative optical signal collection and processing arrangement for automatic bar code symbol reader 2' is shown. Notably, similar structure or elements shown in FIGS. 10A through 10D are indicated by like reference numbers. According to this alternative embodiment, during time intervals determined by the system controller (as indicated in FIGS. 12A and 12B), laser return light from the scan field will be (i) passed through wavelength selective transmission window 110; (ii) collected through common optical elements 71 and 76; (iii) passed through wavelength selective optical filter system 111; (iv) focused by focusing lens 112; (v) detected by photoreceiver 54; and subsequently converted and amplified by current-to-voltage amplifier 113 and preamplifier 114. Using a laser beam having a wavelength of about 670 nanometers, the wavelength transmission characteristics of transmission window 110 and optical filter system 112 will be selected so as to effectively produce a pass-band for transmission of laser return light to photoreceiver 54. The pass-band may be centered about 670 nanometers for laser return light. In an illustrative embodiment, optical filter system 111 can be realized by one or more dielectric or other type filters, the nature of which is well known in the art. An optional IR object detector may be employed, providing its output to synchronous transmitter receiver 27. In this case, as previously described, one output of synchronous transmitter receiver 27 is control activation signal $A_1$ which is provided to the system controller.

The detected analogue scan data signal $D_1$, produced from preamplifier 114 during bar code presence detection and bar code reading, is provided to A/D conversion unit 13 for signal conversion as hereinbefore described. In order that common signal processor 115 is operative during the bar code presence detection and bar code reading states, the system controller continuously provides enable signal $E_{CPE}=1$ to common signal processor 115, as shown. However, during the bar code presence detection and bar code reading states, the system controller provides IR disable signal $E_{IRD}=1$ to IR transmitting and receiving circuit 116, in order to disable the operation thereof Aside from the above described modifications to automatic bar code symbol reading device 2', the system controller of this illustrative embodiment will operate in general accordance with the system control program of FIGS. 12A to 12E.

Having described the detailed structure and internal functions of the automatic bar code symbol reading device of the second illustrative embodiment of the present invention, the operation of the system controller thereof will now be described with reference to Blocks A through CC in FIGS. 12A to 12E and the system block diagram shown in FIG. 11.

Beginning at the START block of Main System Control Routine No. 2 and proceeding to Block A, bar code symbol reading device 2' is initialized. This involves continuously activating (i.e., enabling) the system controller. The system controller, on the other hand, activates optional IR sensing circuit 10 with scanning motor 72 driven at low speed. In addition, the system controller deactivates the remainder of activatable system components, e.g., laser diode 47, photo-receiving circuit 12', A/D conversion circuit 13, bar code presence detection module 14, bar code scan data range detection module 15, symbol decoding module 16, data format conversion module 17, data storage unit 18, and data transmission circuit 19. All timers $T_1$, $T_2$, $T_3$, $T_4$ and $T_5$ maintained by the system controller are reset to t=0.

Proceeding to Block B, the system controller checks to determine whether control activation signal $A_1=1$ is received from optional IR sensing circuit 10. If this signal is not received, then the system controller returns to the START block. If signal $A_1=1$ is received, indicative that an object has been detected within the object detection field, then the system controller proceeds to Block C, at which timer $T_1$ is started and is permitted to run for a preset time period, e.g., O (less than or equal to) $T_1$ (less than or equal to) 3 seconds, and timer $T_2$ is started and permitted to run for a preset time period 0 (less than or equal to) $T_2$ (less than or equal to) 5 seconds.

Proceeding to Block D, the system controller activates laser diode 47, scanning motor 72 driven at high speed, photoreceiving circuit 12', A/D conversion circuit 13 and bar code presence detection module 14 in order to collect and analyze scan data for the purpose of determining whether or not a bar code resides within the scan field. Then, at Block E, the system controller checks to determine whether control activation signal $A_2=1$ is received from bar code presence detection module 14 within time period 1 (less than or equal to) $T_1$ (less than or equal to) 3 seconds. If activation control signal $A_2$ is not received within this time period, indicative that a bar code is not within the scan field, then the system controller proceeds to Block F. At Block F, the system controller deactivates laser diode 47, scanning motor 72 driven at high speed, photoreceiving circuit 12', A/D conversion circuit 13 and bar code presence detection module 14. In addition, the system controller reactivates IR sensing circuit 10A and scanning motor 72 driven at slow speed. Then the system controller remains at Block G until it receives control activation signal $A_1=0$ from the IR sensing circuit, indicative that the object is no longer in the object detection field. The system controller returns to the START block.

If, however, the system controller receives control activation signal $A_2=1$ within time period O (less than or equal to) $T_1$ (less than or equal to) 3 seconds, indicative that a bar code has been detected, then the system controller proceeds to Block H. As will be described hereinafter, this represents a state transition from bar code presence detection to bar code reading. Proceeding to Block H, the system controller continues activation of laser diode 47, scanning motor 72, photoreceiving circuit 12' and A/D conversion circuit 13, and commences activation of symbol decoding module 16. At this stage, fresh bar code scan data is collected and is subject to decode processing. At essentially the same time, at Block I, the system controller starts timer $T_3$ to run for a time period O (less than or equal to) $T_3$ (less than or equal to) 1 second.

As indicated at Block J, the system controller checks to determine whether control activation signal $A_3=1$ is received from the symbol decoding module 16 within $T_3=1$ second, indicative that a bar code symbol has been successfully read (i.e., scanned and decoded) within the allotted time period. If control activation signal $A_3=1$ is not received within the time period $T_3=1$ second, then at Block K the system controller checks to determine whether control activation signal $A_2=1$ is received within the time period O (less than or equal to) $T_3$ (less than or equal to) 3 seconds.

If a bar code symbol is not detected within this time period, then the system controller proceeds to Block L to deactivate laser diode 47, scanning motor 72 driven at high speed, photoreceiving circuit 12', A/D conversion circuit 13, bar code presence detection module 14 and symbol decoding module 16. In addition, the system controller reactivates IR sensing circuit 10A and scanning motor 72 driven at low speed. Notably, this event causes a transition from bar code reading state to object detection. Thereafter, at Block M the system controller remains in the object detection state awaiting control activation signal $A_1=O$, indicative that an object is no longer in the object detection field. When this condition exists, the system controller returns to the START block, as shown.

If at Block K, however, the system controller receives control activation signal $A_2=1$, indicative that a bar code once again is within the scan field, then the system controller checks to determine whether time period $T_2$ has elapsed. If it has, then the system controller proceeds to Block L and then to the START block by way of Block M. If, however, time period O (less than or equal to) $T_2$ (less than or equal to) 5 seconds has not elapsed, then the system controller resets timer $T_3$ to run once again for a time period O (less than or equal to) $T_3$ (less than or equal to) 1 second. In essence, this provides the device at least another opportunity to read a bar code present within the scan field when the system controller returns to control Block J.

Upon receiving control activation signal $A_3=1$ from the symbol decoding module, indicative that a bar code symbol has been successfully read, the system controller proceeds to Block O. At this stage of the system control process, the system controller continues to activate laser diode 47, scanning motor 72 driven at high speed, photoreceiving circuit 12' and A/D conversion circuit 13, while deactivating symbol decoding module 16 and commencing activation of data format conversion module 17, data storage unit 18 and data transmission circuit 19. These operations maintain the scanning of the laser beam across the scan field, while symbol character data is appropriately formatted and transmitted to data collection device 3 by a conventional data communication process, well known in the art.

After transmission of symbol character data to data collection device 3 is completed, the system controller enters Block P and continues activation of laser diode 47, scanning motor 72 driven at high speed, photoreceiving circuit 12' and A/D conversion circuit 13, while reactivating IR sensing circuit 10A and deactivating symbol decoding module 16, data format-conversion module 17, data storage unit 18 and data transmission circuit 19. To detect the continued presence of an object within the object detection field, the system controller checks at Block Q whether control activation signal $A_1=1$ is received from optional IR sensing circuit 10. If $A_1=O$, indicative that the object is no longer in the object detection field, then the system controller returns to the START block. If control activation signal $A_1=1$ is received, then at Block R the system controller activates bar code presence detection module 14, and deactivates optional IR sensing circuit 10. (If optional IR sensing circuit 10 is not employed, operation proceeds as previously outlined with respect to FIGS. 6A–6F). These events represent once again a transition from object detection to the bar code symbol presence detection state.

At Block S, the system controller starts timer $T_4$ to run for a time period O (less than or equal to) $T_4$ (less than or equal to) 5 seconds, and timer $T_5$ to run for a time period O (less than or equal to) $T_5$ (less than or equal to) 3 seconds. Then, in order to determine whether a bar code symbol has been detected within the scan field, system controller proceeds to Block T to determine whether control activation signal $A_2=1$ is received. If this signal is not received with the time period O (less than or equal to) $T_5$ (less than or equal to) 3 seconds, indicative that no bar code symbol is present in the scan field, the system controller proceeds to Block U, at which it deactivates laser diode 47, scanning motor 72 driven at high speed, photoreceiving circuit 12', A/D conversion circuit 13 and bar code presence detection module 14. In addition, the system controller reactivates IR sensing circuit 10A and scanning motor 72 driven at low speed. Thereafter, the system controller remains at Block V until the object leaves the object detection field and (i.e., receives control activation signal $A_2=0$), at which time the system controller returns to the START block, as shown.

If, however, at Block T control activation signal $A_2=1$ is received, indicative that a bar code symbol has been detected in the scan field, the system controller proceeds through Blocks W and X to reactivate symbol decoding module 16 and start timer $T_6$ to run for a time period O (less than or equal to) $T_6$ (less than or equal to) 1 second. These events represent a state transition from the bar code symbol presence detection to bar the code symbol reading. At Block Y, the system controller checks to determine whether control activation signal $A_3=1$ is received from the signal decoding module within time period O (less than or equal to) $T_6$ (less than or equal to) 1 second.

If a bar code symbol is not successfully read within this 1 second time period, the system controller returns to Block T to form a first loop, within which the device is permitted to detect or redetect a bar code symbol within the time period O (less than or equal to) $T_4$ (less than or equal to) 5 seconds. If a bar code symbol is decoded within this time interval, the system controller determines at Block Z whether the decoded bar code symbol is different from the previously decoded bar code symbol. If it is different, then the system controller returns to Block O as illustrated, to format and transmit symbol character data as described hereinabove.

Figure 12E:
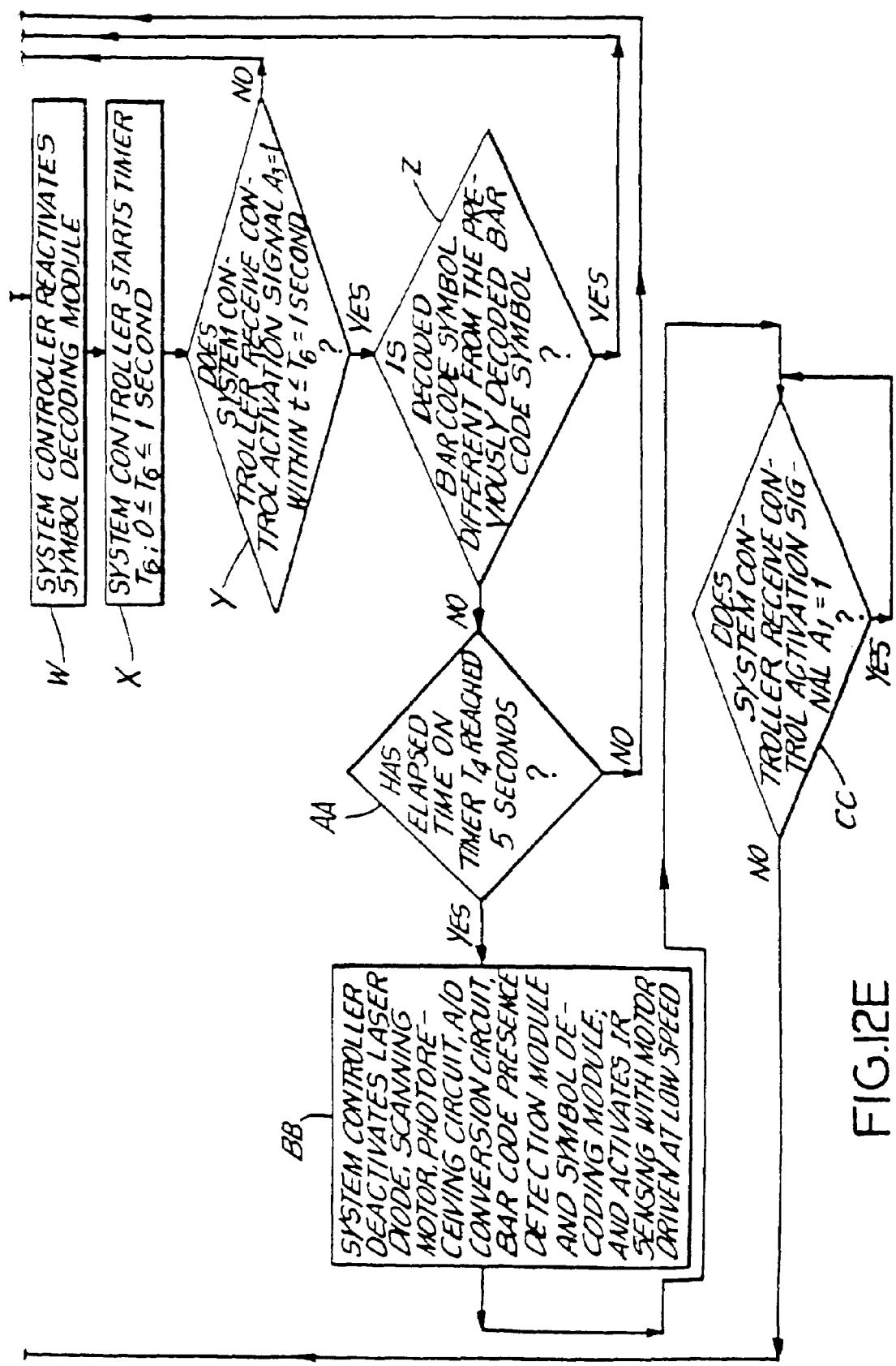

If, however, the decoded bar code symbol is not different than the previously decoded bar code symbol, then at Block AA the system controller checks to determine whether timer $T_4$ has lapsed. If it has not lapsed, the system controller returns to Block T to form a second loop, within which the device is permitted to detect or redetect a bar code symbol in the scan field and then successfully read a valid bar code symbol within the set time interval O (less than or equal to) $T_4$ (less than or equal to) 5 seconds. If, however, timer $T_4$ lapses, then the system controller proceeds to Block BB, at which the system controller deactivates laser diode 47, scanning motor 82 driven at high speed, photoreceiving circuit 12', A/D conversion circuit 13, bar code presence detection module 14 and symbol decoding module 16. In addition, system controller reactivates IR sensing circuit 10A and scanning motor 72 driven at low speed. Thereafter, the system controller remains at Block CC until control activation signal $A_1=O$ is received from IR sensing circuit 10A, indicative that the object detection field is free of any objects. At this stage, the system controller returns to the START block, as shown in FIG. 12E.

Figure 13:
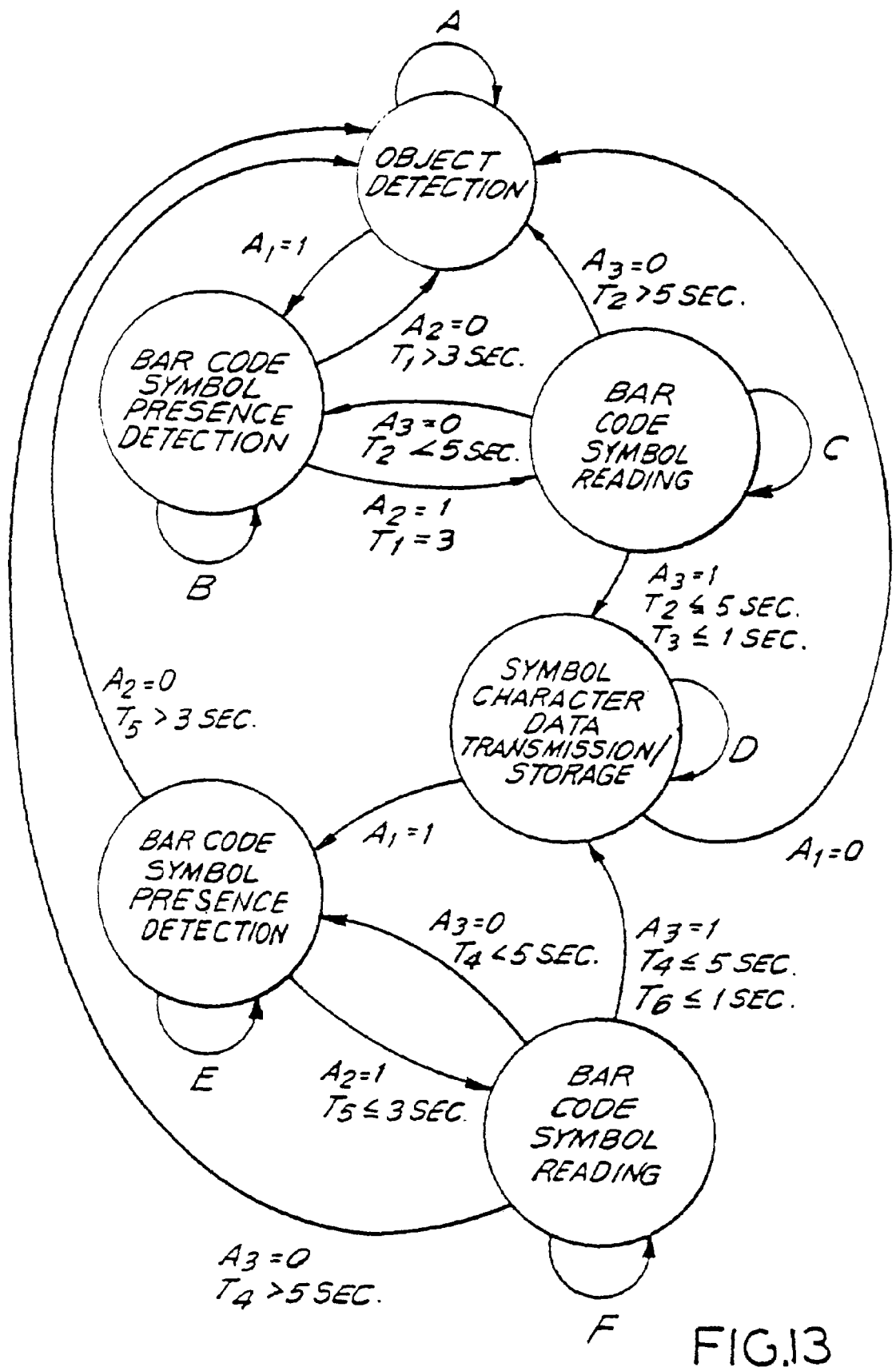
FIG. 13 is a state diagram illustrating the various states that the automatic bar code symbol reading devices of the illustrative embodiments may undergo during operation.

Having described the operation of the first and second illustrative embodiments of the bar code symbol reading device hereof, it will be helpful at this juncture to describe the various conditions which will cause state transitions to occur during the automatic operation of the device. In this regard, reference is made to FIG. 13 which provides a state transition diagram for the illustrated embodiments. As illustrated in FIG. 13, the automatic bar code symbol reading device of the present invention has three basic and one additional optional state of operation, namely: an optional object detection state, plus three required states: bar code symbol presence detection, bar code symbol reading, and symbol character data transmission/storage. The nature of each of these states has been described hereinabove in great detail. These four states are schematically illustrated as A (optional), B, C and D, respectively, in the state transition diagram of FIG. 13.

Two optional "extensional states" have also been provided in the diagram of FIG. 13, such that the automatic bar code reading devices of the illustrative embodiments are capable of reading an infinite number of consecutively different bar code symbols without returning to the optional object detection state. These states of operation are indicated as E and F and represent bar code presence detection and bar code symbol reading operations, respectively. As described above, these operations are employed when attempting to automatically read one or more consecutively different bar code symbols, that is, after a first bar code symbol has been successfully read utilizing operation states A through C.

As shown in FIG. 13, transitions between the various states are indicated by directional arrows. Besides each of these arrows are transition conditions expressed in terms of control activation signals (e.g., $A_1$, $A_2$ and $A_3$), and where appropriate, state time intervals (e.g., $T_1$, $T_2$, $T_3$, $T_4$, $T_5$ and $T_6$). Conveniently, the state diagram of FIG. 13 expresses most simply the four basic and two extensional operations occurring during the control flow within the system control programs of FIGS. 8A and 8B, and FIGS. 12A and 12B. Significantly, the control activation signals $A_1$, $A_2$ and $A_3$ in FIG. 13 indicate which events within the object detection and/or scan fields can operate to effect a state transition within the allotted time frame(s), where prescribed.

Figure 14A:
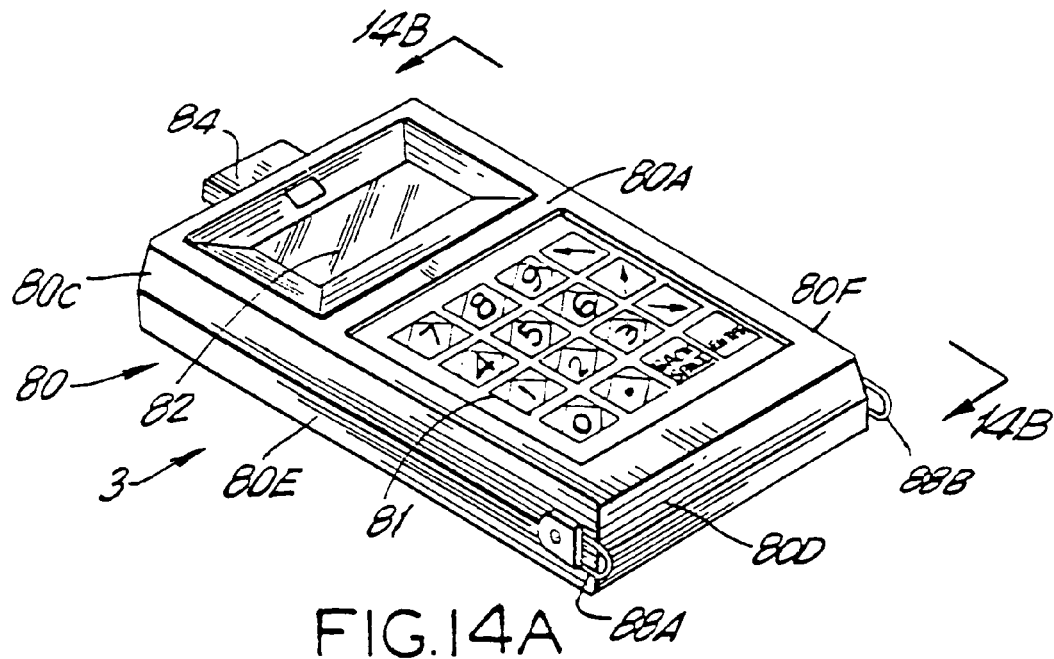
FIG. 14A is a perspective view of the portable data collection device shown in FIG. 1.
Figure 14B:
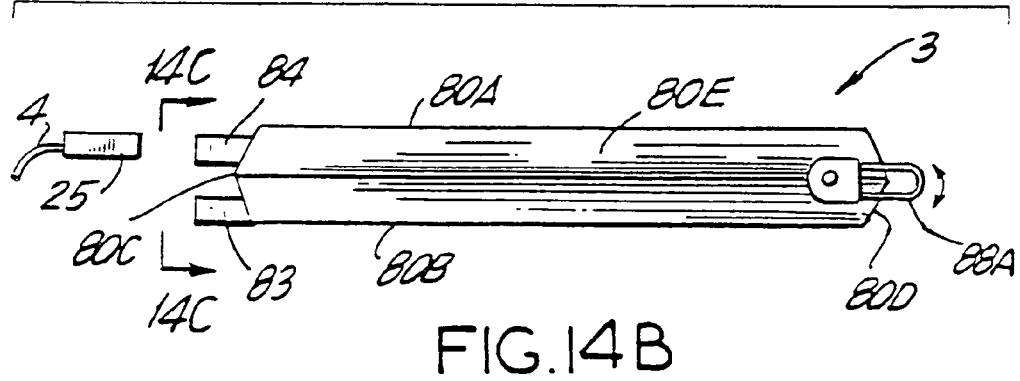
FIG. 14B is an elevated side view of the data collection and storage device of the present invention, taken along line 14B—14B of FIG. 14A.

Referring now to FIGS. 1, 14A through 16B, portable data collection device of the present invention will be described. As illustrated in FIGS. 14A through 14C, data collection device 3 of the illustrative embodiment comprises a hand-holdable housing 80 which houses the operative elements of the device to be described below. Housing 80 has a top panel 80A, bottom panel 80B, front and rear panels 80C and 80D, and two opposing side panels 80E and 80F, as shown. A 4×4 membrane keypad 81 is mounted through the lower portions of top panel 80A for manual entry of alphanumeric type data including, for example, data related to bar code symbols. Notably, a separate switch is provided for turning the device ON and OFF. Above the keypad, there is mounted an LCD type 1×16 character display 82 for visually displaying data including (i) data being manually entered through keypad 81, (ii) operator messages and (ii) data entry verification messages which will be described in greater detail hereinafter.

Via front panel 80C, adjacent character display 82, data-input and data-output communications ports 83 and 84, respectively, are provided. As will be described in greater detail hereinafter, data-input communication port 83 is particularly adapted (i) for receiving symbol character data from the data-output communication port of a hand-holdable bar code symbol reading device (e.g., 2 or 2'), and (ii) for simultaneously providing electrical power to the power receiving lines (e.g., 23) thereof, which are physically associated with its data-output port (e.g., multi-pin connector plug 25 shown in FIG. 4). In contrast, data-output communication port 84 is particularly adapted for transmitting collected symbol character data stored in device 3, through the data-input communication port of a data-receiving host device, such as a point of sale (POS) cash register/computer 85, illustrated in FIGS. 8A, 8B, and 8C.

Figure 14C:
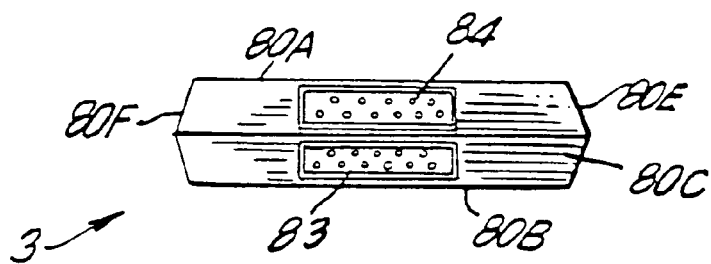
FIG. 14C is an elevated rear view of the data collection and storage device of the present invention, taken along line 14C—14C of FIG. 14B.

As shown in FIG. 14C, in particular, data-input communication port 83 is realized in the illustrative embodiment by a 9 pin female connector, whereas data-output communication port 84 is realized as a 9 pin male connector. In this way, the 9 pin male connector 25 used to realize the data-output communication port of bar code symbol reading devices 2 and 2', can be simply plugged into data-input communication port 83 to establish a physical interface. Preferably hand-threaded screw fasteners (not shown) are provided on the 9 pin male connector 25 to effect a secure interconnection with data-input port 83 during portable bar code symbol reading applications.

For conveniently supporting the data collection device on the operator's body while, for example, taking inventory, a pair of D-rings 88A and 88B are rotatably mounted to the rear end of the housing. In this way, a cord, shoulder strap or belt strap can be attached to the D-rings. With this housing support arrangement, the user can simply pickup the hand-holdable data collection device in one hand and manually enter data through the keypad using one's thumb while viewing the character display screen.

The hand-holdable data collection device includes a battery-power storage unit 89 realized, in the illustrative embodiment, as four AA-type 1.2, 1.35, or 1.5 volt NiCad, NimH, Carbon-Zinc, Alkaline, or other batteries. While not shown, these batteries are contained within a battery carrier attached to a hinged panel formed in on the bottom panel 80B of the housing. Access to the battery carrier is achieved simply by opening the hinged panel, which after replacement of batteries, can be snapped shut.

Figure 15:
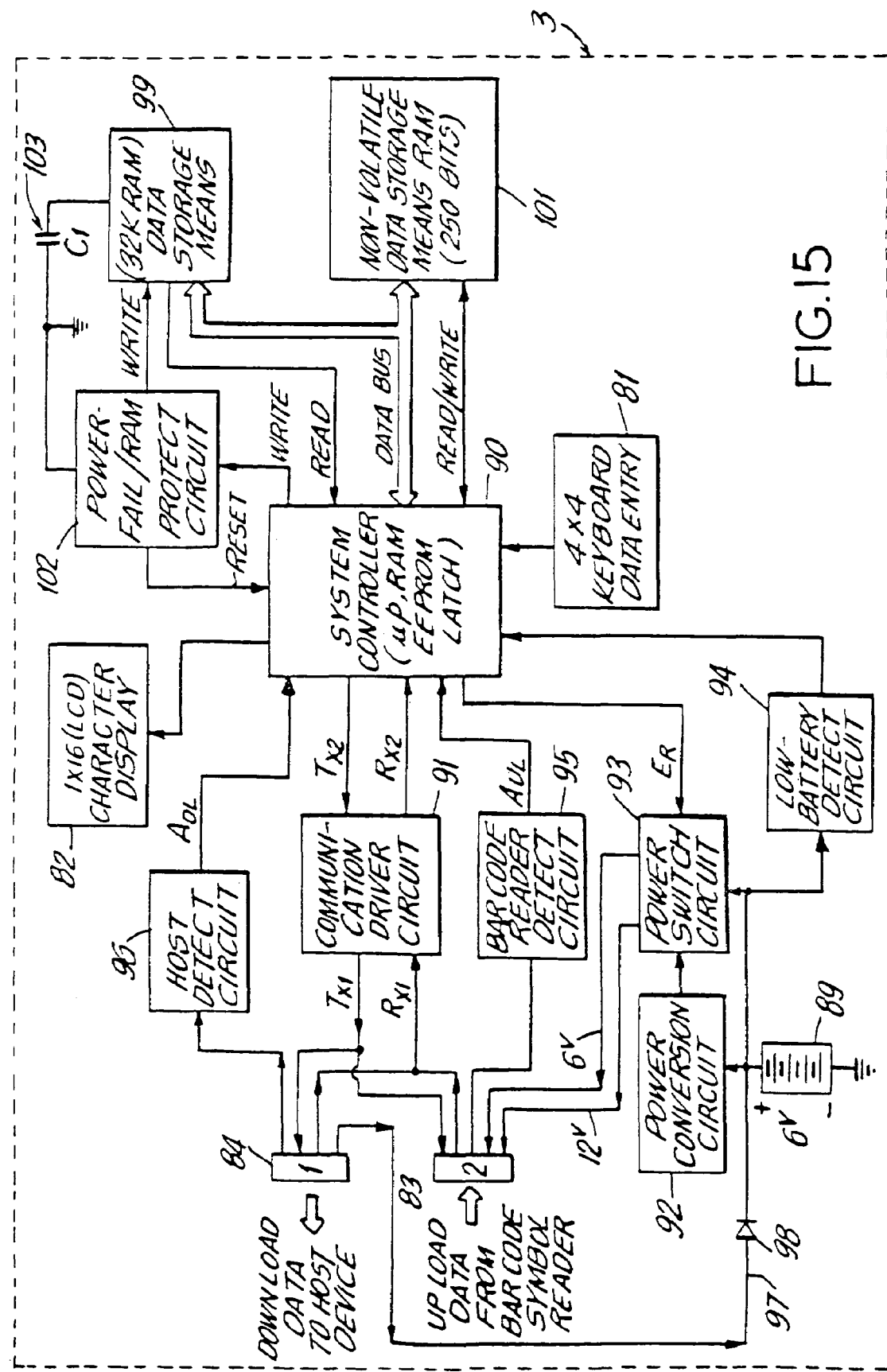
FIG. 15 is a block functional system diagram of the data collection device of the present invention, showing various system components integrated about a system controller.

Referring to FIG. 15, the various components comprising the hand-holdable data collection device are shown integrated about system controller 90. In the illustrated embodiment, the system controller is implemented by a microprocessor associated with program memory (e.g., EEPROM) for storing a system control program. Buffer memory (e.g., RAM) and appropriate latching circuitry are typically provided as well in manner well known in the art. As shown in FIG. 15, the system controller is operably connected with data entry keypad 81 and character display 82 for entering and displaying data, respectively, as hereinbefore described. Data-input and data-output communication ports 83 and 84 are each operably connected to a communication driver circuit 91 by data transmitting and receiving lines $T_{x1}$ and $R_{x1}$, respectively, as shown. In turn, the system controller is operably connected to communication driver circuit 91 by data transmitting and receiving lines, $T_{x2}$ and $R_{x2}$, respectively. With this arrangement, data communication protocol and the like can be transacted between (i) bar code symbol reading device connected to data-input communication port 83 and (ii) communication driver circuit 91 via data transmitting and receiving lines $T_{x1}$ and $R_{x1}$. Also, this arrangement facilitates transaction of data communication protocol and the like between (i) a host device (e.g., cash register/computer 85) connected to data-output communication port 84, and (ii) communication driver circuit 91.

While not shown in FIG. 15 to avoid obfuscation, a conventional and power distribution circuit will be provided for distributing power from the positive side of six volt supply 89, to all power consuming elements within the data collection device. In order to generate a twelve (12) volt supply for use within automatic bar code symbol reading devices 2 and 2', a power conversion circuit 92 is provided. As illustrated, battery power unit 89 provides a six (6) volt supply to power conversion circuit 92, generating a twelve (12) volt supply. The six and twelve volt supply lines are, in turn, provided to a power switching circuit 93, which is controlled by the system controller by power switch enable signal $E_R$. The six and twelve volt power lines from power switching unit 93 are connected to a pair of designated pins within the 9 pin data-input communication port 83, as shown. To detect low battery power levels, battery detect circuit 94 is operably connected between the positive side of battery supply 89 and the system controller.

To determine whether the data-output communication port of a bar code symbol reader is physically (and electrically) connected to data-input communication port 83 of the data collection device, a bar code reader detect circuit 95 is operably connected between data-input communication port 83 and the system controller, as shown. Thus, when bar code reader detect circuit 95 detects a bar code reader plugged into data-input communications port 83, it will provide a bar code reader detect signal $A_{UL}$ to the system controller. This signal automatically activates the system controller to begin initializing for "uploading" of bar code symbol character data from the bar code reader. Also, bar code reader detect signal $A_{UL}$ causes the system controller to provide power switch enable signal $E_R$ to power switching circuit 93, to thereby empower the connected bar code reading device with the six and twelve volt power supply lines.

Similarly, to determine whether the data-input communication port of a host device is physically (and electrically) connected to data-output communication port 84 of the data collection device, a host device detect circuit 96 is operably connected between data-output communication port 84 and the system controller, as shown. Thus, when host device detect circuit 96 detects a host device plugged into data-output communication port 84, it will provide a host device detect signal $A_{DL}$ to the system controller which automatically activates the system controller to begin initializing for "downloading" of collected bar code symbol character data, from the data collection device into the host device. To permit the host device to supply power to the data collection device during data downloading operations, and thus conserve battery power, a power supply line 97 is provided between a pin of data-output communication port 84 and the positive side of battery supply 89. To restrict power flow from the host device to the data collection device, a diode 98 is inserted within this power supply line 97, as shown.

Symbol character data downloaded from a bar code reading device and collected through data-input communication port 83, is stored within a data storage unit 99, realized in the illustrative embodiment as 32 kilobytes of RAM. To facilitate transfer of such data from the system controller to RAM storage unit 99, a data bus 100 is provided, as shown. Also associated with data bus 100 is a non-volatile data storage unit 101. The system controller will typically store particular data items, such as set-up parameters and the like, in non-volatile RAM storage unit 101 as such data can be retained therein for the lifetime of the data collection device.

RAM storage unit 99 is protected by a power-fail/protect-RAM circuit 102 that is operably associated with a storage capacitor 103, the write line of RAM storage unit 99 and the system controller. By this circuit 102, RAM storage unit 99 is protected in two ways. Firstly, during power transitions, circuit 99 inhibits write signals to RAM storage unit 99, and consequently stored symbol character data is protected from corruption. Secondly, during periods of battery power failure, circuit 102 enables storage capacitor 103 to provide power to RAM storage unit 99 for minimally one hour in order to maintain the integrity of stored symbol character data.

Figure 16A:
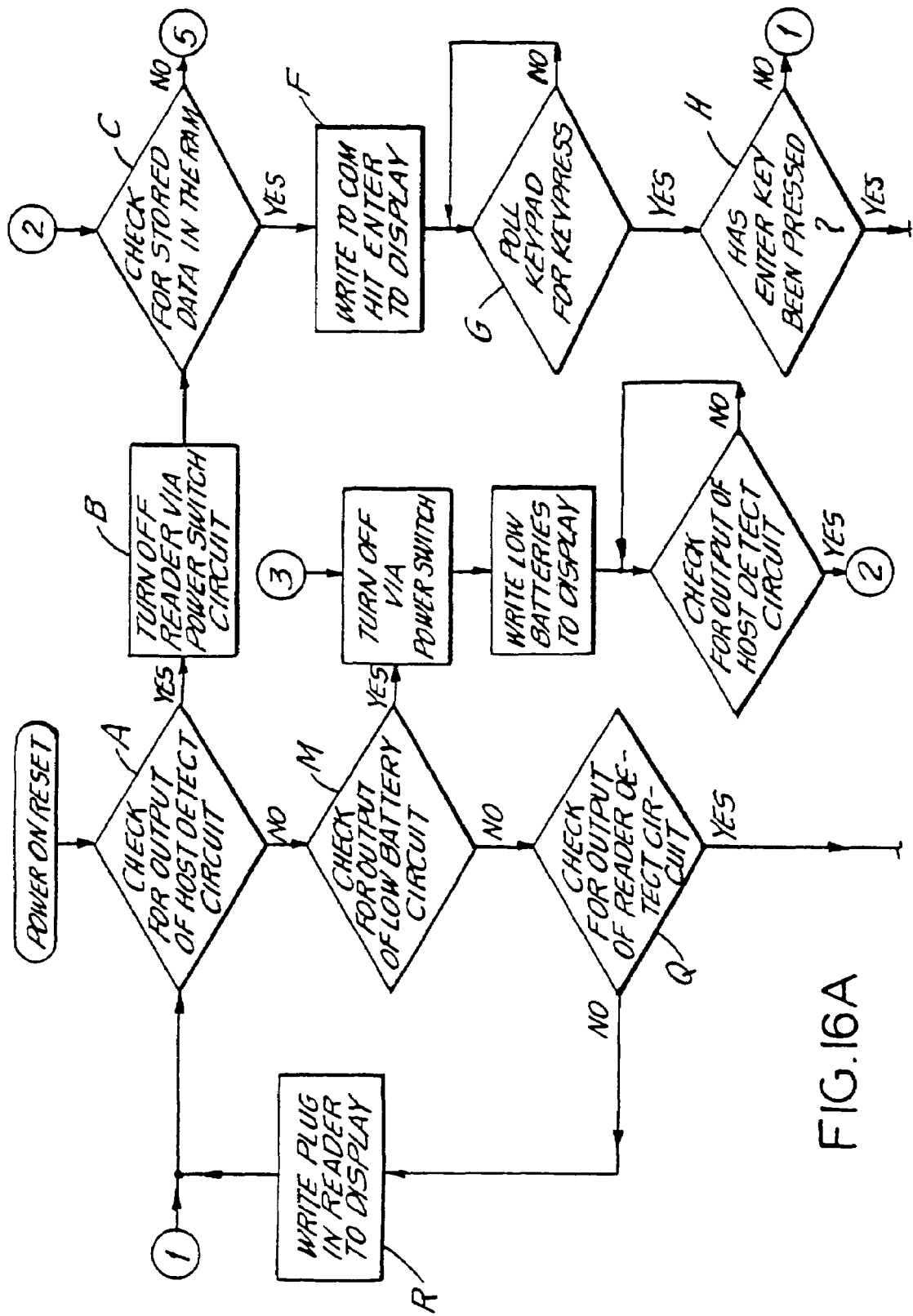
FIGS. 16A to 16C together comprise a flowchart of a system control program for the data collection device of an illustrative embodiment of the present invention, setting forth various operational states that the device may undergo during programmed operation, and indicating various user prompts displayed on a visual display during various modes of use.
Figure 16B:
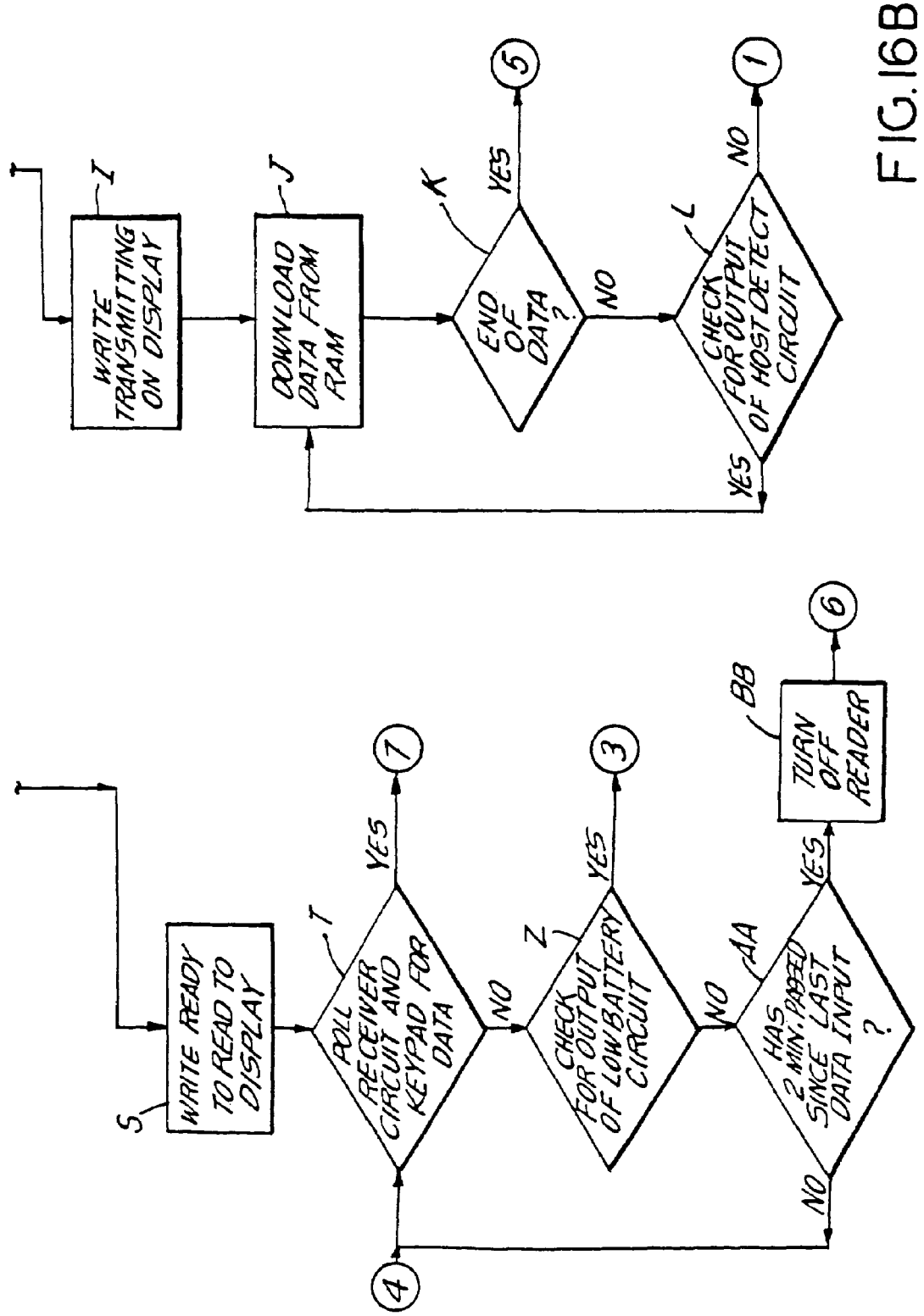
Figure 16C:
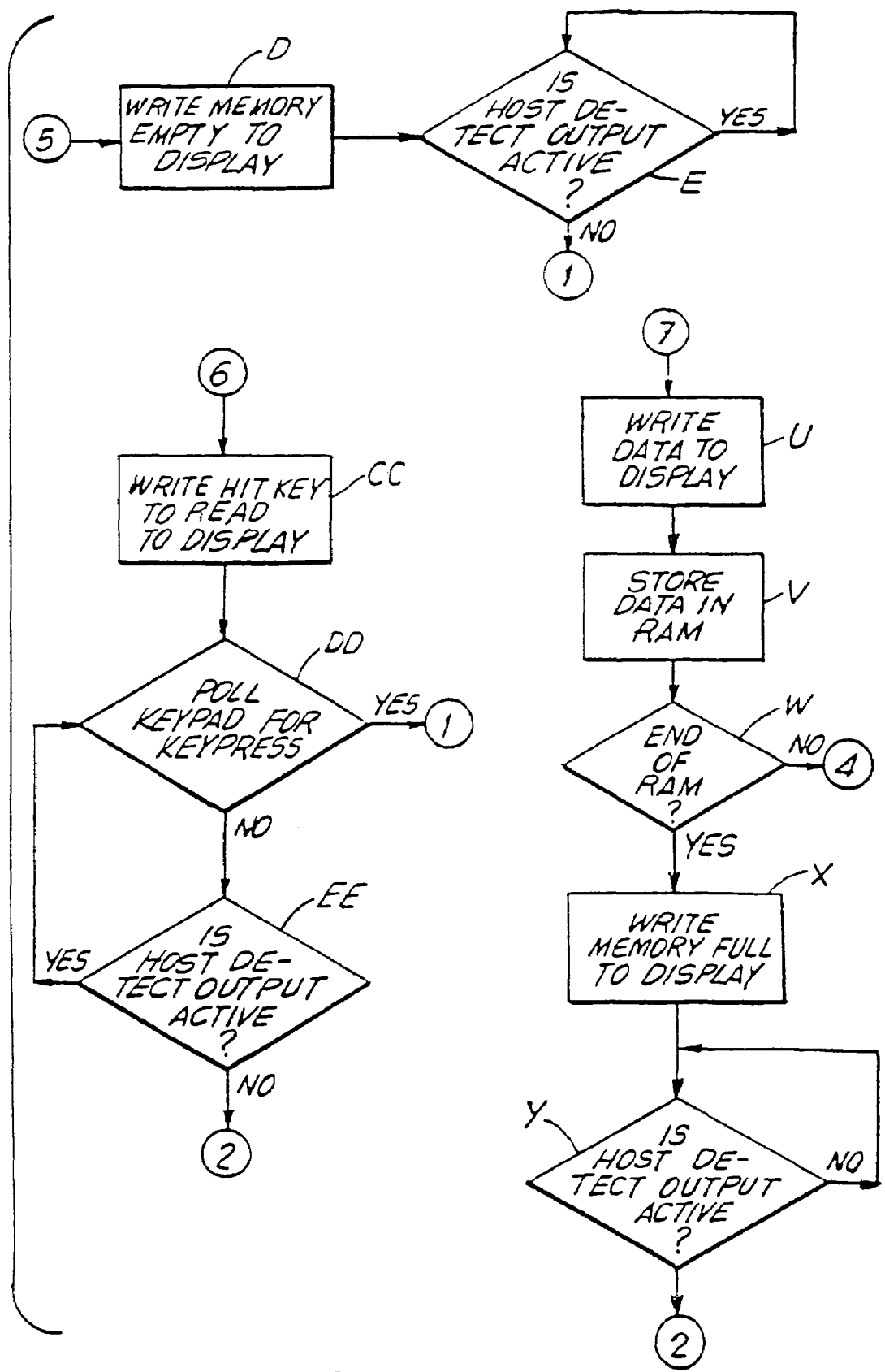

Having described the structure and function of the data collection device of the illustrative embodiment, its versatile operation will now be described with reference to the system control program illustrated in FIGS. 16A and 16C. As indicated in FIG. 16A, upon enabling the POWER-ON switch, the system controller advances to Block A. At Block A, the system controller checks to determine whether the output of host detect circuit 96 indicates that a host device is plugged into data-output communication port 84. If it does detect this condition, then the system controller disconnects power supply 89 from data-input communication port 83 (and thus any bar code symbol reader connected thereto) by way of power switching circuit 93. Then at Block C, the system controller checks to determine whether there is any data stored in RAM storage unit 99 for downloading to the connected host device. If there is no data stored in RAM storage unit 99, then the system controller proceeds to Block D, and writes "MEMORY EMPTY" to character display 82. Thereafter, the system controller remains at Block E until it receives host detect signal $A_{DL}=0$ indicative that the host device is no longer plugged into data-output communications port 84. Upon the occurrence of this event, the system controller returns to Block A, as shown.

If, at Block C, the system controller determines that there is data stored in RAM storage unit 99 for downloading into the host device, then at Block F the system controller writes "TO COM HIT ENTER" to character display 82. At Block G, the system controller polls the keypad for the occurrence of a key press operation, and at Block H determines whether the ENTER key has been pressed. If any key other than the ENTER is pressed, then the system controller returns to control Block A. If the ENTER key is pressed, the system controller writes "TRANSMITTING" to character display 82, and then at Block J downloads data from RAM storage unit 99 to the host device connected to data-output communication port 84. At Block Y, the system checks to determine if all data in RAM storage unit 99 has been transmitted, and if so, writes "MEMORY EMPTY" or "DOWNLOAD COMPLETE" to character display 82, as indicated at Block D. Thereafter, the system controller remains at Block E until the host device is disconnected from data-output communication port 84, and thereupon returns to Block A.

If it is determined at Block K that data transfer from RAM storage unit 99 is not complete, then as indicated at Block L, the system controller checks to determine whether the host device is still connected to data-output communication port 84 (i.e., $A_{DL}=1$). If host device has been disconnected (i.e., $A_{DL}=0$), then the system controller returns to Block A, as shown. If, on the other hand, the host device remains connected to data-output communications port 84, the system controller returns to Block J to form a control loop within which the system controller will remain so long as there remains data in RAM storage unit 99 and the host device remains connected to data-output communication port 84.

As indicated at Block A, if the system controller does not receive host detect signal $A_{DL}=1$ from host detect circuit 96, indicative that a host device is plugged into the data-output communication port, then the system controller proceeds to Block M. At Block M, the system controller first checks the output of low battery circuit 94 to determine that sufficient power is available to energize a bar code symbol reading device if plugged into data-input communication port 83. If insufficient battery strength is indicated, then at Block N the system controller disconnects battery power supply 89 from data-input communication port 93 by way of power switching circuit 94. Thereafter at Block O, the system controller writes "LOW BATTERIES" to character display 82. The system controller remains at Block P until it receives host detect signal $A_{DL}=1$, indicative that the host device is plugged into data-output communication port 84. If so, the system controller advances to Block C, as hereinbefore described. Notably, this choice of control flow is based on the fact that, during data downloading operations, power is supplied to the data collection device by the host device, and the battery level of the data collection device is of no consequence during such operations.

If, however, at Block M low battery level is not detected, then the system controller proceeds to Block Q. At Block Q, the system controller checks the output of bar code reader detect circuit 95 to determine whether a bar code reader is plugged into data-input communication port 83. If the system control receives bar code reader detect signal $A_{UL}=0$, then at Block R system controller writes "PLUG-IN READER" to character display 82. Thereafter, the system controller returns to Block A, as shown. If the system controller receives $A_{UL}=1$, indicative that a bar code reader is plugged into data-input communication port 83, then the system controller writes "READY TO READ" to character display 82, as indicated at Block S.

At Block T, the system controller polls both communication driver (i.e., receiver) circuit 91 and keypad 81 for entry of data. If either of these system components indicate receipt of data to be stored (e.g., from a bar code reader or the keypad), then as indicated at Blocks U through V, the system controller uploads such data by first writing the data to character display 82, and then storing the data in RAM storage unit 99. Then, at Block W, the system controller determines whether RAM storage unit 99 is filled to capacity. If it is, then at Block X the system controller writes "MEMORY FULL" to character display 82 and thereafter remains at Block Y until it receives host detect signal $A_{DL}=1$, indicative that a host device is connected to data-output communications port 84 for downloading collected data thereto. If a host device is detected at the data-output communications port 84, the system controller proceeds to Block C for participating in downloading of a collection data, in a manner described above.

If, as indicated at Block W, the system controller determines that RAM storage unit 99 is not full, then the system controller returns to Block T. at which it checks again for incoming data over either the receiving lines $R_{x2}$ of communication driver circuit 91 (i.e., bar code reader input) or from the keypad. If there is incoming data from either of these system components, then the system controller proceeds to Blocks U and V for participating in data uploading, as described above. The system controller will follow this control loop provided that data is presented for collection and RAM storage unit 99 has vacant memory storage space.

If at Block T, the system controller determines that no data is being presented for collection, then at Block Z it checks the battery power supply level of the battery supply unit 89. If a low battery level is detected, then the system controller proceeds to Blocks N, O and P described above. At these control blocks, power supply to data-input communication port 93 is disconnected in order to terminate power to the connected bar code reading device, and the "LOW BATTERIES" message is written to character display 82. If, however, a low battery level is not detected, then the system controller determines at Block AA whether any incoming data has been presented for collection (i.e., by data uploading) within a predetermined time period (e.g., 2 minutes). If no data has been presented for uploading, then as indicated at Block BB, the system controller "turns off" the connected bar code reader by disconnecting the supply of battery power to data-input communication port 83 by way of power switching circuit 93. Thereafter, as indicated at Block CC, the system controller writes "HIT KEY TO READ" message to character display 82. Then at Block DD, the system controller polls the keypad for a key press operation. If any key is pressed, the system controller remains in a control loop between Blocks DD and EE and determines whether a key has been pressed, or a host device has been connected to data-output communication port 84. If the system controller receives host detect signal $A_{DL}=1$ indicative that a host device is plugged into data-output communication port 84, the system controller then proceeds to Block C, automatically enabling the data collection device for participation in the downloading of collected data, in a manner described above.

In the event that the operator desires to clear RAM storage unit 99 of collected data, the operator must enter a preset code word or alphanumeric code by way of keypad 81. This feature prevents accidental erasure of collected data. Notably, the data collection device of the present invention does not require programming for data transfers. Instead, data uploading routines are programmed into data transmission circuit 19 of automatic bar code reading devices 2 and 2'. On the other hand, data downloading routines are programmed into the host data receiver. Preferably, these downloading routines are designed to accept downloaded symbols and create an ASC11 file.

The data collection device described above and the automatic bar code reading devices of the present invention provides an ultra-lightweight, fully portable bar code symbol reading system characterized by simplicity of operation, high-speed symbol recognition and versatility. The automatic bar code symbol reading device of the present invention has been provided with a wide variety of complex decision-making operations which accord the automatic bar code symbol reading system of the present invention with a level of intelligence hitherto unattained in the bar code symbol reading art. Within the spirit of the present invention, additional decision-making operations may be provided to further enhance the capabilities of the system.

While the particular illustrative embodiments shown and described above will be useful in many applications in code symbol reading, further modifications to the present invention herein disclosed will occur to persons skilled in the art. All such modifications are deemed to be within the scope and spirit of the present invention defined by the appended claims.

We claim:

1. An automatic bar code symbol reading system, comprising:

a housing having a light transmission aperture through which light of at least one wavelength can exit and enter into the housing;

a bar code presence detection mechanism in the housing, for detecting a presence of a bar code located in a scan field defined external to the housing, and for automatically generating an activation signal in response to the detection of the presence of the bar code located in the scan field;

an activatable scan data producing mechanism in the housing, for producing scan data from a bar code located in the scan field, the scan data producing mechanism including:

a laser beam generating mechanism for generating a laser beam, a directing mechanism for directing the laser beam through the light transmission aperture and into the scan field, a laser beam scanning mechanism for repeatedly scanning the laser beam across the scan field and the detected bar code symbol, a laser light detecting mechanism for detecting the intensity of laser light reflected off the bar code symbol and passing through the light transmission aperture as the laser beam is repeatedly scanned across the scan field and the detected bar code, and a data producing mechanism for automatically producing scan data indicative of the detected intensity;

an activatable scan data processing mechanism for processing produced scan data so as to detect and decode a bar code symbol in the scan field, and for automatically producing symbol character data representative of the decoded bar code symbol; and a control mechanism for controlling the operation of the automatic bar code symbol reading system, the control mechanism including:

(i) an activation mechanism for automatically activating the activatable scan data producing mechanism and the activatable scan data processing mechanism for up to a predetermined time period in response to the generation of the activation signal, and (ii) a mechanism for automatically deactivating the activatable scan data producing mechanism and the activatable scan data processing mechanism in response to the failure of the scan data processing mechanism to detect and decode the bar code symbol on the detected object within the predetermined time period.

2. The automatic bar code symbol reading system of claim 1, wherein the laser beam generating mechanism comprises a laser diode.

3. The automatic bar code symbol reading system of claim 1, wherein the bar code symbol has first and second envelope borders, and wherein the scan data processing mechanism comprises a mechanism for detecting the first and second envelope borders of the bar code symbol, and mechanism for decoding the detected bar code symbol.

4. The automatic bar code symbol reading system of claim 1, wherein the laser beam generating mechanism is operated in a pulsed laser mode so as to generate a pulsed laser beam, which is directed through the light transmission aperture and repeatedly scanned across the scan field to detect a presence of a bar code symbol in the scan field.

5. The automatic bar code symbol reading system of claim 1, wherein the scan data processing mechanism and the control mechanism are disposed in the housing.

6. The automatic bar code symbol reading system of claim 5, wherein the housing comprises a head portion and a handle portion.

7. The automatic bar code symbol reading system of claim 6, wherein the laser beam producing mechanism comprises a visible laser diode in the housing.

8. The automatic bar code symbol reading system of claim 7, wherein the laser light detecting mechanism comprises a photodetector in the housing.

9. The automatic bar code symbol reading system of claim 7, wherein the scan data processing mechanism and the control mechanism comprise a programmed microprocessor in the housing.

10. The automatic bar code symbol reading system of claim 9, which further comprises a housing support stand for supporting the housing above a workspace so that the automatic bar code symbol reading system can be used to read bar code symbols on objects while the housing is supported in the support stand.

11. The automatic bar code symbol reading device of claim 9, wherein the predetermined time period is greater than about 3 seconds.

12. The automatic bar code symbol reading system of claim 1, wherein the control mechanism further comprises a mechanism for automatically continuing activation of the activatable scan data producing mechanism and the activatable scan data processing mechanism for an additional time period in response to the detection and decoding of the bar code symbol within the predetermined time period to permit detection and decoding of another bar code symbol in the scan field which is different than the bar code symbol detected and decoded within the predetermined time period.

13. The automatic bar code symbol reading system of claim 4, wherein the control mechanism further comprises a mechanism for automatically continuing activation of the activatable scan data producing mechanism and the activatable scan data processing mechanism for an additional time period in response to the detection and decoding of the bar code symbol within the predetermined time period to permit detection and decoding of another bar code symbol in the scan field which is different than the bar code symbol detected and decoded within the predetermined time period.

14. An automatic bar code symbol reading system, comprising:

a housing having a light transmission aperture through which light of at least one wavelength can exit and enter the housing;

a bar code presence detection mechanism in the housing, for detecting a presence of a bar code located within at least a portion of a scan field defined external to the housing;

an activatable laser beam source in the housing for producing, when activated, a laser beam;

a laser beam detecting mechanism in the housing, for directing the visible laser beam through the light transmission aperture and into the scan field;

an activatable scanning mechanism in the housing for repeatedly scanning, when activated, the laser beam across the scan field and across a bar code symbol in the scan field;

a light detection mechanism in the housing, for detecting the intensity of laser light reflected off the bar code symbol as the laser beam is repeatedly scanned across the scan field and the bar code symbol, and for automatically producing scan data indicative of the detected intensity of the reflected laser light;

a scan data processing mechanism for processing produced scan data so as to detect and decode the bar code symbol, and upon detecting and decoding the bar code symbol, automatically producing symbol character data representative of the decoded bar code symbol;

a control mechanism for controlling the operation of the automatic bar code symbol reading system, the control mechanism including:

(i) a mechanism for automatically activating the activatable laser beam source and the activatable scanning mechanism for up to a predetermined time period in response to the generation of the activation signal, and (ii) a mechanism for automatically deactivating the activatable laser beam source and the activatable scanning mechanism in response to the scan data processing mechanism failing to detect and decode the bar code symbol within the predetermined time period.

15. The automatic bar code symbol reading device of claim 14, wherein the light detection mechanism has an operative scanning range measured from the transmission aperture out towards a region within the scan field, and wherein the scan field is characterized by at least one scanning plane having an essentially planar extent.

16. The automatic bar code symbol reading system of claim 14, wherein the bar code symbol has first and second envelope borders, and wherein the scan data processing mechanism comprises a mechanism for detecting the first and second envelope borders of the bar code symbol, and a mechanism for decoding the detected bar code symbol.

17. The automatic bar code symbol reading system of claim 14, wherein the housing comprises a head portion and a handle portion, and wherein the activatable laser beam source, the laser beam directing mechanism, the activatable scanning mechanism, and the light detection mechanism are in the head portion.

18. A method of reading bar code symbols using an automatic unit, the method comprising the steps of:
   (a) supporting the unit adjacent an object bearing a bar code symbol so that the bar code symbol is located within at least a portion of a scan field defined external to the unit, and the unit is disposed in a non-contacting relationship with the object;
   (b) automatically generating an activation signal in response to a detection of a presence of the bar code symbol located in the scan field;
   (c) in response to the generation of the activation signal during step (b),
      (1) automatically activating for up to a predetermined time period, a laser beam source and an electrically driven scanning element in the unit so as to produce a laser beam which is directed through a light transmission aperture in the unit and repeatedly scanned across the scan field and the detected bar code symbol,
      (2) automatically detecting, at the unit, the intensity of laser light reflected off the detected bar code symbol, and automatically producing scan data indicative of the detected intensity of the reflected laser light, and
      (3) automatically processing produced scan data for up to the predetermined time period in order to decode the detected bar code symbol; and
   (d)(1) upon decoding the detected bar code symbol within the predetermined time period of step (c), automatically producing symbol character data representative of the decoded bar code symbol, and
   (d)(2) upon failing to decode the detected bar code symbol within the predetermined time period during step (c), automatically deactivating the laser beam source and the electrically driven scanning element.

19. A method of reading bar code symbols using an automatic unit, the method comprising the steps of:
   (a) supporting the unit adjacent an object bearing a bar code symbol so that the bar code symbol is located in at least a portion of a scan field defined external to the unit, and the unit is disposed in a non-contacting relationship with the object;
   (b) transmitting pulsed energy from a pulsed energy source in the unit, into at least a portion of the scan field, and in response to receiving at the unit at least a portion of the transmitted pulsed energy reflected off the bar code in the scan field, automatically generating an activation signal;
   (c) in response to the generation of the activation signal during step (b),
      (1) automatically activating for a predetermined time period, a laser beam source and an electrically driven scanning element in the unit so as to produce a laser beam which is projected through a light transmission aperture in the unit and repeatedly scanned across the scan field and the bar code symbol,
      (2) automatically detecting, at the unit, the intensity of laser light reflected off the bar code symbol, and automatically producing scan data indicative of the detected intensity of the reflected laser light, and
      (3) automatically processing produced scan data for up to the predetermined time period so as to decode the detected bar code symbol; and
   (d)(1) upon decoding the detected bar code symbol within the predetermined time period during step (c), automatically producing symbol character data representative of the decoded bar code symbol on the detected object, and
   (d)(2) upon failing to decode the detected bar code symbol within the predetermined time period during step (c), automatically deactivating the laser beam source and the electrically driven scanning element.

20. The method of claim 19, wherein the pulsed energy is a pulsed laser light signal, and step (b) comprises transmitting the laser light signal from the unit into at least a portion of the scan field, and automatically generating the activation signal in response to a detection of the transmitted laser light signal reflected off a bar code located in the scan field.

21. The method of claim 20, wherein the bar code symbol has first and second envelope borders, and wherein step (b) comprises processing produced scan data so as to detect the bar code symbol by detecting the first and second envelope borders of the bar code symbol.

22. An automatic bar code symbol reading system, comprising:
   a housing having a light transmission aperture through which light of at least one wavelength can exit and enter the housing;
   a bar code presence detection mechanism, situated in the housing, for transmitting a pulsed laser light signal through the aperture, outwardly into a scan field defined externally with respect to the housing, and for automatically generating a first activation signal in response to the detection of the transmitted laser light signal reflected off a bar code symbol located in the scan field;
   the bar code presence detection mechanism further comprising a scanning mechanism for producing a laser light beam within the hand-supportable housing and for directing the light beam through the light transmission aperture, and repeatedly scanning the visible light beam across the scan field, and across a detected bar code symbol, so as to produce scan data to thereby permit a decoding of the detected bar code symbol;
   a light detection mechanism in the housing, for detecting the intensity of light reflected off the bar code symbol and passing through the light transmission aperture, and automatically producing scan data indicative of the detected light intensity;
   a processing mechanism for processing the produced scan data so as to decode the detected bar code symbol, and automatically producing symbol character data representative of the decoded symbol in response to the decoding of the detected bar code symbol; and
   a control mechanism for controlling the operation of the automatic bar code symbol reading system, the control mechanism including a mechanism for automatically activating the scanning mechanism for up to a first predetermined time period in response to the generation of the first activation signal.

23. The automatic bar code symbol reading system of claim 22, wherein the scanning mechanism comprises a laser diode in the housing for producing the visible laser beam, and an electrically driven scanning element for repeatedly scanning the laser beam across the scan field and the detected bar code symbol.

24. The automatic bar code symbol reading system of claim 23, wherein the control mechanism further comprises a mechanism for automatically deactivating the scanning mechanism and the processing mechanism in response to the processing mechanism failing to generate the first activation signal within a first predetermined time period.

25. The automatic bar code symbol reading system of claim 24, wherein the control mechanism further comprises a mechanism for automatically deactivating the scanning mechanism and the processing mechanism in response to the processing mechanism failing to decode the detected bar code symbol within a second predetermined time period.

26. The automatic bar code symbol reading system of claim 24, wherein the housing comprises a head portion and a handle portion, and wherein the bar code presence detection mechanism and the scanning mechanism are in the head portion.

27. The automatic bar code system reading system of claim 22, wherein the scanning mechanism has an operative scanning range measured from the transmission aperture out towards a region within the scan field, wherein the scan field is characterized as having at least one scanning plane having an essentially planar extent.

28. An automatic bar code symbol reading system, comprising:
  a housing having a light transmission aperture through which light of at least one wavelength can exit and enter the housing;
  a bar code presence detection mechanism in the housing, for automatically detecting a presence of a bar code symbol located in a scan field defined external to the housing, and for automatically generating a first activation signal in response to the detection of the presence of the bar code symbol in the scan field;
  a scan data producing mechanism in the housing for producing scan data from the detected object located in the scan field, the scan data producing mechanism having an operative scanning range measured from the transmission aperture out towards a region within the scan field, the scan field being characterized by at least one scanning plane having an essentially planar extent, the scan data producing mechanism including
    (i) a laser beam generating mechanism for generating a laser beam within the housing,
    (ii) a laser beam scanning mechanism for projecting the laser beam through the light transmission aperture and for repeatedly scanning the laser beam across the scan field and a bar code symbol in the scan field, and
    (iii) a laser light detecting mechanism for detecting the intensity of laser light reflected off the bar code symbol and passing through the light transmission aperture, and for automatically producing scan data indicative of the detected intensity;
  a processing mechanism for processing produced scan data so as to decode the detected bar code symbol, and automatically producing symbol character data representative of the decoded bar code symbol in response to the decoding of the detected bar code symbol; and
  a control mechanism for controlling the operation of the automatic bar code symbol reading system, the control mechanism including a mechanism for automatically activating the scan data producing mechanism and the processing mechanism for up to a first predetermined time period in response to the generation of the activation signal.

29. The automatic bar code symbol reading system of claim 28, wherein the control mechanism further comprises a mechanism for automatically deactivating the scan data producing mechanism and the processing mechanism in response to the processing mechanism failing to generate the activation signal within the first predetermined time period, and a mechanism for automatically deactivating the scan data producing mechanism and the processing mechanism in response to the processing mechanism failing to produce symbol character data within a second predetermined time period.

30. An automatic bar code symbol reading system comprising:
  a housing having a light transmission aperture through which visible light can exit and enter the housing;
  a bar code presence detection circuit in the unit, for receiving energy from a scan field defined external to the housing, and for automatically generating an activation signal in response to the detection of energy reflected off a bar code symbol located in a scan field;
  a laser beam source in the housing for producing a laser beam;
  a laser beam directing mechanism for directing the laser beam through the light transmission aperture and into the scan field;
  an electrically driven scanning element in the housing, for repeatedly scanning the laser beam across the scan field, wherein the scan field is defined external to the housing;
  a laser light detection mechanism in the housing, for detecting the intensity of laser light reflected off the bar code symbol as the laser light beam is repeatedly scanned across the scan field and the detected bar code symbol, and automatically producing scan data indicative of the detected intensity of the reflected laser light, the light detection mechanism having an operative scanmng range measured from the transmission aperture out towards a region within the scan field;
  a processing mechanism for processing produced scan data in order to decode the detected bar code symbol and, upon decoding the detected bar code symbol, automatically producing symbol character data representative of the bar code symbol; and
  a control mechanism for automatically controlling the operation of the automatic bar code symbol reading system, the control mechanism including a mechanism for automatically activating the laser beam source, the electrically driven scanning element, the laser light detection mechanism and the processing mechanism for up to a first predetermined time period in response to the generation of the activation signal.

31. The automatic bar code symbol reading system of claim 30, wherein the control unit further comprises a mechanism for automatically activating the laser beam source, the electrically driven scanning element, the laser light detection mechanism and the first processing mechanism for up to a second predetermined time period only in response to the production of the symbol character data within the second predetermined time period, thereby permitting a detection of a second bar code symbol disposed in the scan field.

32. The automatic bar code symbol reading system of claim 30, wherein the control mechanism further comprises:
  a mechanism for automatically deactivating the laser beam source and the electrically driven scanning element in response to the failure of the processing mechanism to generate the activation signal within the first predetermined time period.

33. The automatic bar code symbol reading system of claim 32, wherein the control mechanism further comprises a mechanism for automatically deactivating the laser beam source and the electrically driven scanning element in response to the failure of the processing mechanism to decode the detected bar code symbol within the first predetermined time period.

34. The automatic bar code symbol reading system of claim 30, wherein the housing comprises a head portion and a handle portion, and wherein the bar code presence detection mechanism, the laser beam source, the laser beam directing mechanism, the electrically driven scanning element and the laser light detection mechanism are disposed in the head portion.

35. A method of reading bar code symbols using an automatic hand- supportable unit having an operative scanning range, the method comprising the steps of:
(a) supporting the hand-supportable unit adjacent an object bearing a bar code symbol so that the object is located within at least a portion of a bar code symbol presence detection field defined external to the hand-supportable unit and having an essentially volumetric extent, and the hand-supportable unit is disposed in a substantially non-contacting relationship with the object;
(b) at the hand-supportable unit, receiving energy reflected from the bar code symbol presence detection field and automatically generating a first activation signal in response to the detection of energy reflected off a bar code symbol in the bar code symbol presence detection field;
(c) in response to the generation of the first activation signal, automatically activating for a first predetermined time period by a control circuit, a laser beam source and an electrically driven scanning element in the hand-supportable unit so as to produce a laser beam which is projected through a light transmission aperture in the hand-supportable housing and repeatedly scanned across the bar code symbol presence detection field and the bar code symbol on the detected object, the field being defined external to the hand-supportable housing along an operative scanning range;
(d) automatically detecting at the hand-supported unit, the intensity of laser light reflected off the detected bar code symbol as the light beam is scanned across the bar code symbol, and automatically producing a first electrical signal responsive to the detected intensity of the reflected laser light;
(e) automatically continuing, for up to a predetermined time period, the activation of both the laser beam source and the electrically driven scanning mechanism so as to continue to produce the laser beam and repeatedly scan the laser beam across the field and the detected bar code symbol;
(f) automatically detecting at the hand-supported unit, the intensity of laser light reflected off the detected bar code symbol, and producing an electrical signal responsive to the detected intensity of the reflected laser light; and
(g) automatically processing the electrical signal for up to the predetermined time period in order to decode the detected bar code symbol on the detected object, and upon decoding the detected bar code symbol, automatically producing symbol character data representative of the decoded bar code symbol.

36. A method of scanning a bar code symbol on an object by use of an automatic hand-supportable bar code symbol scanning device having a hand-supportable housing, the method comprising the steps of:
(a) automatically detecting the presence of the bar code symbol within a bar code presence detection field defined external to the hand-supportable housing, by sensing energy reflected off the bar code symbol;
(b) in automatic response to the determination of the bar code symbol within the detection field during step (a), producing scan data from the detected code symbol using the laser beam, and collecting the produced scan data.

37. The method of claim 36, which further comprises:
(c) processing the scan data collected during step (b) in order to decode the code symbol, and upon decoding the bar code symbol, producing symbol character data corresponding to the decoded code symbol.

* * * * *